(12) United States Patent
Shinmura et al.

(10) Patent No.: US 6,269,307 B1
(45) Date of Patent: Jul. 31, 2001

(54) TRAVEL SAFETY SYSTEM FOR VEHICLE

(75) Inventors: Tomoyuki Shinmura; Kenji Kodaka; Yoichi Sugimoto, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/368,673

(22) Filed: Aug. 5, 1999

(30) Foreign Application Priority Data

| Aug. 6, 1998 | (JP) | ................................................. 10-222514 |
| Aug. 19, 1998 | (JP) | ................................................. 10-233206 |
| Aug. 19, 1998 | (JP) | ................................................. 10-233208 |
| Aug. 19, 1998 | (JP) | ................................................. 10-233209 |

(51) Int. Cl.$^7$ ........................................................ B60Q 1/00
(52) U.S. Cl. ........................... 701/301; 701/300; 701/302; 340/435; 340/436
(58) Field of Search ..................... 701/300, 301, 701/302; 342/70, 118, 61, 72, 175; 340/435, 436, 438

(56) References Cited

U.S. PATENT DOCUMENTS

| 5,467,283 | * | 11/1995 | Butsuen et al. | ........................ 364/461 |
| 5,467,284 | * | 11/1995 | Yoshioka et al. | ....................... 364/461 |
| 5,540,298 | * | 7/1996 | Yoshioka et al. | ....................... 180/169 |
| 5,572,428 | * | 11/1996 | Ishida et al. | ............................ 364/461 |
| 5,648,905 | * | 7/1997 | Izumi et al. | ............................. 364/461 |
| 5,699,040 | * | 12/1997 | Matsuda | ................................. 340/435 |
| 5,986,601 | * | 11/1999 | Sugimoto | ................................. 342/70 |
| 6,018,308 | * | 1/2000 | Shirai | ....................................... 342/70 |
| 6,087,975 | * | 7/2000 | Sugimoto et al. | ........................ 342/70 |

FOREIGN PATENT DOCUMENTS

| 7-14100 | 1/1995 | (JP) . |
| 7-262497 | 10/1995 | (JP) . |

* cited by examiner

*Primary Examiner*—William A. Cuchlinski, Jr.
*Assistant Examiner*—Marthe Y. Marc-Coleman
(74) *Attorney, Agent, or Firm*—Arent Fox Kitner Plotkin & Kahn

(57) ABSTRACT

A lateral deviation $\delta d$ which is a lateral distance between an intrinsic appropriate course R for a vehicle Ai and a contact position P at which the vehicle Ai will come into contact with an on-coming vehicle Ao, is calculated based on a relative angle $\theta$, a relative distance L and a relative speed Vs which are detected by a radar device, and based on a vehicle speed Vi of the vehicle Ai detected by vehicle speed sensors. When the lateral deviation $\delta d$ is in a range of $\delta dn < \delta d < \delta dx$, it is determined that there is the possibility that the vehicle Ai will collide frontally with the on-coming vehicle Ao. The lateral deviation $\delta d$ can be calculated based on the relative angle $\theta$, the relative distance L and the relative speed Vs provided in one cycle of transmission and reception of beam by the radar device. Therefore, the possibility of collision can be determined immediately at a time point when the on-coming vehicle Ao is recognized, without continuous detection of the correlation between the vehicle Ai and the on-coming vehicle Ao by the radar device.

32 Claims, 35 Drawing Sheets

TRAVEL SAFETY SYSTEM FOR VEHICLE

BACKGROUND OF THE INVENTION

1. Field of the Invention

The present invention relates to a travel safety system for a vehicle, which is designed to prevent a vehicle from coming into contact with an on-coming vehicle by use of an object detecting means such as a radar device.

2. Description of the Related Art

Such travel safety systems for vehicles are already known from Japanese Patent Application Laid-open Nos. 7-262497 and 7-14100.

The system described in Japanese Patent Application Laid-open No. 7-262497 is designed, so that a locus of movement for the vehicle from the present time to a time point after the lapse of a given period of time and a vehicle position on the locus of movement are estimated, while a locus of movement for another vehicle traveling ahead of the vehicle (which will be referred to as a preceding vehicle hereinafter) from the present time to the time point after the lapse of a given time period and a preceding vehicle position on the locus of movement are estimated by the radar device, and the presence or absence of the possibility of collision is determined by comparing the vehicle position with the preceding vehicle position.

However, the above known system suffers from the following problem: It is necessary to continuously detect the current position and the current speed of the preceding vehicle in order to estimate a future position of the preceding vehicle, and for this reason, it is impossible to immediately determine the presence or absence of a possibility of collision at a time point when the preceding vehicle is detected by the radar device. On the other hand, in a case of a frontal collision which occurs when the vehicle and the preceding vehicle approach each other, there is not sufficient time from the time point of detection of the preceding vehicle until the vehicle will collide with the preceding vehicle. For this reason, in a system in which a predetermined period of time is required for determining the presence or absence of the possibility of collision as in the known system, there is the possibility that an operation for avoiding the collision of the vehicle with the preceding vehicle could not be in time for the avoidance of the collision.

The system described in the above Japanese Patent Application Laid-open No. 7-14100 is designed, so that an on-coming vehicle is detected by an object detecting means; a degree of danger of collision between a vehicle and the on-coming vehicle is estimated from the vehicle speed of the vehicle, the vehicle speed of the on-coming vehicle, the relative speed between the vehicle and the on-coming vehicle, the distance between the vehicle and a center line, the azimuth angle of movement of the vehicle and the like; and when the degree of danger of collision is equal to or larger than a predetermined reference value, a warning or an automatic deceleration of the vehicle is carried out.

The above known system is premised on the vehicle and the on-coming vehicle traveling on a straight road. For this reason, the above known system suffers from the following problem: When the vehicle and the on-coming vehicle are approaching each other while turning on a curved road or the like, the degree of danger of collision cannot be presumed precisely and hence, the avoidance of the collision cannot be performed properly.

In addition, the system described in the above Japanese Patent Application Laid-open No. 7-14100 is not designed to automatically steer the steering device of the vehicle in order to avoid the collision of the vehicle with the on-coming vehicle. For this reason, it can be considered that when a steering operation for avoiding the collision is spontaneously carried out by the vehicle driver, or when a collision avoiding operation is not carried out in the on-coming vehicle, the collision cannot be avoided, even if the vehicle is stopped by an automatic braking operation. Therefore, it can be conceived that a steering device in the vehicle is automatically steered in order to avoid the collision. However, if the timing of starting the automatic steering operation is hastened, or the steering amount in the automatic steering operation is increased in order to increase the collision avoiding effect, there is the possibility of interference with the spontaneous collision avoiding operation conducted by the driver. Further, if the variation in vehicle behavior has been already produced in the vehicle when the steering device in the vehicle is automatically steered in order to avoid the collision, there is the possibility that the variation in vehicle behavior caused by the automatic steering operation could be added to the above-described variation to produce an undesirable variation in vehicle behavior, thereby exerting an influence to the subsequent driver's driving operation.

SUMMARY OF THE INVENTION

Accordingly, it is a first object of the present invention to ensure that the determination of the possibility of contact between the vehicle and the on-coming vehicle can be performed immediately at the time when the on-coming vehicle is detected by the object detecting means.

It is a second object of the present invention to ensure that when the vehicle and the on-coming vehicle approach each other while being turned, a proper contact avoiding control can be carried out.

It is a third object of the present invention to ensure that in a system in which the steering device is steered automatically in order to avoid contact of the vehicle with the on-coming vehicle, the interference of the collision avoiding operation provided by the automatic steering operation with the spontaneous collision avoiding operation provided by the driver, can be minimized.

It is a fourth object of he present invention to ensure that in a system in which the steering device is steered automatically in order to avoid contact of the vehicle with the on-coming vehicle, collision avoiding effects provided by the automatic steering operation and the manual steering operation can be reconciled by leaving a margin for controlling the vehicle behavior, response or operation by the spontaneous steering operation provided by the driver.

To achieve the above first object, according to a first aspect and feature of the present invention, there is provided a travel safety system for a vehicle, comprising an object detecting means for detecting an object existing in the direction of movement of a vehicle, a vehicle speed detecting means for detecting the vehicle speed of the vehicle. A correlation calculating means recognizes an on-coming vehicle based on the result of the detection by the object detecting means and the vehicle speed of the vehicle detected by the vehicle speed detecting means, and calculates a correlation comprising a relative position, a relative distance and a relative speed between the vehicle and the on-coming vehicle. An appropriate course determining means determines an appropriate course for the vehicle for permitting the vehicle to pass the on-coming vehicle appropriately, based on the relative position, the relative distance and a preset appropriate lateral distance. A contact time point estimating means estimates a contact time point when the vehicle will come into contact with the on-coming vehicle, based on the relative distance and the relative speed, and a contact position estimating means estimates a contact position at which the vehicle will come into contact with the on-coming vehicle at the contact time point, based on the relative position, the relative distance, the relative speed and the vehicle speed of the vehicle. A contact determining means determines the possibility of contact between the vehicle and the on-coming vehicle by comparing the contact position with the appropriate course.

With the above arrangement, the contact position in which the vehicle will come into contact with the on-coming vehicle is estimated based on the relative position, the relative distance and the relative speed between the vehicle and the on-coming vehicle detected by the object detecting means, and based on the vehicle speed of the vehicle detected by the vehicle speed detecting means. The possibility of contact between the vehicle and the on-coming vehicle is determined by comparing the contact position with the appropriate course for the vehicle. Therefore, the possibility of contact can be determined at a time point when the on-coming vehicle has been detected by the object detecting means, without continuous detection of the correlation between the vehicle and the on-coming vehicle by the object detecting means. As a result, it is possible to effectively avoid a frontal collision when there is no margin in time to the collision because of a large relative speed between the vehicle and the on-coming vehicle.

To achieve the second object, according to a second aspect and feature of the present invention, there is provided a travel safety system for a vehicle, comprising an object detecting means for detecting an object existing in the direction of movement of a vehicle; a vehicle speed detecting means for detecting the vehicle speed of the vehicle; and a vehicle yaw rate detecting means for detecting the yaw rate of the vehicle. A correlation calculating means recognizes an on-coming vehicle based on the result of the detection by the object detecting means and the vehicle speed of the vehicle detected by the vehicle speed detecting means, and calculates a relative position, a relative speed and a relative distance between the vehicle and the on-coming vehicle. A turning movement determining means determines that the vehicle and the on-coming vehicle are being turned. A vehicle turning-locus calculating means calculates a locus of turning movement for the vehicle, based on the vehicle speed and the yaw rate of the vehicle; and an on-coming vehicle turning-locus calculating means calculates a locus of turning movement for the on-coming vehicle, based on (1) a preset appropriate lateral distance required for permitting the vehicle and the on-coming vehicle to pass each other appropriately during turning movement thereof, (2) the relative position and (3) the relative distance. A danger degree calculating means calculates the degree of danger of contact between the vehicle and the on-coming vehicle by comparing the locus of turning movement for the vehicle with the locus of turning movement for the on-coming vehicle, and a contact avoiding means allows the vehicle to perform a contact avoiding motion in accordance with the calculated degree of danger in order to avoid the contact of the vehicle with the on-coming vehicle.

With the above arrangement, when it is determined that the vehicle and the on-coming vehicle are being turned, the locus of turning movement for the vehicle is calculated based on the vehicle speed and the yaw rate of the vehicle, and the locus of turning movement for the on-coming vehicle is calculated (1) based on the preset appropriate lateral distance required for permitting the vehicle and the on-coming vehicle to pass each other appropriately during turning movement thereof and (2) based on the relative position and the relative distance between the vehicle and the on-coming vehicle. The degree of danger of contact is calculated by comparing the locus of turning movement for the vehicle with the locus of turning movement for the on-coming vehicle. Therefore, even during a turning movement where it is difficult to carry out the contact avoiding control, it is possible to avoid mis-controlling and non-controlling, thereby allowing the vehicle to perform a reliable contact avoiding motion.

To achieve the third object, according to a third aspect and feature of the present invention, there is provided a travel safety system for a vehicle, comprising an object detecting means for detecting an object existing in the direction of movement of a vehicle, and a vehicle speed detecting means for detecting the vehicle speed of the vehicle. A correlation calculating means recognizes an on-coming vehicle, based on the result of the detection by the object detecting means and the vehicle speed of the vehicle detected by the vehicle speed detecting means, and calculates a correlation comprising a relative position, a relative distance and a relative speed between the vehicle and the on-coming vehicle. An appropriate course determining means determines an appropriate course for the vehicle for permitting the vehicle to pass the on-coming vehicle appropriately, based on the relative position, the relative distance and a preset appropriate lateral distance, a contact position estimating means estimates a contact position at which the vehicle will come into contact with the on-coming vehicle at a contact time point when the vehicle will come into contact with the on-coming vehicle, based on the relative position, the relative distance, the relative speed and the vehicle speed of the vehicle, and a contact-possibility determining means determines a possibility of contact between the vehicle and the on-coming vehicle by comparing the contact position with the appropriate course. A steering control means automatically steers a steering device of the vehicle in order to avoid the contact, when it is determined by the contact-possibility determining means that there is the possibility of contact, and a reference steering amount determining means determines a reference steering amount based on the variation in vehicle behavior of the vehicle generated by the steering operation. A required lateral movement amount calculating means calculates a lateral movement amount required for avoiding contact based on a lateral deviation between the appropriate course and the contact position, and a steering amount outputting means outputs a target steering amount to the steering control means, based on the result of the comparison of the lateral movement amount provided by the reference steering amount determining means, with the required lateral movement amount calculated by the required lateral movement amount calculating means.

With the above arrangement, the reference steering amount is determined by the reference steering amount determining means, based on the variation in vehicle behavior of the vehicle caused by the steering operation, and the lateral movement amount required for the avoiding the contact based on the lateral deviation between the appropriate course for the vehicle and the contact position is calculated by the required lateral movement amount calculating means. The reference lateral movement amount determined by the reference steering amount determining means is compared with the required lateral movement amount calculated by the required lateral movement amount calculating means, and the target steering amount is outputted based on the result of the comparison to the steering control means by the steering amount outputting means. Therefore, it is possible to prevent an excessive steering amount from being outputted which would cause the generation of a lateral movement amount larger than the required lateral movement amount, or would cause the target steering amount to be outputted too early. As a result, the automatic steering operation based on an excessive target steering amount is avoided, and it is possible to minimize the interference of the automatic steering operation with the spontaneous collision avoiding operation provided by a driver.

To achieve the fourth object, according to a fourth aspect and feature of the present invention, there is provided a travel safety system for a vehicle, comprising an object detecting means for detecting an object existing in the direction of movement of a vehicle, and a vehicle speed detecting means for detecting the vehicle speed of the vehicle. A correlation calculating means recognizes an on-coming vehicle based on the result of the detection by the object detecting means and the vehicle speed of the vehicle detected by the vehicle speed detecting means, and calculates a correlation comprising a relative position, a relative distance and a relative speed between the vehicle and the on-coming vehicle, and a contact-possibility determining means determines the possibility of contact between the vehicle and the on-coming vehicle, based on the correlation calculated by the correlation calculating means. A steering control means automatically steers a steering device of the vehicle in order to avoid the contact, when it is determined by the contact-possibility determining means that there is a possibility of contact. A vehicle behavior detecting means detects the magnitude of the vehicle behavior of the vehicle, a vehicle behavior margin amount determining means determines a margin amount of vehicle behavior which can be generated by the spontaneous steering operation provided by a driver, and a vehicle behavior estimating means estimates the magnitude of the vehicle behavior of the vehicle, when the steering device is steered by the steering control means. A vehicle motion state calculating means calculates the motion state of the vehicle at the time when the steering device is steered by the steering control means, based on outputs from the vehicle behavior detecting means, the vehicle behavior margin amount determining means and the vehicle behavior estimating means, and a steering amount correcting means corrects the steering amount provided to the steering device by the steering control means, when the vehicle motion state calculated by the vehicle motion state calculating means exceeds a predetermined motion range.

With the above arrangement, the vehicle motion state calculating means calculates the vehicle motion state, based on (1) the magnitude of the vehicle behavior of the vehicle detected by the vehicle behavior detecting means, (2) the margin amount of vehicle behavior which has been determined by the vehicle behavior margin amount determining means, which can be generated by the spontaneous steering operation provided by the driver, and (3) the magnitude of the vehicle behavior of the vehicle estimated by the vehicle behavior estimating means, when the steering device is steered by the steering control means. When the vehicle motion state exceeds the predetermined motion range, the steering amount provided for the steering device by the steering control means is corrected by the steering amount correcting means. Therefore, even if the vehicle behavior has already been generated at the start of the automatic steering operation and a new vehicle behavior is generated by the start of the automatic steering operation, a margin for generating a further vehicle behavior by a spontaneous collision avoiding operation provided by the driver can be maintained. Thus, it is possible to reconcile the automatic steering operation for avoiding contact with the on-coming vehicle and the spontaneous collision avoiding operation provided by the driver.

The above and other objects, features and advantages of the invention will become apparent from the following description of the preferred embodiment taken in conjunction with the accompanying drawings.

BRIEF DESCRIPTION OF THE DRAWINGS

FIGS. 1 to 20 show a first embodiment of the present invention, wherein:

FIG. 1 is an illustration of the entire arrangement of a vehicle provided with a travel safety system.

FIG. 2 is a block diagram of the travel safety system.

FIG. 3 is a perspective view of a steering device in the vehicle.

FIG. 4 is a diagram for explaining the function of an electronic control unit.

FIG. 5 is a block diagram showing the circuit arrangement of the electronic control unit.

FIG. 6 is a flow chart of a main routine.

FIG. 7 is a flow chart of a frontal collision avoiding control routine.

FIG. 8 is a flow chart of a during-turning collision avoiding control routine.

FIG. 9 is a flow chart of a frontal collision determining routine.

FIG. 10 is a flow chart of a warning control routine.

FIG. 11 is a flow chart of an avoiding steering control routine.

FIG. 12 is a diagram showing the content of a during-turning collision avoiding control.

FIG. 13 is a diagram for explaining a method for calculating a lateral deviation δd (when a possible collision will occur).

FIG. 14 is a diagram for explaining a method for calculating a lateral deviation δd (when the vehicle will pass on the left of an on-coming vehicle).

FIG. 15 is a diagram for explaining a method for calculating a lateral deviation δd (when the vehicle will pass on the right of the on-coming vehicle).

FIG. 18 is a map for searching a steering angle correction value δ(θ).

FIG. 19 is a map for searching a maximum steering angle.

FIG. 20 is a block diagram of a control system for an actuator.

FIGS. 21 to 25D show a second embodiment of the present invention, wherein:

FIG. 21 is a block diagram showing the circuit arrangement of an electronic control unit.

FIG. 22 is a diagram for explaining a method for calculating a radius of turning movement for the on-coming vehicle during rightward turning of the vehicle.

FIG. 23 is a diagram for explaining a method for calculating a radius of turning movement for the on-coming vehicle during leftward turning of the vehicle.

FIG. 24 is a map for discriminating a frontal collision avoiding control from a during-turning collision avoiding control.

FIGS. 25A to 25D are diagrams for explaining various examples of a steering maintaining force control for the steering device.

FIGS. 26 to 30B show a third embodiment of the present invention, wherein:

FIG. 26 is a block diagram showing the circuit arrangement of an electronic control unit.

FIG. 27 is a flow chart of an avoiding steering control routine.

FIG. 28 is a diagram for explaining the criterion for selecting a steering angle inhibiting control and a timing delay control.

FIGS. 30A and 30B are diagrams for explaining the timing delay control of the steering angle.

FIGS. 31 to 36 show a fourth embodiment of the present invention, wherein:

FIG. 31 is an illustration of the entire arrangement of a vehicle provided with a travel safety system.

FIG. 32 is a block diagram of the travel safety system.

FIG. 33 is a block diagram showing the circuit arrangement of an electronic control unit.

FIG. 34 is a flow chart of an avoiding steering control routine.

FIG. 36 is a flow chart of an excessive-control determining routine.

DESCRIPTION OF THE PREFERRED EMBODIMENTS

A first embodiment of the present invention will now be described with reference to FIGS. 1 to 20.

Figure 1:
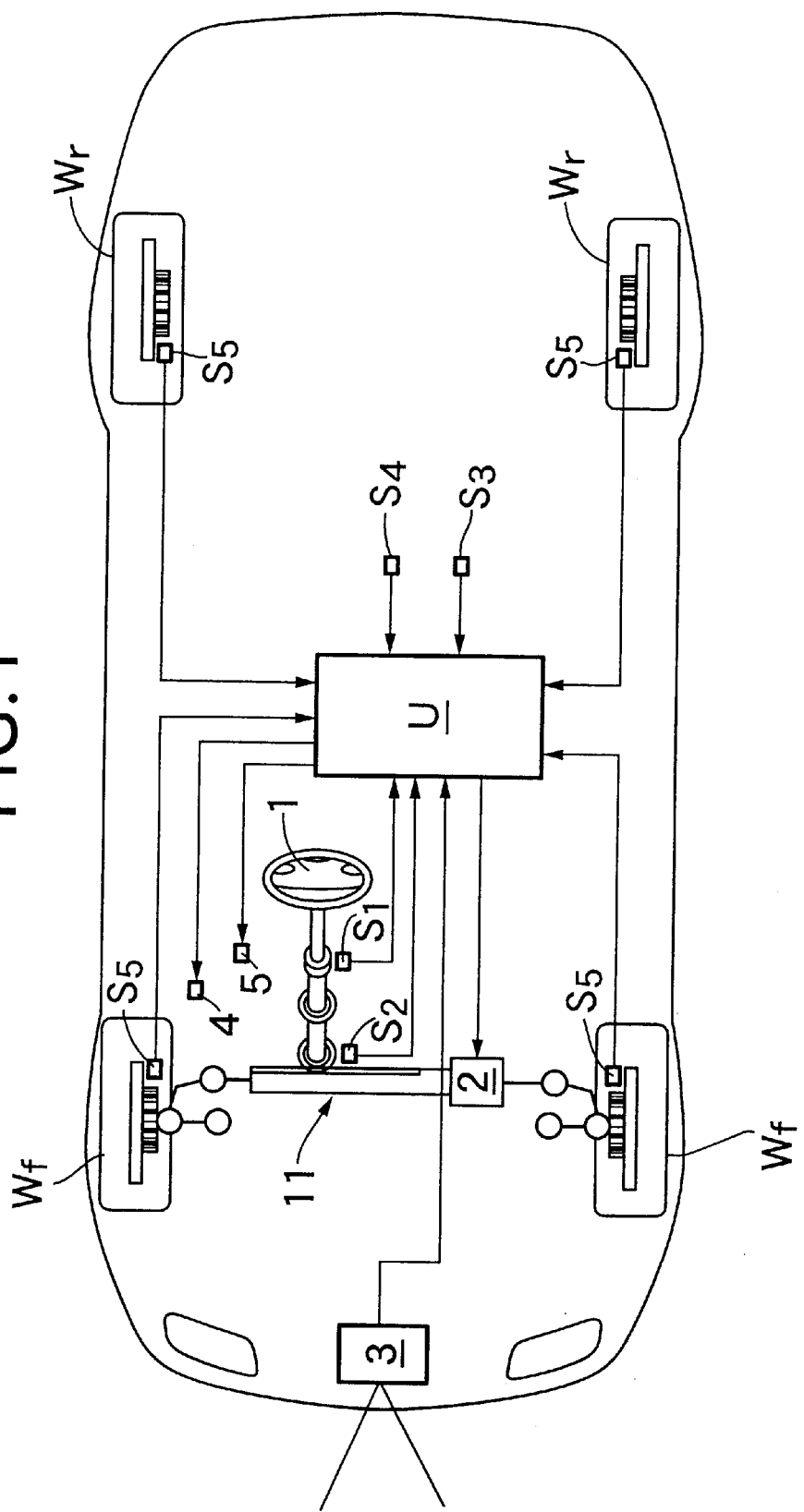
Figure 2:
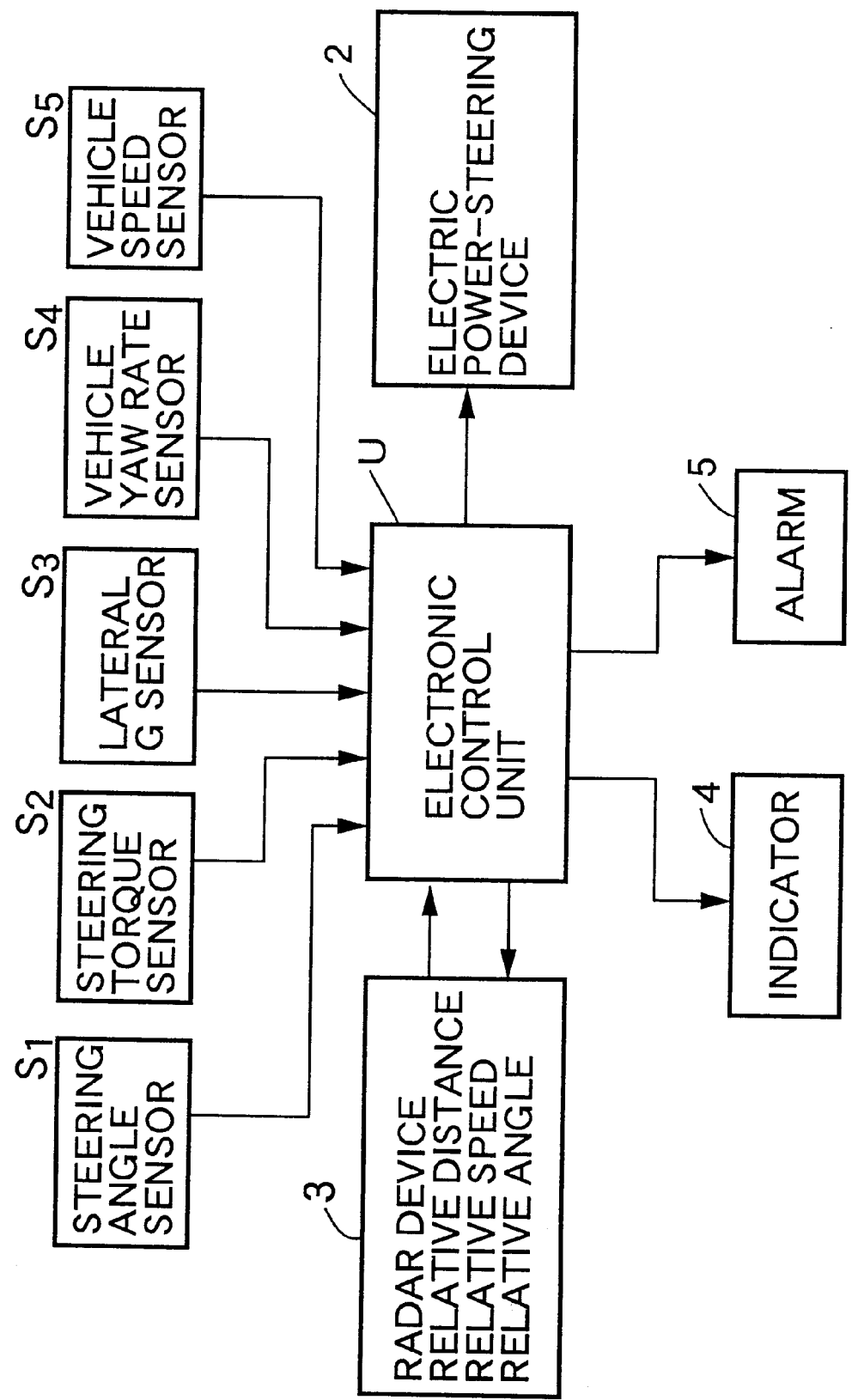

As shown in FIGS. 1 and 2, a vehicle having left and right front wheels Wf, Wf and left and right rear wheels Wr, Wr includes a steering wheel 1 for steering the left and right front wheels Wf, Wf which are steering wheels, and an electric power-steering device 2 for generating a steering force for assisting in the operation of the steering wheel 1 by a driver and a steering force for avoiding the collision of the vehicle. An electronic control unit U for controlling the operation of the electric power-steering device 2, receives input signals from a radar device 3 as an object detecting means, a steering angle sensor $S_1$ for detecting the steering angle of the steering wheel 1, a steering torque sensor $S_2$ for detecting the steering torque input to the steering wheel 1, a lateral acceleration sensor $S_3$ for detecting the lateral acceleration of a vehicle body, a vehicle yaw rate sensor $S_4$ for detecting the yaw rate of the vehicle body, and a vehicle speed sensors $S_5$ for detecting rotational speeds of the wheels Wf, Wf and Wr, Wr. The electronic control unit U controls the operation of the electric power-steering device 2 based on the signals from the radar device 3 and the sensors $S_1$ to $S_5$, and also controls the operation of an indicator 4 comprising a liquid crystal display and an alarm 5 comprising a buzzer or a lamp.

The radar device 3 transmits an electromagnetic wave toward a laterally predetermined area ahead of the vehicle, and receives a reflected wave resulting from the reflection of the electromagnetic wave from an object, thereby detecting the relative distance between the vehicle and the object, the relative speed between the vehicle and the object and the direction of the object. In this embodiment, a millimeter wave radar is used which is capable of detecting the correlation between the vehicle and the object in one cycle of the transmission and reception of the electromagnetic wave.

Figure 3:
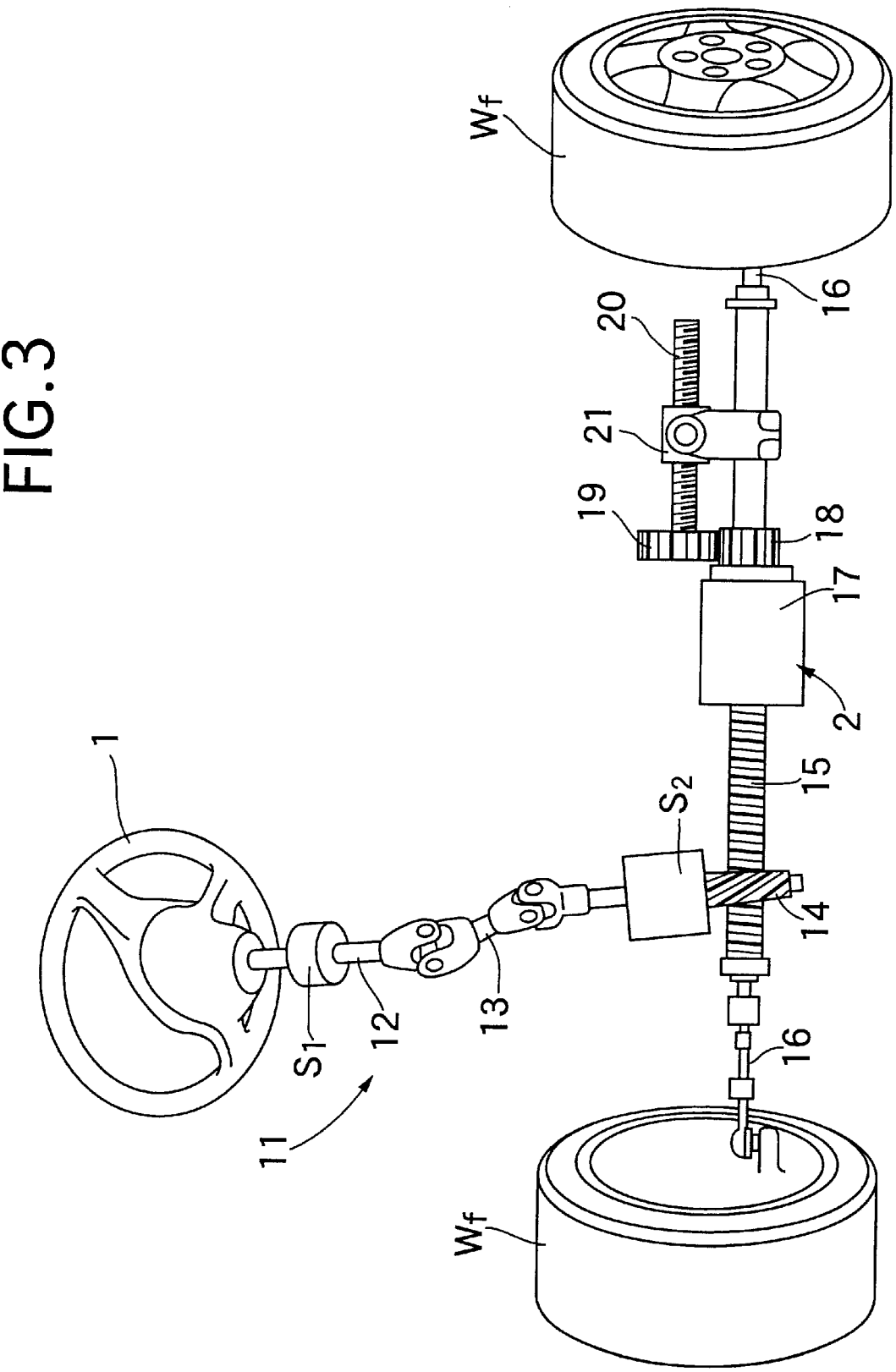

FIG. 3 shows the structure of a steering device 11. The rotation of the steering wheel 1 is transmitted to a rack 15 through a steering shaft 12, a connecting shaft 13 and a pinion 14 and further, the reciprocal movement of the rack 15 is transmitted to the left and right front wheels Wf, Wf through left and right tie rods 16, 16. The electric power-steering device 2 on the steering device 11 includes a driving gear 18 provided on an output shaft of an actuator 17, a follower gear 19 meshed with the driving gear 18, a screw shaft 20 integral with the follower gear 19, and a nut 21 meshed with the screw shaft 20 and connected to the rack 15. Therefore, if the actuator 17 is driven, the driving force thereof can be transmitted to the left and right front wheels Wf, Wf through the driving gear 18, the follower gear 19, the screw shaft 20, the nut 21, the rack 15 and the left and right tie rods 16, 16.

Figure 4:
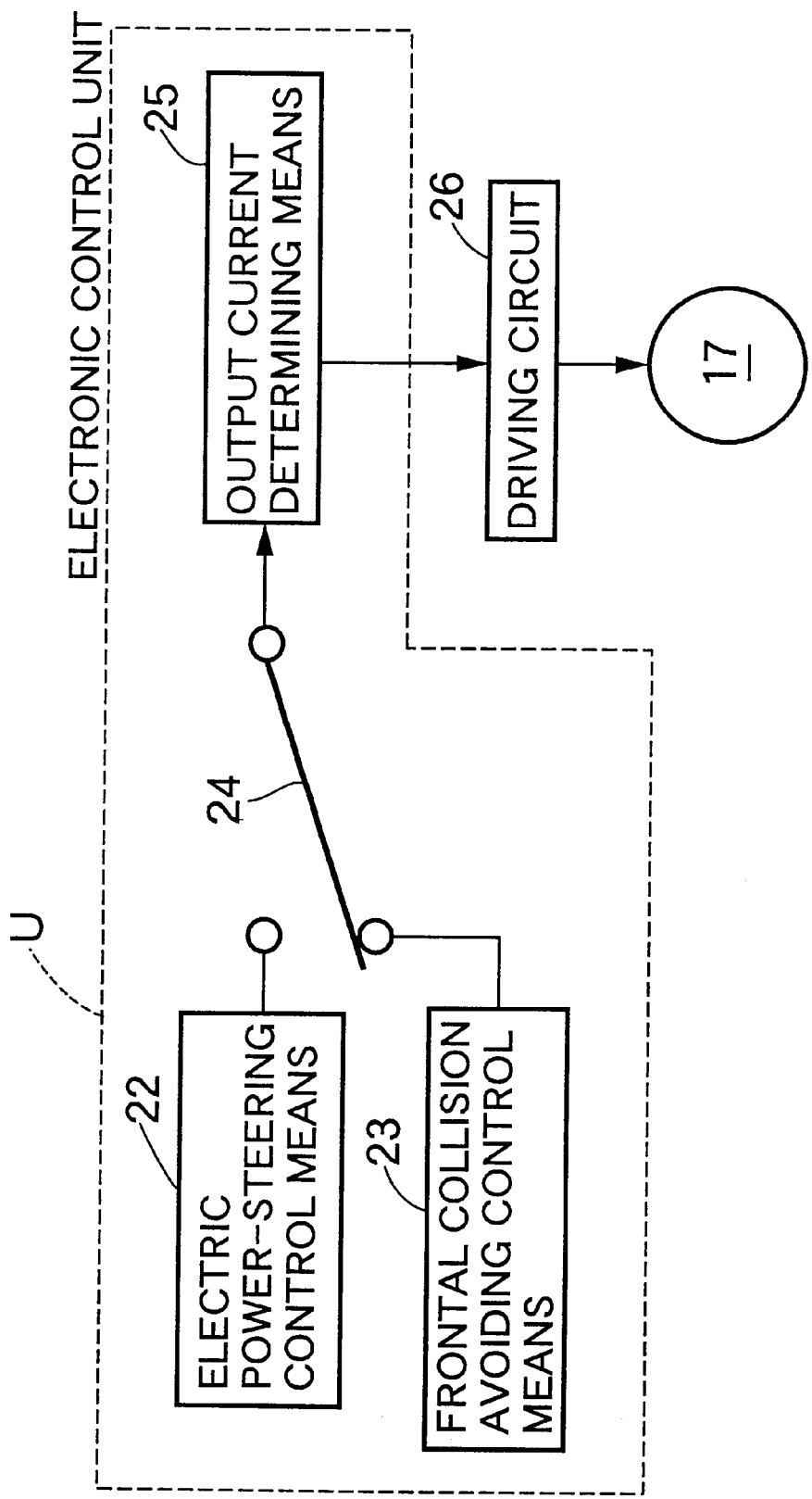

As shown in FIG. 4, the electronic control unit U includes an electric power-steering control means 22, a frontal collision avoiding control means 23, a switching means 24, and an output current determining means 25. In a normal state, the switching means 24 is connected to the electric power-steering control means 22, and the electric power-steering device 2 exhibits a normal power steering function. More specifically, the output current determining means 25 determines the current output to the actuator 17, so that the steering torque calculated based on the output from the steering torque sensor $S_2$ is a predetermined value depending on the vehicle speed calculated based on outputs from the vehicle speed sensors $S_5$. By outputting this output current to the actuator 17 through a driving circuit 26, the operation of the steering wheel 1 by the driver is assisted. On the other hand, if there is the possibility that the vehicle will collide with an on-coming vehicle, an automatic steering operation for avoiding the frontal collision of the vehicle with the on-coming vehicle is carried out by connecting the switching means 24 to the frontal collision avoiding control means 23 and controlling the driving of the actuator 17 by the frontal collision avoiding control means 23. The content of the automatic steering operation will be described in detail hereinafter.

Figure 5:
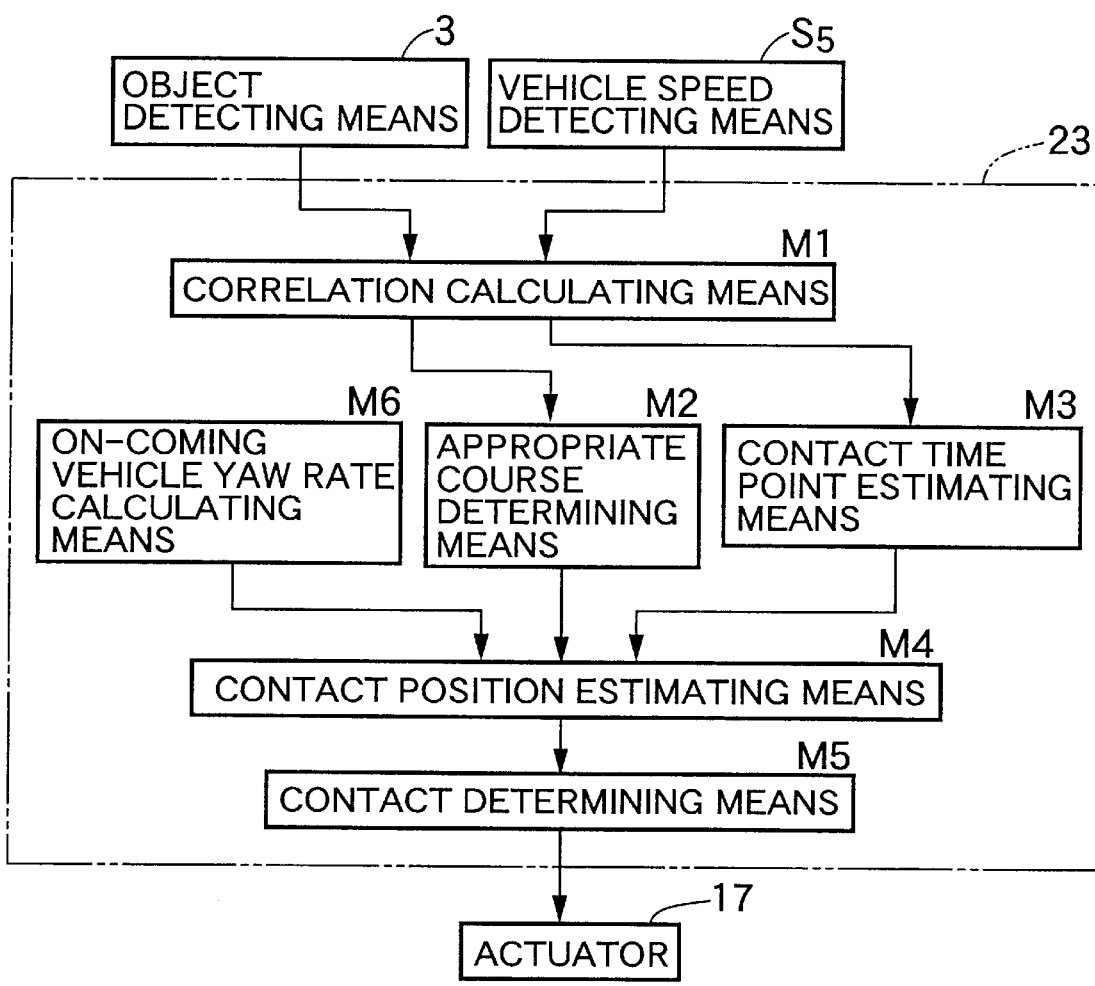

The arrangement of and the outline of the function of the frontal collision avoiding control means 23 will be described below with reference to FIG. 5.

The frontal collision avoiding control means 23 is comprised of a correlation calculating means M1, an appropriate course determining means M2, a contact time point estimating means M3, a contact position estimating means M4, a contact determining means M5, and an on-coming vehicle yaw rate calculating means M6.

The correlation calculating means M1 calculates the relative angle (a relative position) θ, the relative distance L and the relative speed Vs between the vehicle Ai and an on-coming vehicle Ao, based on outputs from the object detecting means (the radar device 3) and the vehicle speed detecting means (the vehicle speed sensors $S_5$). The appropriate course determining means M2 determines an intrinsic appropriate course R for the vehicle Ai which permits the vehicle Ai to appropriately pass the on-coming vehicle Ao. The contact time point estimating means M3 estimates the contact time when the vehicle Ai passes the on-coming vehicle Ao. The contact position estimating means M4 estimates a contact position P at which the vehicle Ai will come into contact with the on-coming vehicle Ao at the contact time. The contact determining means M5 determines the possibility of contact of the vehicle Ai with the on-coming vehicle Ao by comparing the contact position P with the appropriate course R. The contact position P, at which the vehicle Ai will come into contact with the on-coming vehicle Ao, is corrected based on a yaw rate $\gamma$o of the on-coming vehicle detected by the on-coming vehicle yaw rate calculating means M6 and a yaw rate $\gamma$i of the vehicle Ai detected by the vehicle yaw rate detecting means (vehicle yaw rate sensor $S_4$).

The operation of this embodiment will be described in detail with reference to flow charts shown in FIGS. 6 to 11.

Figure 6:
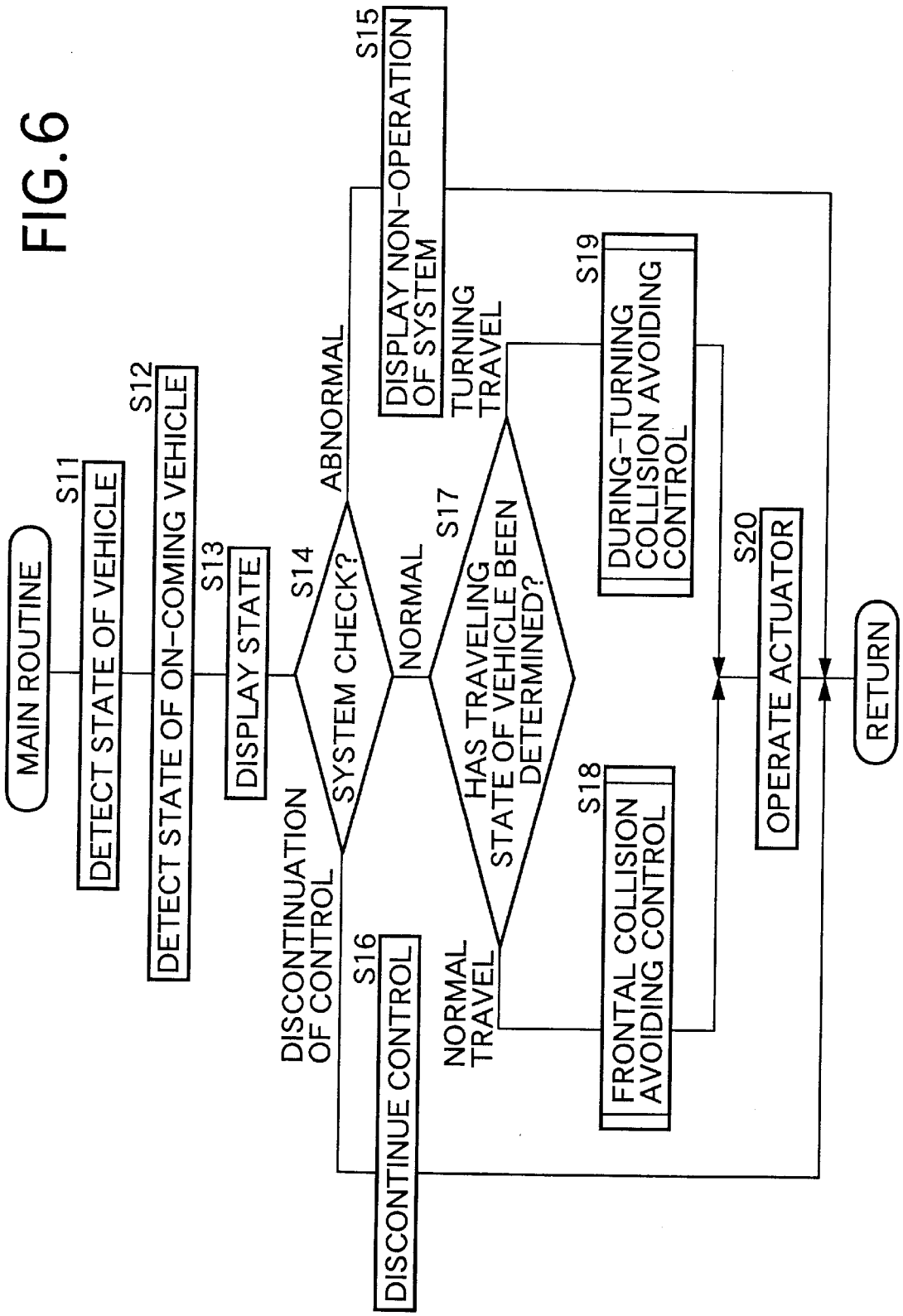

First, at Step S11 of a main routine shown in FIG. 6, the state of the vehicle is detected based on outputs from the steering angle sensor $S_1$, the steering torque sensor $S_2$, the lateral acceleration sensor $S_3$, the vehicle yaw rate sensor $S_4$ and the vehicle speed sensors $S_5$. At subsequent Step S12, the state of the on-coming vehicle is detected by the radar device 3. The radar device 3 detects a vehicle traveling ahead of the vehicle (which will be referred to as a preceding vehicle), a footbridge, a signpost, a cat's eye and the like in addition to the on-coming vehicle, but can discriminate the on-coming vehicle from other objects based on the relative speed between the on-coming vehicle and the vehicle. Then, at Step S13, the state of the vehicle and the state of the on-coming vehicle are displayed by the indicator 4.

At subsequent Step S14, it is checked to determine whether the frontal collision avoiding control is being carried out properly based on results of the detection by the radar device 3 and the sensors $S_1$ to $S_5$. The frontal collision avoiding control is carried out only when the driver does not perform an excessive traveling of the vehicle. For example, during traveling of the vehicle at a very high speed, the operation of the system is discontinued at Step 15, and the driver is informed of this fact by the indicator 4 and pressed for an appropriate driving operation. When it is detected that the driver has performed a spontaneous steering operation to avoid the frontal collision with the on-coming vehicle, as a result of the system check at Step S14, the frontal collision avoiding control is discontinued at Step S16, returning to the normal electric power-steering control, and at the same time, informing the driver of this fact by the indicator 4. Thus, it is possible to avoid interference of the driver's spontaneous steering operation with the automatic steering control operation of the frontal collision avoiding control.

If the result of the system check at Step S14 is normal, the traveling state of the vehicle is determined at Step S17. If the vehicle is in traveling state near a straight traveling state, and the time of passing of the vehicle by the on-coming vehicle (the time of collision) and the positional relation between the vehicle and the on-coming vehicle at that time can be estimated properly based on the results of detection by the radar device 3 and the sensors $S_1$ to $S_5$, the processing is advanced to the Step S18, where the frontal collision avoiding control is carried out. On the other hand, if the vehicle is not in an excessive traveling state, but is being turned at a strong degree, and the time of passing of the vehicle by the on-coming vehicle (collision of the vehicle with the on-coming vehicle) and the positional relation between the vehicle and the on-coming vehicle at that time cannot be estimated properly, the processing is advanced to Step S19, where a during-turning collision avoiding control is carried out. At Step S20, the actuator 17 of the electric power-steering device 2 is operated based on the frontal collision avoiding control or the during-turning collision avoiding control in order to avoid the collision of the vehicle with the on-coming vehicle.

Figure 7:
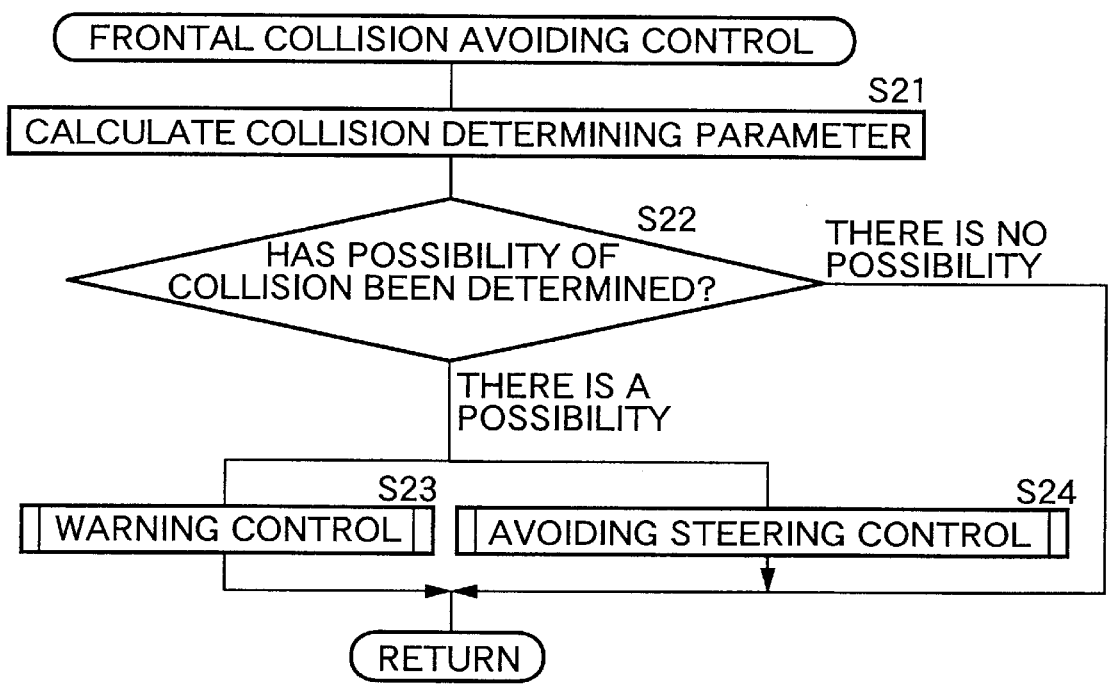

The content of "frontal collision avoiding control" at Step S18 will be described with reference to the flow chart shown in FIG. 7.

First, at Step S21, a collision determining parameter representing the degree of the possibility of collision of the vehicle with the on-coming vehicle, i.e., the lateral deviation $\delta$d between the vehicle and the appropriate course R at a time when the vehicle passes the on-coming vehicle (or at a time when the vehicle collides with the on-coming vehicle), is calculated. At Step S22, the presence or absence of the possibility of collision is determined by comparing the lateral deviation $\delta$d with a threshold value which will be described hereinafter. When there is a possibility of collision and this possibility is small, the alarm 5 is operated at Step S23 to give a warning to the driver. When there is a possibility of collision and this possibility is large, the warning is given at Step S24 and at the same time, the actuator 17 is operated to carry out the automatic steering operation for avoiding of the on-coming vehicle. The particular contents of "collision of determination" at Step 22, "warning control" at Step S23 and "avoiding steering control" at Step S24 will be described in detail hereinafter with reference to FIGS. 9, 10 and 11.

Figure 8:
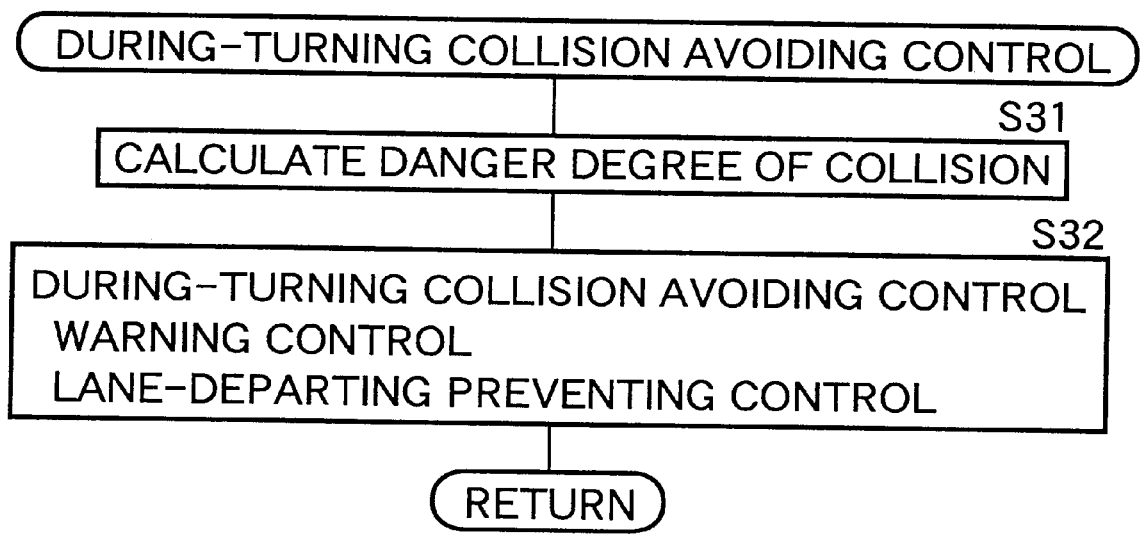

The content of "during-turning collision avoiding control" at Step S19 will be described below with reference to the flow chart shown in FIG. 8.

First, a danger degree of collision during turning of the vehicle is calculated at Step S31. The danger degree of collision is determined based on an absolute value of the difference between the radius of turning of the vehicle and the radius of turning of the on-coming vehicle. It is determined that the danger degree is higher, as the absolute value of the difference becomes larger. Then, a warning control and a lane-departing preventing control in accordance with the danger degree of collision, are carried out at Step S32. During turning of the vehicle, it is difficult to properly estimate the time when the vehicle passes the on-coming vehicle and the positional relation between the vehicle and the on-coming vehicle at that time, and for this reason, the collision avoiding control is weaker in intensity than that during straight traveling of the vehicle.

Figure 12:
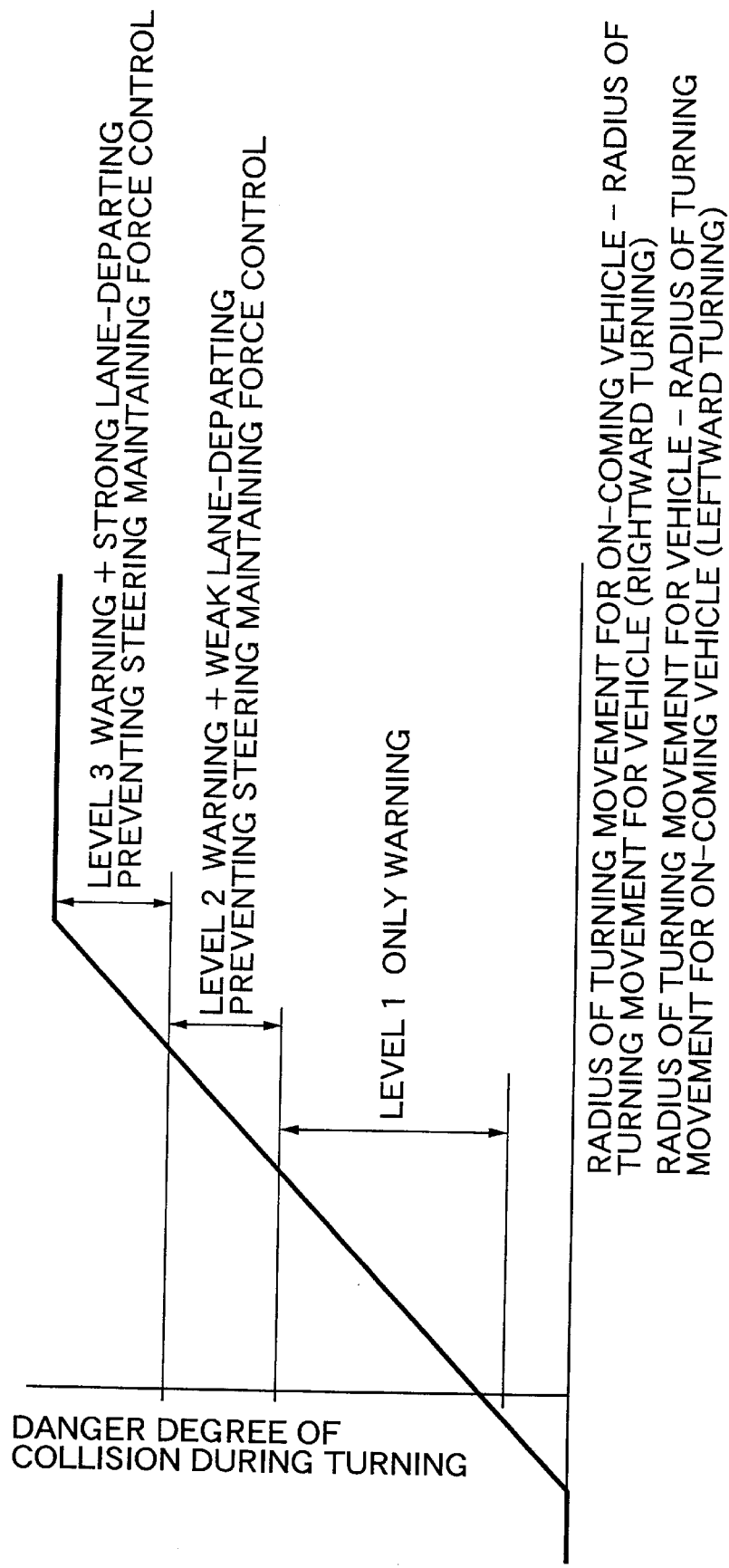

As shown in FIG. 12, the danger degree of collision during turning of the vehicle is set at three stages: a level 1, a level 2 and a level 3. The levels are determined based on the radius of turning of the on-coming vehicle minus the radius of turning of the vehicle, for example, if the vehicle is being turned to the right in a left-side drive road, and based on the radius of turning of the vehicle minus the radius of turning of the on-coming vehicle, if the vehicle is being turned to the left. When the danger degree is at the lower level 1, only the warning by the alarm 4 is carried out. When the danger degree is at the medium level 2, the warning by the alarm 4 and the weaker lane-departing preventing control by the actuator 17 are carried out. When the danger degree is at the higher level 3, the warning by the alarm 4 and the stronger lane-departing preventing control by the actuator 17 are carried out. When the driver has conducted the steering in a direction to depart from a lane, the lane-departing preventing control drives the actuator 17 of the electric power-steering device 2 to generate a steering reaction force hindering such steering to prevent the departing from the lane.

In the warning in the "during-turning collision avoiding control", the tone of the buzzer or the color of the lamp of the alarm 5 is different from that in the "frontal collision avoiding control" in order to distinguish the warnings from each other.

Figure 14:
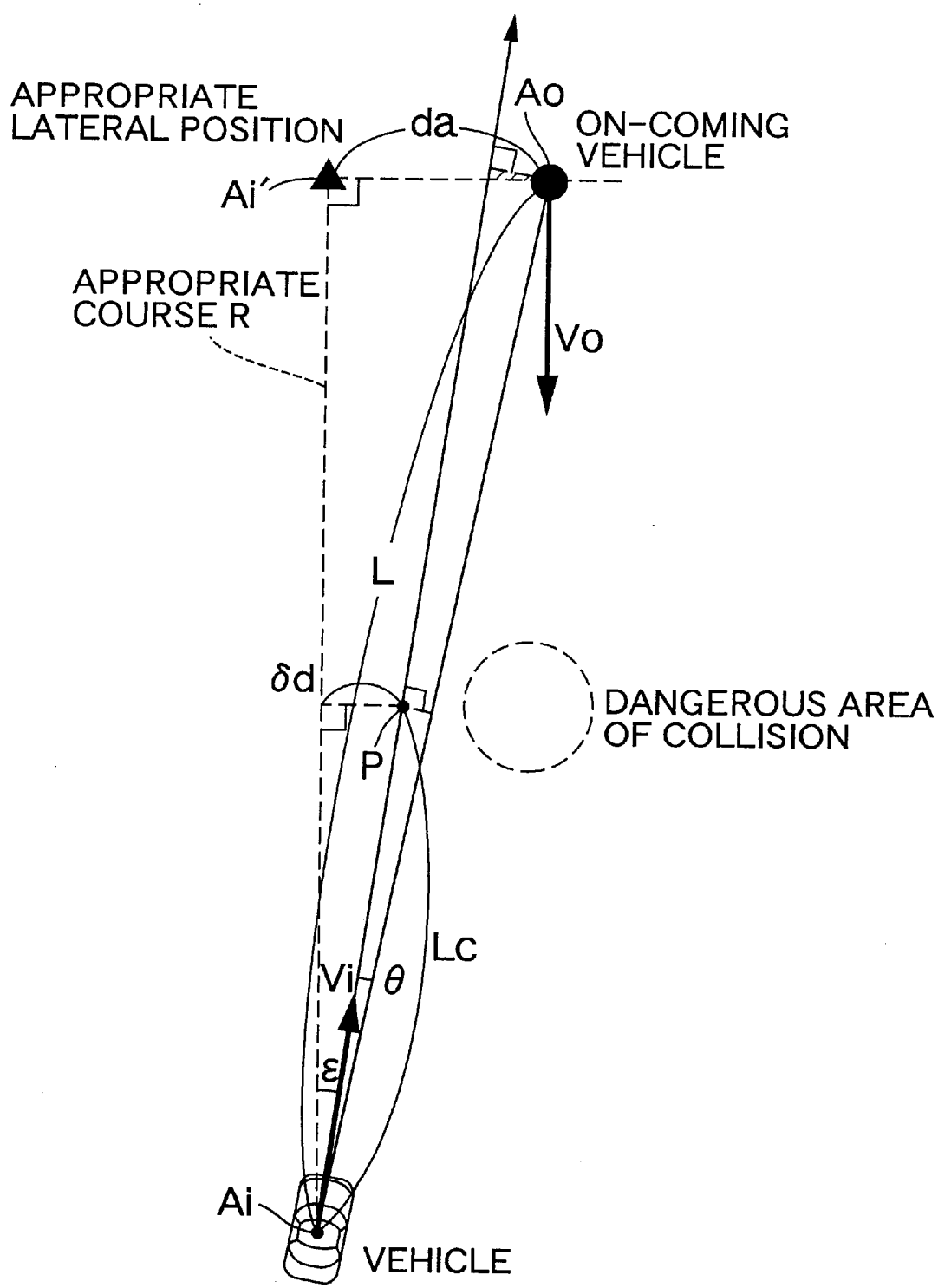
Figure 15:
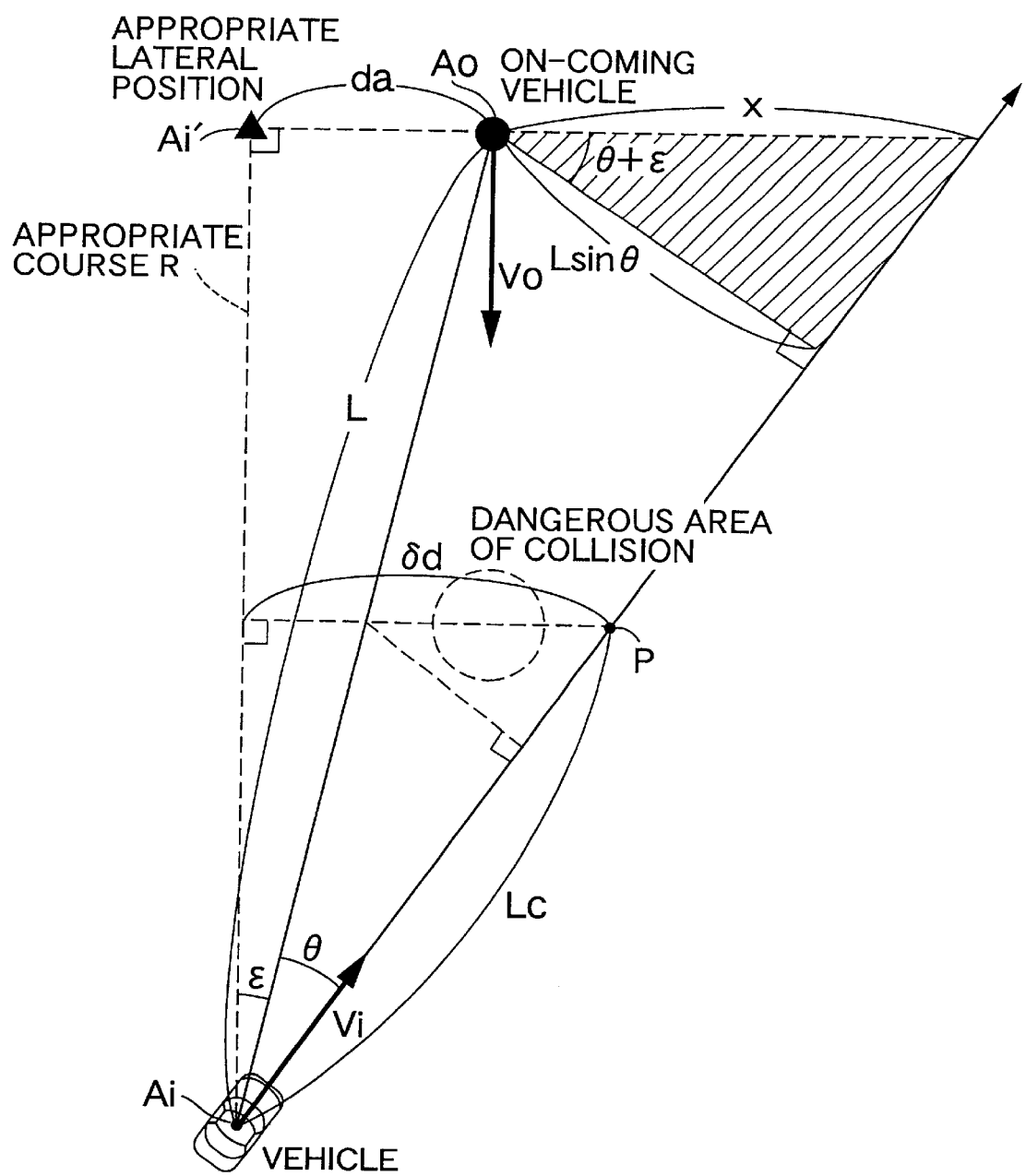

The content of "collision determination" at Step S22 will be described below with reference to the flow chart shown in FIG. 9 and the diagrams shown in FIGS. 13 to 15.

First, at Step S41, the vehicle speed Vi of the vehicle Ai is calculated based on outputs from the vehicle speed sensors $S_5$. At Step S42, the yaw rate $\gamma i$ of the vehicle Ai is calculated based on an output from the vehicle yaw rate sensor $S_4$. At Step S43, the relative distance L between the vehicle Ai and the on-coming vehicle Ao is calculated based on an output from the radar device 3. At Step S44, the relative speed Vs between the vehicle Ai and the on-coming vehicle Ao is calculated based on the output from the radar device 3, and at Step S45, the relative angle θ between the vehicle Ai and the on-coming vehicle Ao is calculated based on the output from the radar device 3. At subsequent Step S46, an intrinsic appropriate course R for the vehicle Ai permitting the vehicle Ai to pass the on-coming vehicle without collision is determined based on an appropriate lateral distance da measured from the current position of the on-coming vehicle Ao. The appropriate lateral distance da is determined in advance, and the value thereof is, for example, 3 m. At subsequent Step S47, the yaw rate γo of the on-coming vehicle Ao is calculated from the vehicle speed Vi and the yaw rate γi of the vehicle Ai and the positional relation of the on-coming vehicle Ao relative to the vehicle Ai. At Step S48, a lateral deviation δd between the vehicle Ai and the appropriate course R in a position at which the vehicle Ai will pass the on-coming vehicle Ao (in the contact position P) is calculated. A course of calculating the lateral deviation δd will be described below in detail with reference to FIG. 13.

Figure 13:
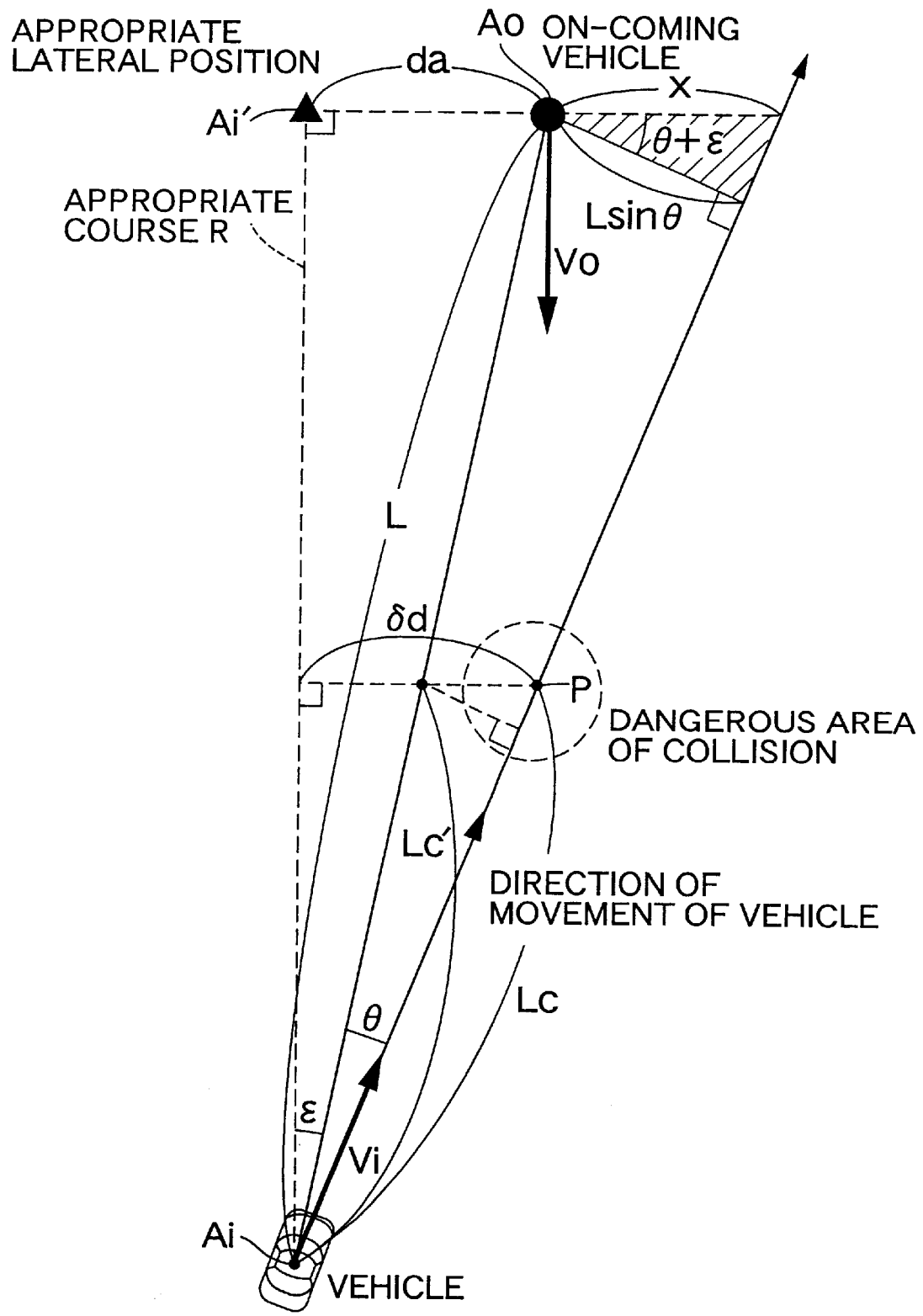

FIG. 13 shows a state at which on a left-side drive road the vehicle Ai enters by mistake, into a lane in which an on-coming vehicle is traveling. In FIG. 13, an appropriate lateral position Ai' is on an appropriate course R for the vehicle Ai and is a position lying in the lateral direction of the current position of the on-coming vehicle Ao. The distance between the appropriate lateral position Ai' and the on-coming vehicle Ao is an appropriate lateral distance da (e.g., 3 m). L is the relative distance between the vehicle Ai and the on-coming vehicle Vo and is calculated based on the output from the radar device 3. θ is the relative angle between the vehicle Ai and the on-coming vehicle Vo and is calculated based on the output from the radar device 3. ε is an angle between the direction of the appropriate course R for the vehicle Ai and the direction of the oncoming vehicle Ao and is geometrically determined based on the relative distance L and the appropriate lateral distance da. Vi is the vehicle speed of the vehicle Ai and is calculated based on outputs from the vehicle speed sensors $S_5$. Vs is the relative vehicle speed corresponding to a difference between the vehicle speed Vi of the vehicle Ai and the vehicle speed Vo of the on-coming vehicle Ao, and is calculated based on the output from the radar device 3.

In FIG. 13, in a triangle indicated by drawing oblique lines, the following equation is established:

$$X \cos(\theta+\epsilon) = L \sin \theta \qquad (1)$$

If this equation is solved for X, the following equation is given:

$$X = L \sin \theta / \cos(\theta+\epsilon) \qquad (2)$$

a contact time tc measured based on the present time point (the time lapsed to a passing-by time point or the collision time point) is provided as a value of the relative distance L divided by the relative speed Vs.

$$tc = L/Vs \qquad (3)$$

A distance Lc from the vehicle Ai to the contact position P (the passing position or the collision position) is provided as the product between the vehicle speed Vi and the contact time tc.

$$Lc = Vi \cdot tc = L(Vi/Vs) \qquad (4)$$

As can be seen from FIG. 13, from the similar relation between two right-angled triangles commonly having an apex of the angle θ+ε in the position of the vehicle Ai, the following equation is established:

$$Lc':L = \delta d:da+X \qquad (5)$$

Further, the lateral deviation δd is provided according to the following equation from the relation of Lc"cos ε=Lc cos(θ+ε) and the equations (2), (4) and (5).

$$\delta d = \frac{Vi \cos(\theta+\varepsilon)}{Vs \cos \varepsilon}\left\{da + \frac{L \sin \theta}{\cos(\theta+\varepsilon)}\right\} \qquad (6)$$

Among five variables in the right side of the equation (6), Vi is capable of always being calculated, and Vs, L, θ and ε are capable of being calculated in one cycle of the transmission and reception by the radar device 3. Therefore, the lateral deviation δd can be calculated immediately at the time point when the on-coming vehicle Ao is first distinguished by the radar device 3. Thus, even when there is not sufficient contact time tc, because the vehicle Ai and the on-coming vehicle Ao are approaching each other, the determination of the contact possibility can be carried out promptly to start the collision avoiding control.

Figure 9:
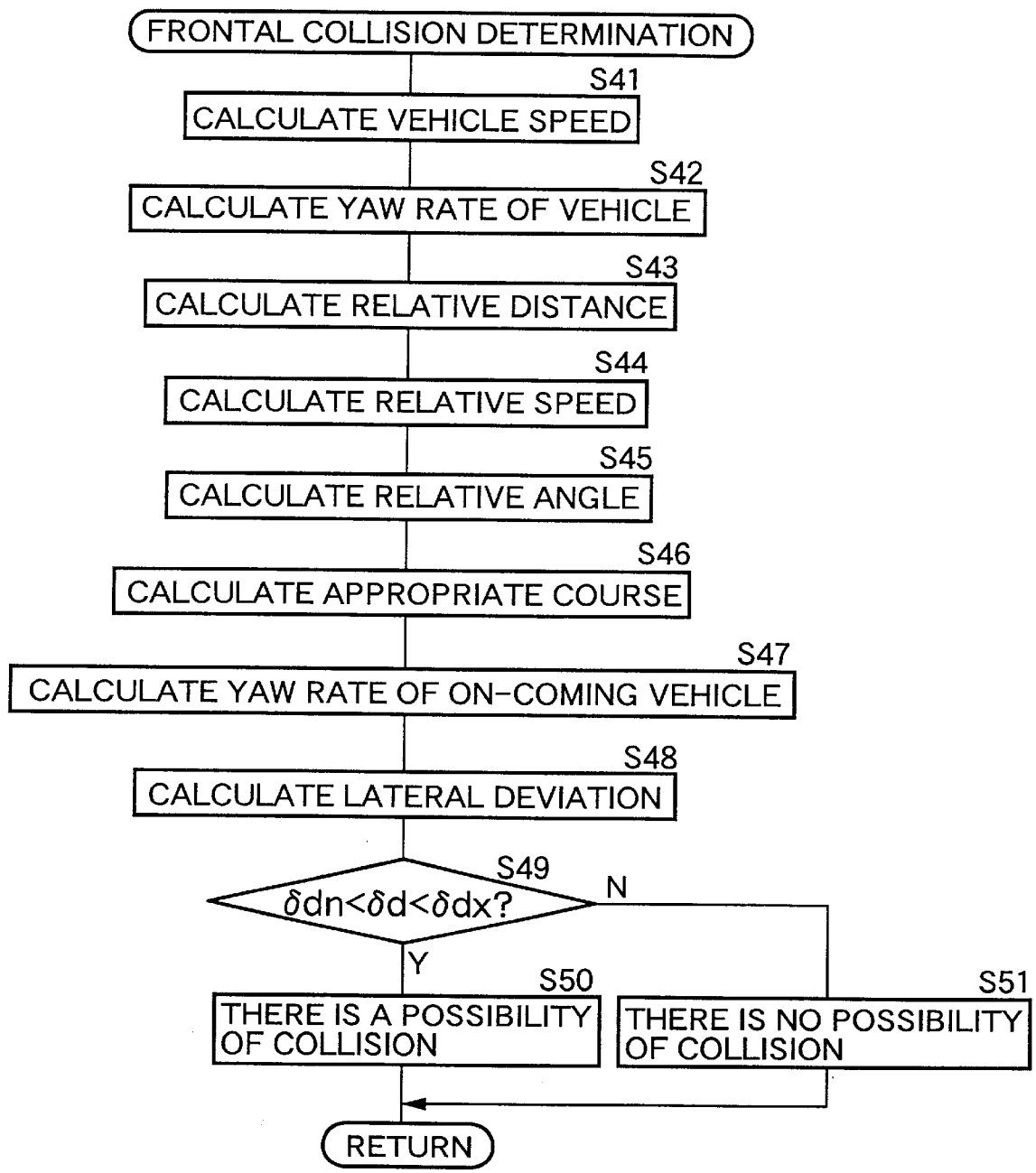

At Step S49 of the flow chart in FIG. 9, the lateral deviation δd is compared with a preset contact determining reference value. If the lateral deviation δd is between a first contact determining reference value δdn and a second contact determining reference value δdx, i.e., δdn<δd<δdx is established, it is determined at Step S50 that there is the possibility that the vehicle Ai will collide with the on-coming vehicle Ao (see FIG. 13). On the other hand, if δd≦δdn as shown in FIG. 14, or if δd≧δdx as shown in FIG. 15, it is determined at Step S51 that there is no possibility that the vehicle Ai will collide with the on-coming vehicle Ao. The state shown in FIG. 15 corresponds to, for example, the case where the vehicle Ai obliquely crosses the traveling lane of the on-coming vehicle Ao to enter into a diverging road.

The first contact determining reference value δdn and the second contact determining reference value δdx are set properly in accordance with the width of the vehicle Ai. For example, the first contact determining reference value δdn is equal to 1.5 m, and the second contact determining reference value δdx is equal to 4.5 m.

In the above description, the yaw rate γi of the vehicle Ai and the yaw rate γo of the on-coming vehicle Ao are not taken into consideration in calculating the lateral deviation δd, but the collision avoidance of a further higher accuracy is achieved by taking the yaw rates γi and γo into consideration.

When the vehicle Ai travels at the vehicle speed Vi and the yaw rate γi, a lateral acceleration of Viγi is generated, and hence, the amount yi of lateral movement of the vehicle Ai is calculated by integrating Viγi two times. Therefore, the amount yi of lateral movement of the vehicle Ai at the contact time tc=L/Vs is provided according to the following equation:

$$yi = (Vi \cdot \gamma i/2) \cdot (L/Vs)^2 \quad (7)$$

Likewise, when the on-coming vehicle travels at the vehicle speed Vo and the yaw rate γo, a lateral acceleration of Voγo is generated and hence, the amount yo of lateral movement of the on-coming vehicle Ao is calculated by integrating Voγo two times. Therefore, the amount yo of lateral movement of the on-coming vehicle Ao at the contact time tc=L/Vs is provided according to the following equation:

$$yo = (Vo \cdot \gamma o/2) \cdot (L/VS)^2 \quad (8)$$

Thus, the accuracy of the lateral deviation δd can be further enhanced by using the following equation provided by correcting the lateral deviation δd in the equation (6) by the amount yi of lateral movement of the vehicle Ai and the amount yo of lateral movement of the on-coming vehicle Ao.

$$\delta d = \frac{Vi \cos(\theta + \varepsilon)}{Vs \cos \varepsilon} \left\{ da + \frac{L \sin \theta}{\cos(\theta + \varepsilon)} \right\} + yi + yo \quad (9)$$

If the position of the on-coming vehicle Ao is detected a plurality of times based on the output from the radar device 3, whereby a locus of turning movement of the on-coming vehicle Ao is estimated, the yaw rate γo of the on-coming vehicle Ao is calculated based on the radius of turning movement and the vehicle speed Vo of the on-coming vehicle Ao. Therefore, the yaw rate γo of the on-coming vehicle Ao cannot be detected in one cycle of the transmission and reception by the radar device 3, and a short calculating time is required to conduct the correction using the yaw rate γo of the on-coming vehicle Ao in the equation (9). However, as described at Step S17 of the flow chart in FIG. 6, the frontal collision avoiding control is carried out when the vehicle Ao is traveling substantially straight (traveling on a straight road). At this time, the yaw rate γo of the on-coming vehicle Ao rarely assumes a larger value. From this, a sufficient accuracy can be ensured even if the correction using the yaw rate γo of the on-coming vehicle Ao is not made, In place of determining the first contact determining reference value δdn and the second contact determining reference value δdx as fixed values, the first contact determining reference value δdn and the second contact determining reference value δdx are corrected in traveling states of the vehicle Ai and the on-coming vehicle Ao at a time point when the lateral deviation δd is calculated, the frontal collision avoiding control can be carried out at greater accuracy. More specifically, the correction of the first contact determining reference value δdn is carried out using three correcting factors k1n, k2n and k3n according to the following expression:

$$\delta dn \leftarrow k1n \cdot k2n \cdot k3n \cdot \delta dn \quad (10)$$

The correction of the second contact determining reference value δdx is carried out using three correcting factors k1x, k2x and k3x according to the following expression:

$$\delta dx \leftarrow k1x \cdot k2x \cdot k3x \cdot \delta dx \quad (11)$$

Figure 16A:
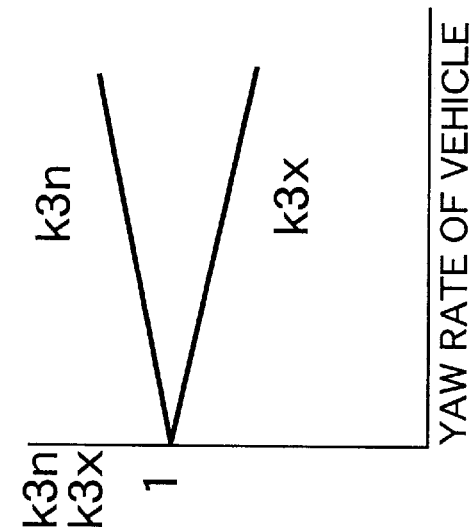
FIGS. 16A to 16C are maps for searching a correcting factor for the lateral deviation δd.

The correcting factors k1n and k1x are searched based on a time to the collision (the contact time tc) from a map shown in FIG. 16A. In a region at which the error of calculation of the lateral deviation δd is estimated to be small, because of the small contact time tc, the correcting factors k1n and k1x are maintained at 1. In a region at which the error of calculation of the lateral deviation δd is estimated to be large, because of the large contact time tc, the correcting factor k1n is increased from 1 with an increase in contact time tc, while the correcting factor k1x is decreased from 1 with an increase in contact time tc. Thus, in the region at which the error of calculation of the lateral deviation δd is larger, the difference between the first and second contact determining reference values δdn and δdx can be decreased, thereby avoiding unreliable frontal collision avoiding control.

Figure 16B:
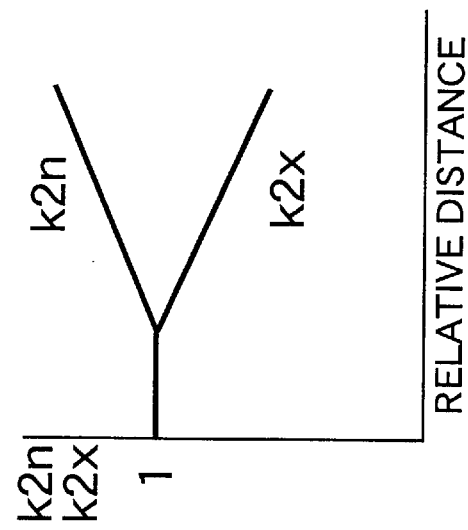

The correcting factors k2n and k2x are searched based on the relative distance L between the vehicle Ai and the on-coming vehicle Ao from a map shown in FIG. 16B. In a region at which the error of calculation of the lateral deviation δd is estimated to be small, because of the small relative distance L, the correcting factors k2n and k2x are maintained at 1. In a region at which the error of calculation of the lateral deviation δd is estimated to be large, because of the large relative distance L, the correcting factor k2n is increased from 1 with an increase in relative distance L, while the correcting factor k2x is decreased from 1 with an increase in relative distance L. Thus, in the region at which the error of calculation of the lateral deviation δd is larger, the difference between the first and second contact determining reference values δdn and δdx can be decreased, thereby avoiding unreliable frontal collision avoiding control.

Figure 16C:
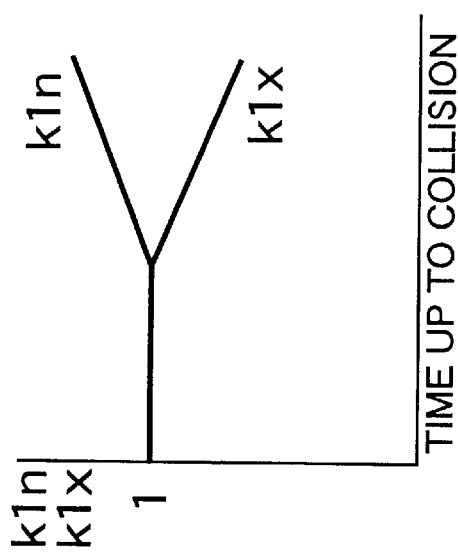

The correcting factors k3n and k3x are searched based on the yaw rate γi of the vehicle Ai from a map shown in FIG. 16C. When it is estimated that the yaw rate γi of the vehicle Ai is 0 (zero) and the error of calculation of the lateral deviation δd is small, the correcting factors k3n and k3x are set at 1. When the error of calculation of the lateral deviation δd is increased with an increase in the yaw rate δi of the vehicle Ai, the correcting factor k3n is increased from 1, while the correcting factor k3x is decreased from 1. Thus, in the region at which the error of calculation of the lateral deviation δd is larger, the difference between the first and second contact determining reference values δdn and δdx can be decreased, thereby avoiding unreliable frontal collision avoiding control.

Figure 10:
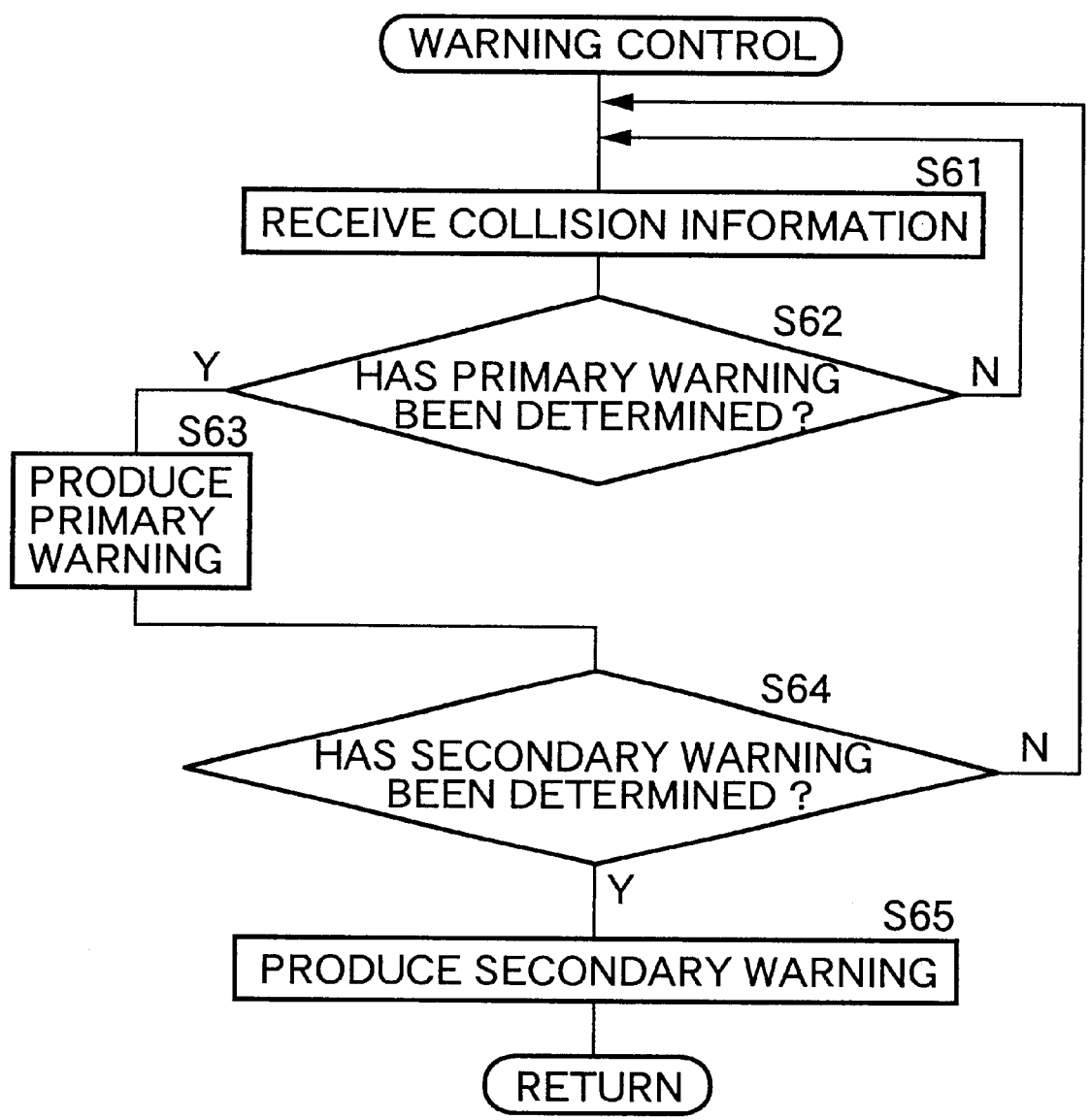

The content of "warning control" at Step S23 will be described below with reference to the flow chart in FIG. 10.

First, collision information is received at Step S61. The collision information is the contact time tc (the time up to the collision), the traveling states of the vehicle Ai and the on-coming vehicle Ao at the contact position P, the lateral deviation δd and the like. At subsequent Step S62, the determination of a primary warning is carried out. If the contact time tc is short, for example, less than 4 seconds, the alarm 5 is operated at Step S63 to start the primary warning. Then, the determination of a secondary warning is carried out at Step S64. If the contact time tc is short, for example, less than 3 seconds, the alarm 5 is operated at Step S65 to start the secondary warning. The primary warning is carried out, when the time margin to the collision is relatively large, and the secondary warning is carried out, when the time margin to the collision is relatively small. The tone of the buzzer or the color of the lamp is varied in order to allow the driver to recognize the difference between the primary and secondary warnings. The driver can recognize the danger of collision by the warning provided by the alarm 5 to carry out a spontaneous avoiding operation.

Figure 11:
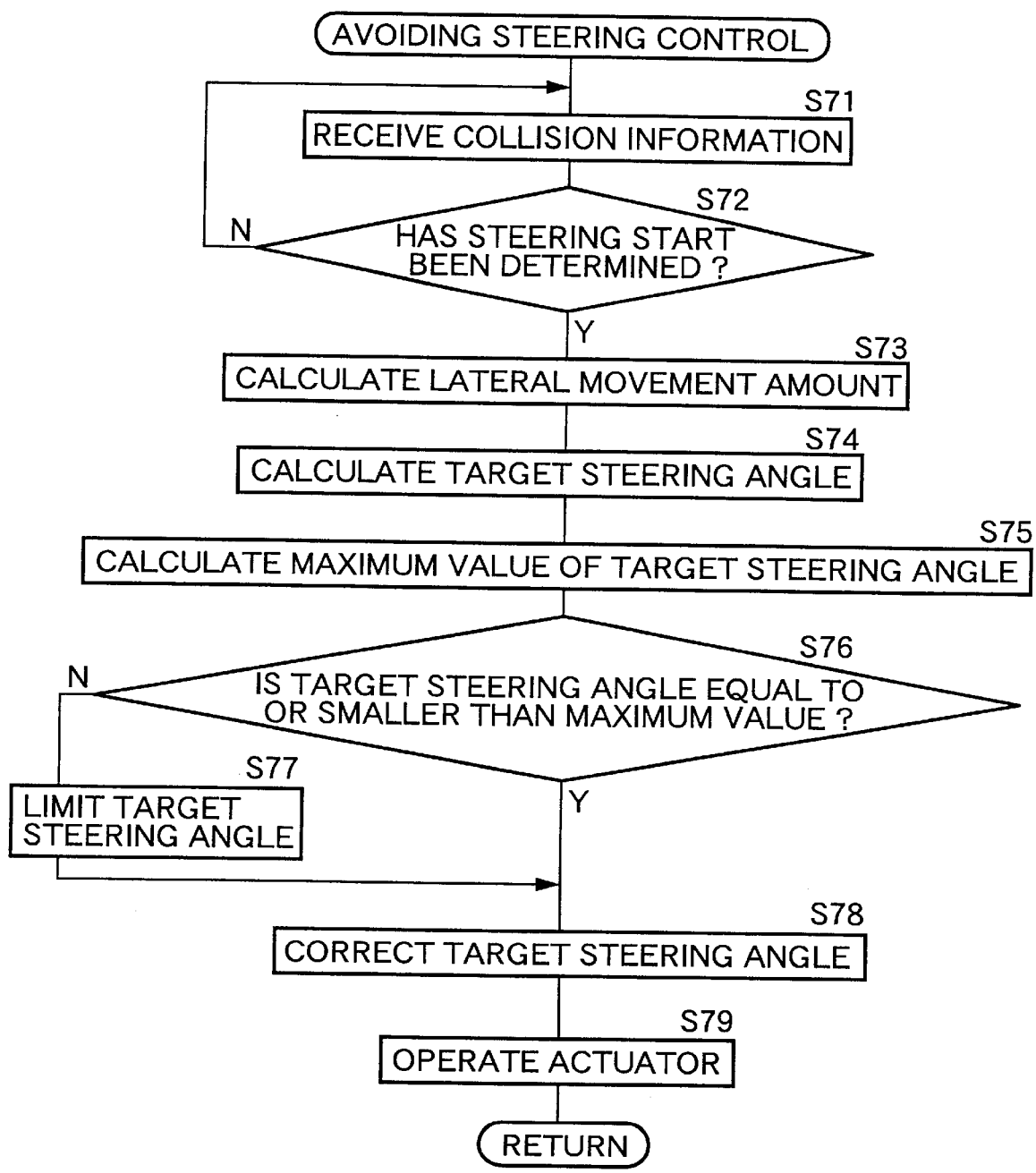

The content of "avoiding steering control" at Step S24 will be described below with reference to the flow chart in FIG. 11.

First, collision information similar to that in at Step S61 is received at Step S71 and then, the determination of a steering start is carried out at Step S72. If the contact time tc is shorter than a threshold value $\tau_0$ (e.g., 2.2 seconds) which is less than 3 seconds which is a threshold value for the secondary warning, the amount of lateral movement of the vehicle for avoiding the collision is calculated at Step S73. A current value of the lateral deviation δd calculated at Step S48, is applied for the amount of lateral movement, but in order to eliminate an error, averaging is carried out using a last value. At and after subsequent Step S74, a control quantity for the avoiding operation is calculated.

Figure 17A:
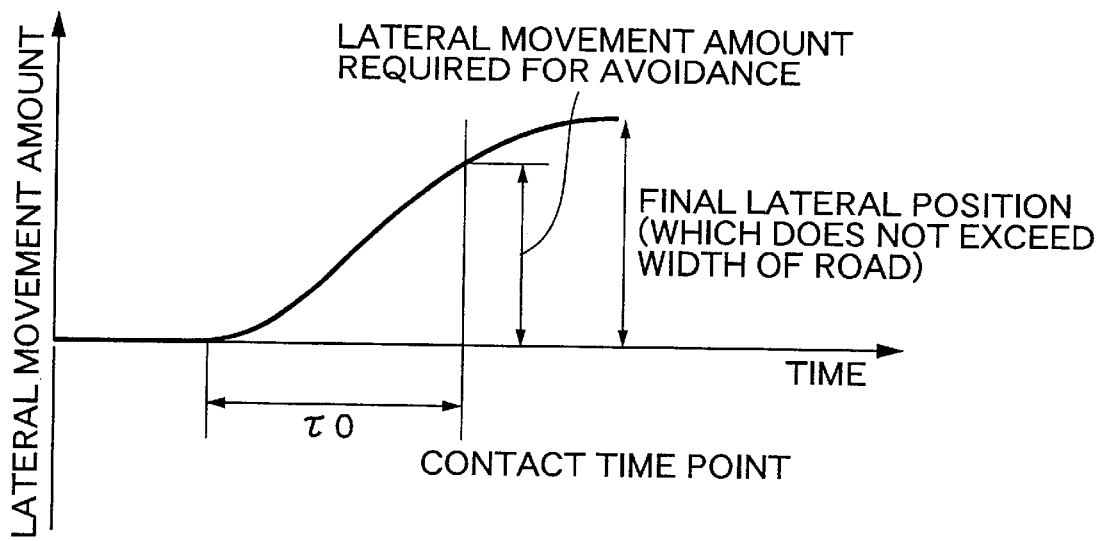
FIGS. 17A and 17B are diagrams for explaining methods for calculating a target steering angle for avoiding the collision.
Figure 17B:
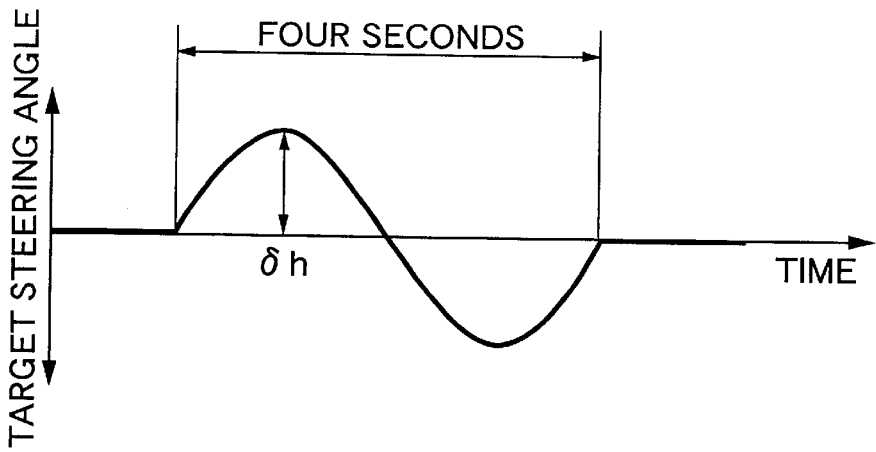
Figure 18:
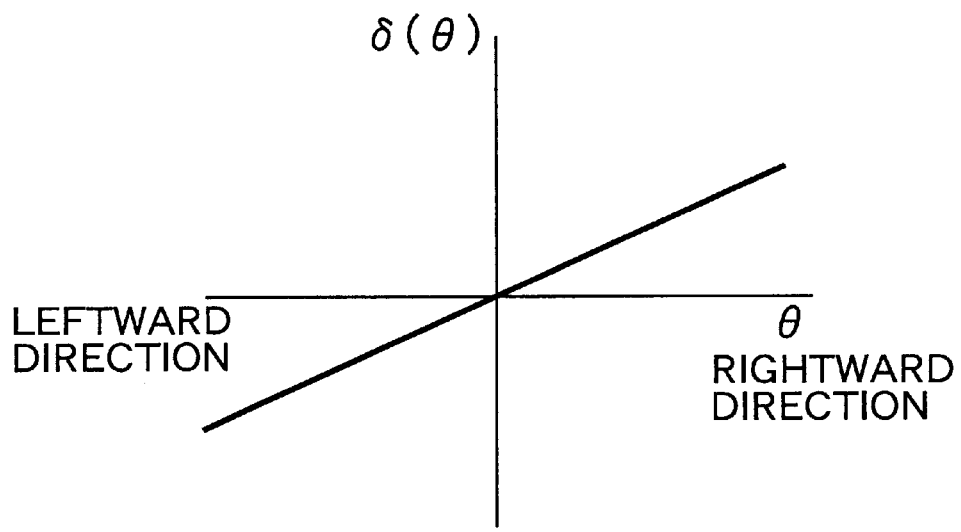

First, at Step S74, a target steering angle δh giving no sense of incompatibility to the driver is determined based on the vehicle speed Vi of the vehicle Ai. As shown in FIGS. 17A and 17B, the avoiding motion is carried out so that the vehicle Ai is returned to the original course after avoiding the on-coming vehicle Ao. A reference value for the amount of lateral movement at a time point when the contact time tc (the threshold value $\tau_0$) has lapsed, is set at, for example, 2 m in consideration of the effect of collision avoidance and the fact that the vehicle does not finally depart from the lane. It must be ensured that a sense of incompatibility is prevented from being provided to the driver because the maximum lateral acceleration YG generated by the avoiding steering is too large, or because the steering speed is too high, and that when $\tau_0$ has lapsed from the start of the steering, the lateral movement of 2 m is conducted. From the forgoing, in this embodiment, for example, the maximum lateral acceleration YG is set at a value on the order of 0.15 G, and the steering period is set at a value on the order of 4 seconds (0.25 Hz).

Thus, the target steering angle δh for avoiding the collision is given according to the following equation:

$$\delta h = \frac{YG \cdot N \cdot (1 + Ks \cdot Vi^2)}{Vi^2} \quad (12)$$

wherein N represents the steering gear ratio, and Ks represents a stability factor.

If the direction of the relative angle θ between the vehicle Ai and the on-coming Ao is from the vehicle Ai toward the on-coming vehicle Ao, it is considered that the lateral movement may be insufficient in some cases at the target steering angle δh given in the above equation (12). Therefore, the target steering angle δh given in the above equation (12) is corrected by a target steering angle correcting value δ (θ) (see FIG. 18) based on the relative angle θ.

$$\delta h = \frac{YG \cdot N \cdot (1 + Ks \cdot Vi^2)}{Vi^2} + \delta(\theta) \quad (13)$$

Figure 19:
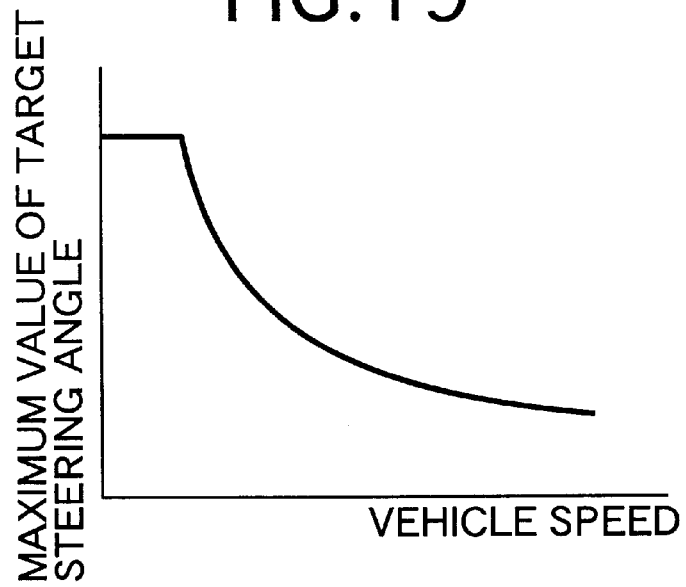

At subsequent Step S75, a maximum value δhx for the target steering angle δh is calculated based on a map shown in FIG. 19. If the target steering angle δh exceeds the maximum value δhx at Step S76, the correction is carried out, so that the upper limit value for the target steering angle δh is limited by the maximum value δhx at Step S77. This correction makes it possible to prevent an extremely large target steering angle δh from being employed to generate a steering angle which imparts a sense of incompatibility to the driver.

Then, at Step S78, the amount of lateral movement (i.e., the lateral deviation δd) calculated at Step S73 is compared with the amount of lateral movement generated by the target steering angle δh calculated at Steps S74 to S77. When the latter amount of lateral movement is larger than the former amount of lateral movement (i.e., the lateral deviation δd), namely, when the amount of lateral movement generated by the target steering angle δh is larger than the amount of lateral movement required for avoiding the collision, the target steering angle δh is corrected in the decreasing direction to a value permitting the required amount of lateral movement to be provided. On the other hand, when the latter amount of lateral movement is smaller than the former amount of lateral movement (i.e., the lateral deviation δd), namely, when the amount of lateral movement generated by the target steering angle δh is smaller than the amount of lateral movement required for avoiding the collision, the correction of the target steering angle δh is not carried out.

Figure 20:
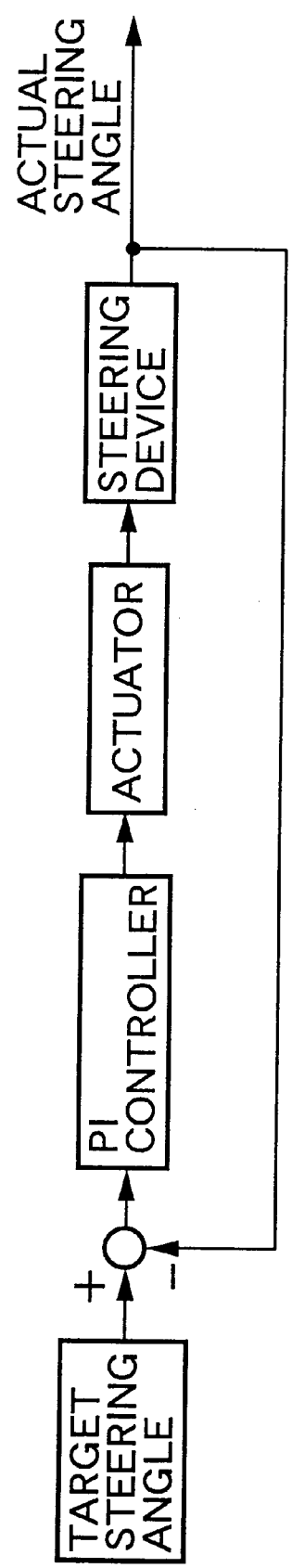

At Step S79, the driving of the actuator 17 of the steering device 11 is controlled in accordance with the target steering angle δh in order to avoid collision of the vehicle with the on-coming vehicle Ao. More specifically, a PI controller, to which a deviation between the target steering angle δh and the actual steering angle of the steering device 11 has been input, controls the actuator 17 of the steering device 11 in a feedback manner to converge the deviation to zero, as shown in FIG. 20.

A second embodiment of the present invention will now be described with reference to FIGS. 21 to 25D. In the second embodiment, the content of "during-turning collision avoiding control" at Step S19 of the main routine shown in FIG. 6 is further defined, and the other elements are the same as in the first embodiment.

Figure 21:
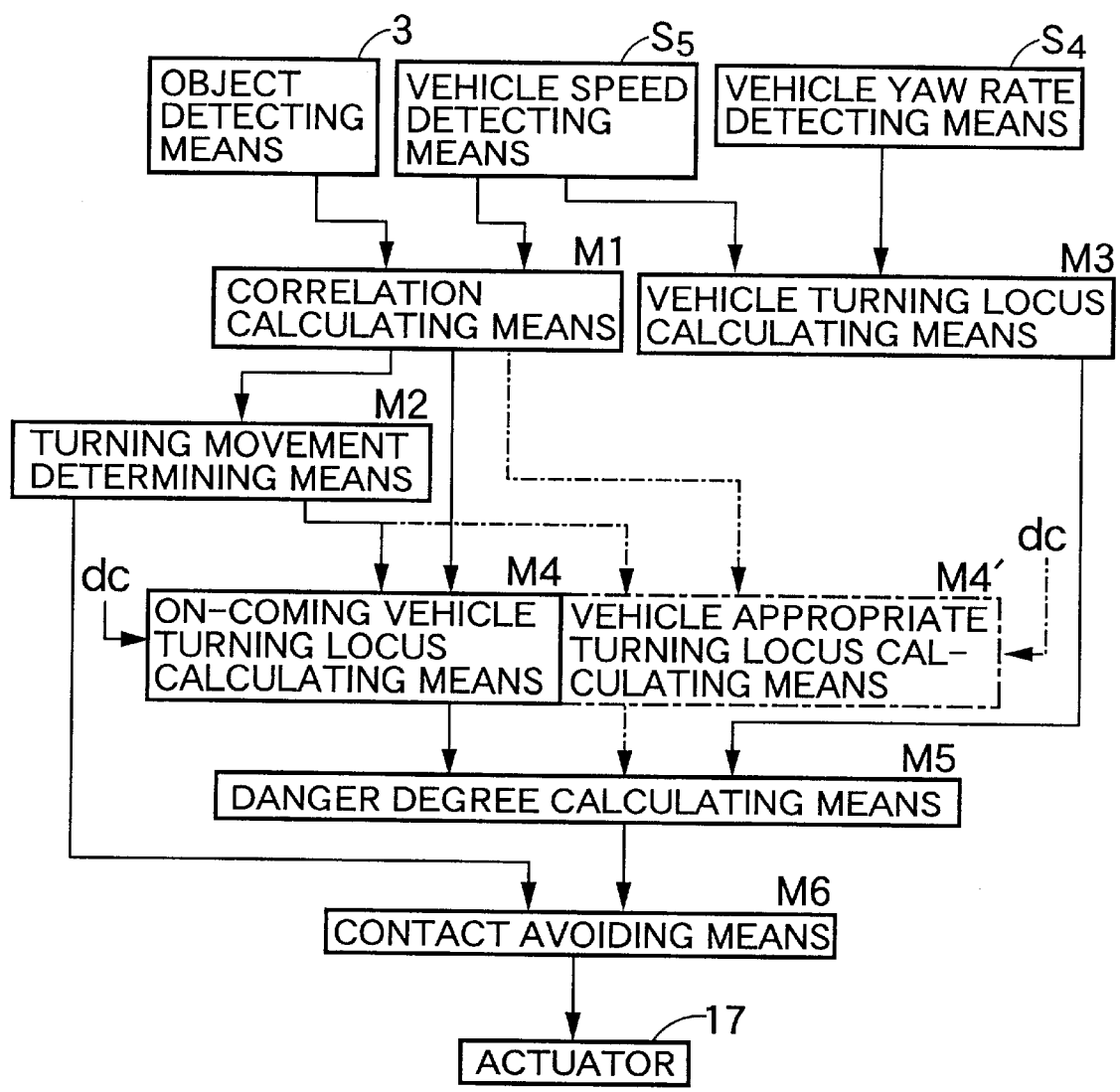

First, the arrangement and the outline of the function of a frontal collision avoiding control means 23 will be described with reference to FIG. 21.

The frontal collision avoiding control means 23 is comprised of a correlation calculating means M1, a turning movement determining means M2, a vehicle turning locus calculating means M3, an on-coming vehicle turning locus calculating means M4, a vehicle appropriate-turning locus calculating means M4', a danger-degree calculating means M5, and a contact avoiding means M6.

The correlation calculating means M1 calculates the relative angle (a relative position) θ, the relative distance L and the relative speed Vs between a vehicle Ai and an on-coming vehicle Ao based on outputs from the object detecting means (the radar device 3) and the vehicle speed detecting means (the vehicle speed sensors $S_5$). The turning movement determining means M2 determines whether the vehicle Ai and the on-coming vehicle Ao are being turned, based on the relative angle θ and the relative distance L between the vehicle Ai and the on-coming vehicle Ao. The vehicle turning locus calculating means M3 calculates the locus of turning movement for the vehicle Ai, based on the vehicle speed Vi of the vehicle Ai detected by the vehicle speed detecting means $S_5$ and the vehicle yaw rate γi detected by the vehicle yaw rate detecting means (the vehicle yaw rate sensor $S_4$).

The on-coming vehicle turning locus calculating means M4 calculates the locus of turning movement for the on-coming vehicle Ao, based on a preset appropriate lateral distance dc required for permitting the vehicle Ai and the on-coming vehicle Ao to pass each other appropriately, and based on the relative angle θ and the relative distance L between the vehicle Ai and the on-coming vehicle Ao. The vehicle appropriate-turning locus calculating means M4' can be replaced by the on-coming vehicle turning locus calculating means M4, and calculates an appropriate locus of turning movement for the vehicle Ai, based on the preset appropriate lateral distance dc required for permitting the vehicle Ai and the on-coming vehicle Ao to pass each other appropriately, and based on the relative angle θ and the relative distance L between the vehicle Ai and the on-coming vehicle Ao.

The danger-degree calculating means M5 calculates the degree of danger for the contact of the vehicle Ai with on-coming vehicle Ao, based on the locus of turning movement for the vehicle Ai and the locus of turning movement for the on-coming vehicle Ao, or based on the locus of turning movement for the vehicle Ai and the appropriate locus of turning movement for the vehicle Ai. When there is the possibility that the vehicle Ai will come into contact with the on-coming vehicle Ao, the contact avoiding means M6 controls the actuator 17 of the steering device 11 in order to avoid the contact.

The frontal collision avoiding control is carried out, when the vehicle and the on-coming vehicle are traveling substantially straight, and the during-turning collision avoiding control is carried out, when the vehicle and the on-coming vehicle are turning. It is determined in the following manner whether the vehicle and the on-coming vehicle are traveling substantially straight or turning.

Figure 24:
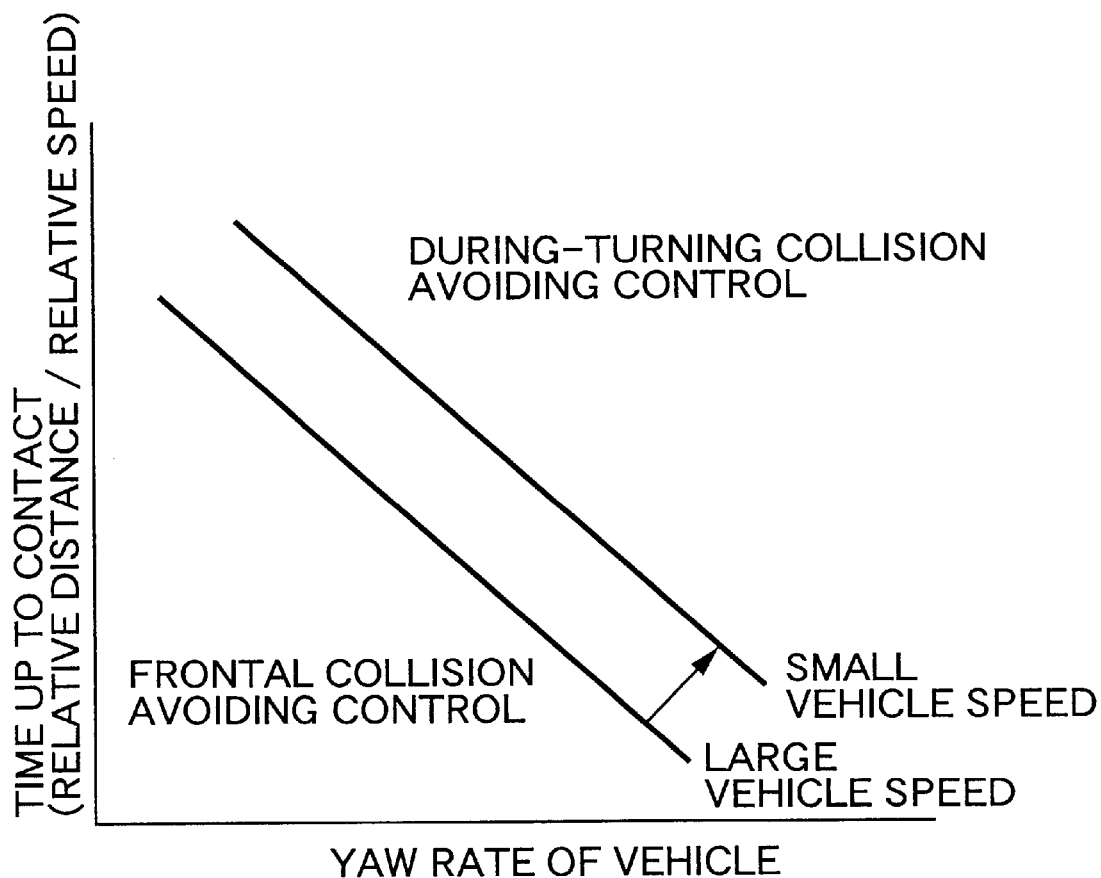

As shown in FIG. 24, in a region at which both of a value indicating a degree of turning movement (e.g., the yaw rate γi of the vehicle) and a value (the time to contact) provided by dividing the relative distance L between the vehicle and the on-coming vehicle calculated based on an output from the radar device 3 by the relative speed Vs are small, the lateral change in position due to the turning movement is small and hence, it is determined that the vehicle and the on-coming vehicle are traveling substantially straight, whereby the frontal collision avoiding control is carried out. In a region at which both of the yaw rate γi and the time up to the contact are large, the lateral change in position due to the turning movement is large and for this reason, it is difficult to determine the possibility of contact at a contact time point. Therefore, it is determined that the vehicle and the on-coming vehicle are turning, whereby the during-turning collision avoiding control is carried out. In this case, the position of a line at which a threshold value is provided, is corrected in accordance with the magnitude of the vehicle speed Vi of the vehicle.

The content of "during-turning collision avoiding control" at Step S19 of the main routine shown in FIG. 6 will be described below with reference to the flow chart in FIG. 8. The description will be made on the assumption of a left-side drive road.

First, a degree of danger of collision during turning is calculated at Step S31. The degree of danger of collision is determined based on a difference between a radius of turning movement of the vehicle and a radius of turning movement of the on-coming vehicle, as shown in FIG. 12. As the difference is increased, it is determined that the degree of danger is higher. Methods for calculating a radius of turning movement for the vehicle and a radius of turning movement for the on-coming vehicle will be described with reference to FIGS. 22 and 23.

Figure 22:
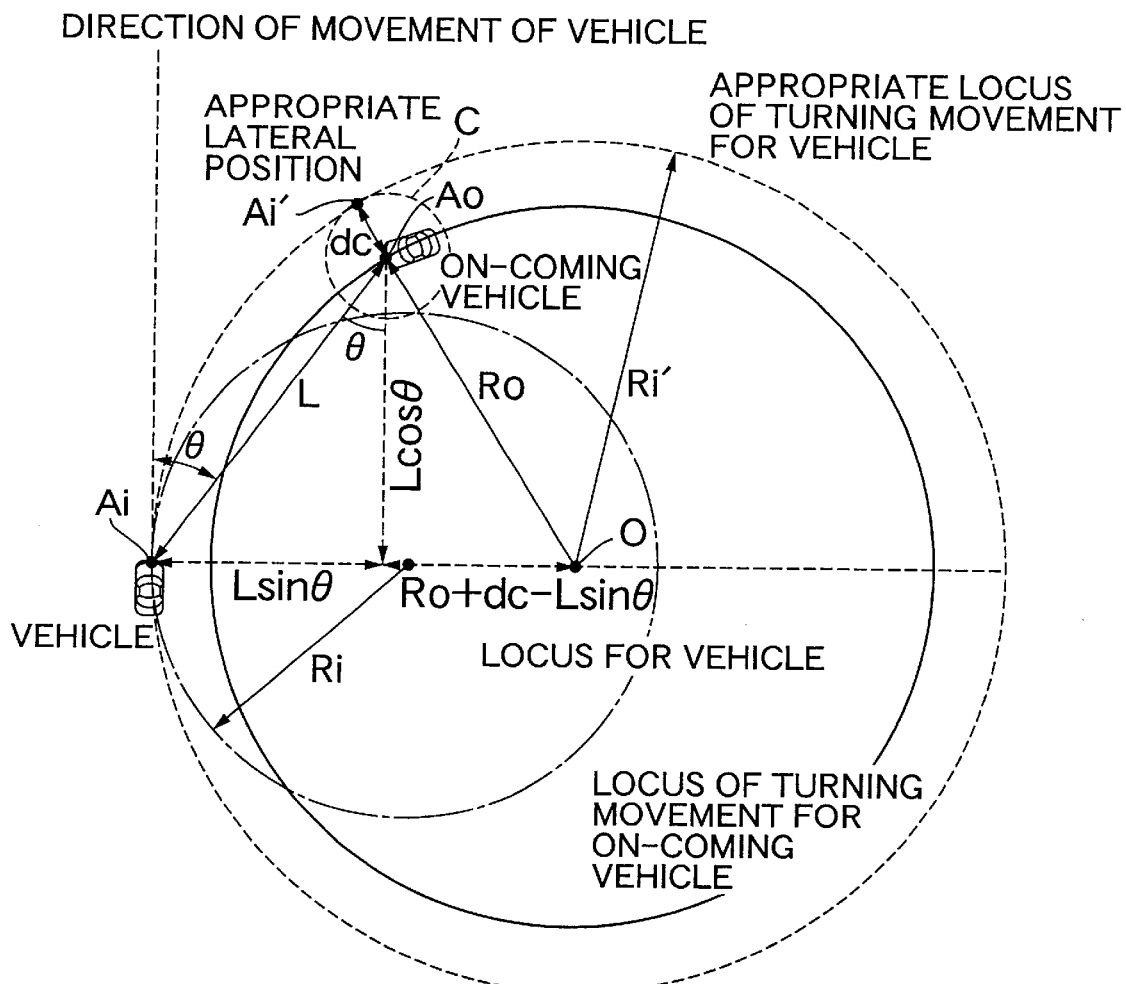
Figure 23:
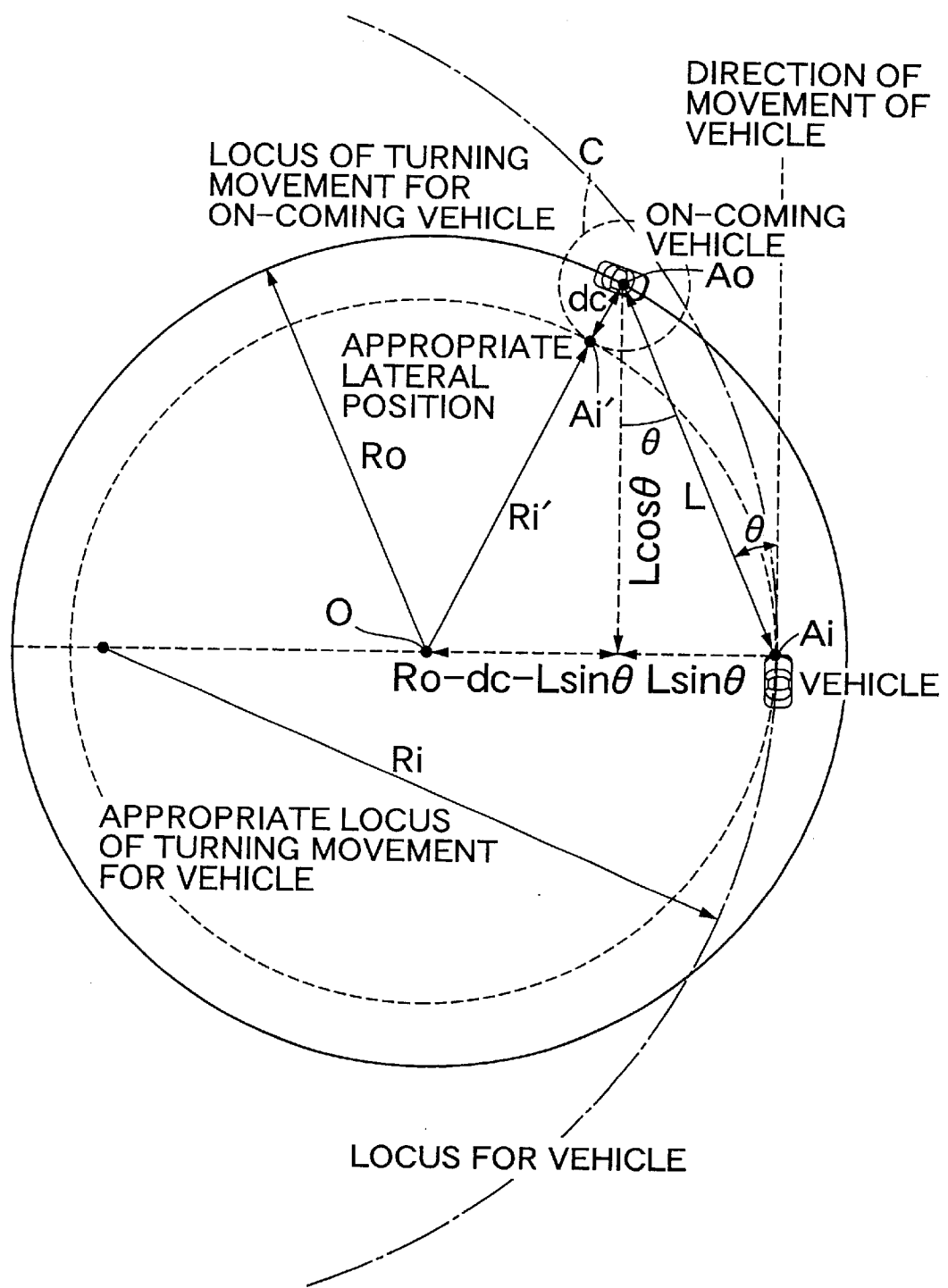

The method for calculating the radius Ro of turning movement for the on-coming vehicle Ao will be first described. FIG. 22 shows the case where the vehicle Ai is to be turned to the right on a left-side drive road, and FIG. 23 shows the case where the vehicle Ai is to be turned to the left on a left-side drive road. The case where the vehicle Ai is to be turned to the right, will be first described with reference to FIG. 22.

An appropriate lateral distance dc (e.g., 3 m) for permitting the vehicle Ai which is being turned, to pass the on-coming vehicle Ao appropriately, is set in advance, as is the appropriate lateral distance da during straight traveling of the vehicle. If a circle C having a radius equal to the appropriate lateral distance dc is described about the position of the on-coming vehicle Ao and a circle tangent to the direction of movement of the vehicle Ai at the position of the vehicle Ai and tangent to the outside of the circle C is described, the latter circle is an appropriate locus of turning movement for the vehicle Ai for permitting the vehicle Ai which is being turned and the on-coming vehicle to pass each other. Therefore, a circle which has the turning radius Ro smaller than a turning radius Ri' of the appropriate locus of turning movement for the vehicle Ai by the appropriate lateral distance dc and which has the center O common to the above-described latter circle, is a locus of turning movement for the on-coming vehicle Ao intended to be determined. Namely, an appropriate locus of turning movement for the vehicle Ai can be determined from the position of the on-coming vehicle Ao and the appropriate lateral distance dc, and a locus of turning movement for the on-coming vehicle Ao, when the vehicle Ai is turned to the right, can be determined as a locus spaced inwards at the appropriate lateral distance dc apart from the appropriate locus of turning movement for the vehicle Ai.

The radius Ro of turning movement of the on-coming vehicle Ao can be calculated based on a right triangle having a hypotenuse provided by a straight line interconnecting the center O and the position of the on-coming vehicle Ao. Namely, if a tri-square theorem is utilized in the right triangle, the following equation is established:

$$R_0^2 = (L \cos \theta)^2 + (R_0 + dc - L \sin \theta)^2 \quad (14)$$

Therefore, if the equation (14) is solved for $R_0$, the radius $R_0$ of turning movement for the on-coming vehicle Ao can be determined.

$$R_0 = \frac{L^2 - 2dc \cdot L \cdot \sin \theta + dc^2}{2L \cdot \sin \theta - 2dc} \quad (15)$$

The calculation of the radius $R_0$ of turning movement for the on-coming vehicle Ao when the vehicle Ai is to be turned to the right, has been described above. The calculation of a radius $R_0$ of turning movement for the on-coming vehicle Ao when the vehicle Ai is to be turned to the left, can be carried out in a similar manner. More specifically, if a circle C having a radius equal to the appropriate lateral distance dc is described about the position of the on-coming vehicle Ao and a circle tangent to the direction of movement of the vehicle Ai at the position of the vehicle Ai and tangent to the inside of the circle C is described, as shown in FIG. 23, the latter circle is an appropriate locus of turning movement for the vehicle Ai for permitting the vehicle Ai which is being turned and the on-coming vehicle Ao to pass each other appropriately. Therefore, a circle which has the turning radius Ro larger than the turning radius Ri' of the appropriate locus of turning movement for the vehicle Ai by the appropriate lateral distance dc and which has the center O common to the above-described latter circle, is a locus of turning movement for the on-coming vehicle Ao intended to be determined. Namely, an appropriate locus of turning movement for the vehicle Ai can be determined from the position of the on-coming vehicle Ao and the appropriate lateral distance dc, and a locus of turning movement for the on-coming vehicle Ao, when the vehicle Ai is turned to the left, can be determined as a locus spaced outwards at the appropriate lateral distance dc apart from the appropriate locus of turning movement for the vehicle Ai.

The radius $R_0$ of the turning movement for the on-coming vehicle Ao can be calculated based on a right triangle having the hypotenuse provided by a straight line interconnecting the center O and the position of the on-coming vehicle Ao. Namely, if a tri-square theorem is utilized in the right triangle, the following equation is established:

$$R_0^2 = (L\cos\theta)^2 + (R_0 - dc - L\sin\theta)^2 \quad (16)$$

Therefore, if the equation (16) is solved for $R_0$, the radius $R_0$ of turning movement for the on-coming vehicle Ao can be determined.

$$R_0 = \frac{L^2 + 2dc \cdot L \cdot \sin\theta + dc^2}{2L \cdot \sin\theta + 2dc} \quad (17)$$

The calculation of the locus of turning movement (radius $R_0$ of turning movement) for the on-coming vehicle Ao by the above-described method can be carried out by detecting the on-coming vehicle Ao one time rather than a plurality of times by the radar device 3. Therefore, even if the time taken until the vehicle Ai and the on-coming vehicle Ao approaches each other to collide with each other is short, the locus of turning movement for the on-coming vehicle Ao can be calculated with a sufficient margin.

On the other hand, the radius Ri of turning movement for the vehicle Ai can be calculated, irrespective of the direction of turning movement for the vehicle Ai, according to the following equation based on (1) the vehicle speed Vi of the vehicle Ai calculated based on the outputs from the vehicle speed sensors $S_5$, and (2) the yaw rate γi of the vehicle Ai calculated based on the output from the vehicle yaw rate sensor $S_4$:

$$Ri = Vi/\gamma i \quad (18)$$

When the radius Ri of turning movement for the vehicle Ai and the radius Ro of turning movement for the on-coming vehicle Ao have been calculated in the above manner, a degree of danger of collision is calculated based on both the radii Ri and Ro of turning movement. When the vehicle Ai is being turned to the right, it is determined that the larger a value of "radius Ro of turning movement for the on-coming vehicle Ao"—"radius Ri of turning movement for the vehicle Ai", the higher the degree of danger, as shown in FIG. 12. This is because when the vehicle Ai enters into a right on-coming lane at the smaller radius Ri of turning movement during rightward turning thereof, the degree of danger of collision is generated and at that time, the difference (Ro−Ri) between both the radii Ri and Ro of turning movement is increased. When the vehicle Ai is being turned to the left, it is determined that the larger the value of "radius Ri of turning movement for the vehicle Ai"—"radius Ro of turning movement for the on-coming vehicle Ao", the higher the degree of danger. This is because when the vehicle Ai enters into the right on-coming lane at the larger radius Ri of turning movement during leftward turning thereof, the degree of danger of collision is generated and at that time, the difference (Ri−Ro) between both the radii Ri and Ro of turning movement is increased.

When the value of "radius Ro of turning movement for the on-coming vehicle Ao"—"radius Ri of turning movement for the vehicle Ai" or the value of "radius Ri of turning movement for the vehicle Ai"—"radius Ro of turning movement for the on-coming vehicle Ao" is equal to the appropriate lateral distance dc (3 m), the vehicle Ai and the on-coming vehicle Ao can pass each other appropriately through the appropriate lateral distance dc, and at this time, the degree of danger of collision is 0 (zero).

Then, at Step S32, the warning control and the lane-departing preventing control depending on the degree of danger of collision are carried out. During turning of the vehicle, it is difficult to properly estimate (1) a time point when the vehicle passes the on-coming vehicle and (2) a positional relation between the vehicle and the on-coming vehicle at that time. Therefore, the collision avoiding control is weaker in intensity than during straight traveling of the vehicle.

Figure 25A:
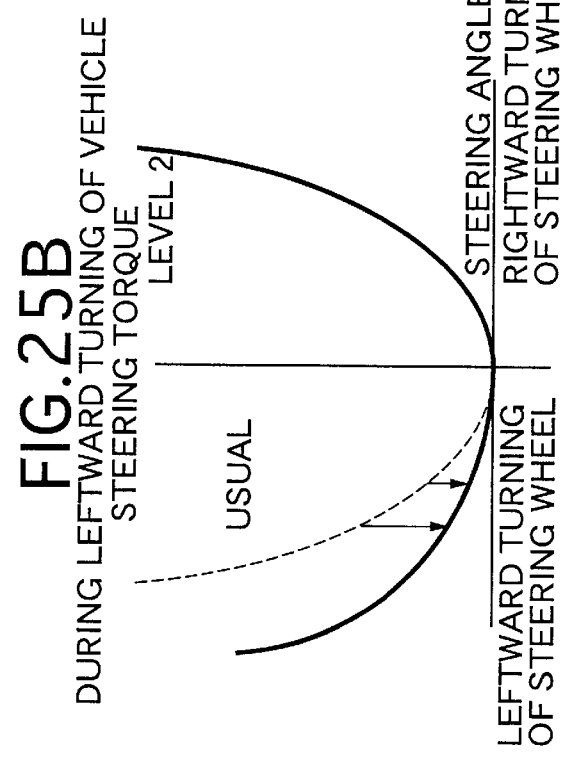
Figure 25C:
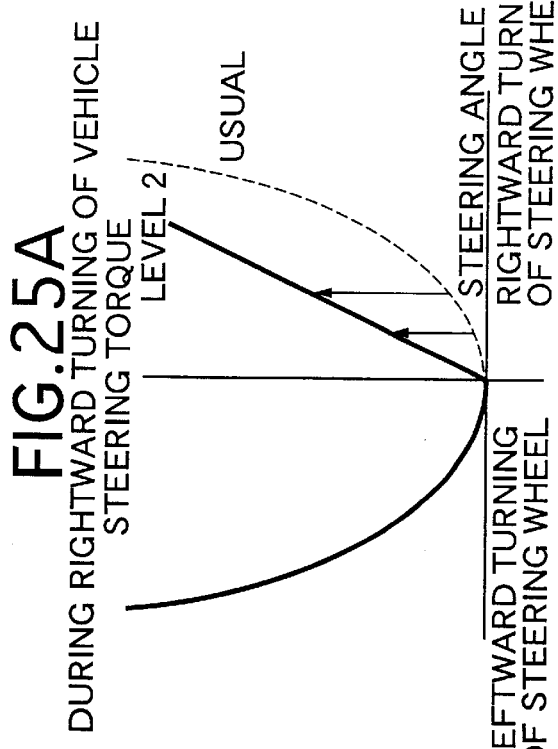
Figure 25B:
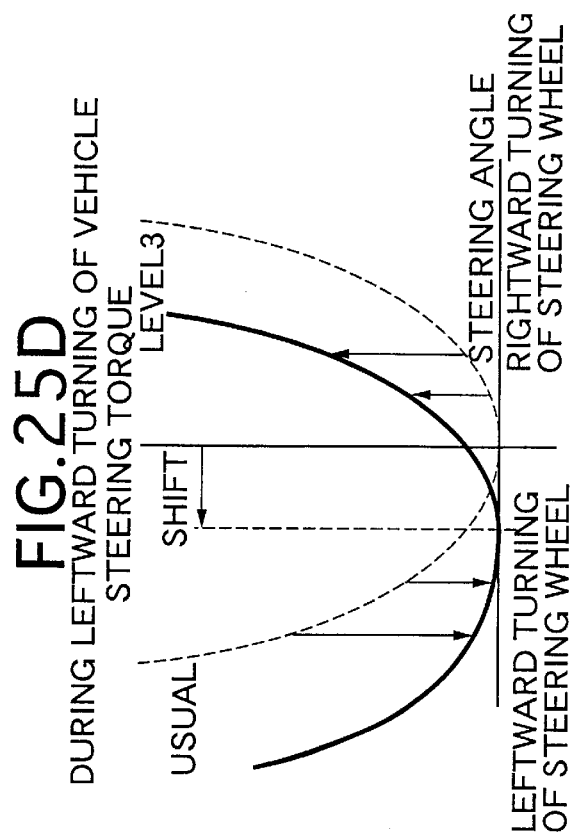

FIGS. 25A to 25D show examples of the lane-departing preventing control. FIG. 25A shows example in the case where the degree of danger of collision is a level 2 during rightward turning of the vehicle. In this case, the actuator 17 of the steering device 11 is controlled, so that the steering torque in the direction for the vehicle Ai to approach the on-coming vehicle (in a rightward direction) is heavier than usual, whereby the vehicle Ai is prevented from further approaching the on-coming vehicle Ao. FIG. 25B shows example in the case where the degree of danger of collision is a level 2 during leftward turning of the vehicle. In this case, the actuator 17 of the steering device 11 is controlled, so that the steering torque in the direction for the vehicle Ai to travel away from the on-coming vehicle Ao (in a leftward direction) is lighter than usual, whereby the driver's steering operation is assisted, so that the vehicle Ai can easily travel away from the on-coming vehicle Ao.

Figure 25D:
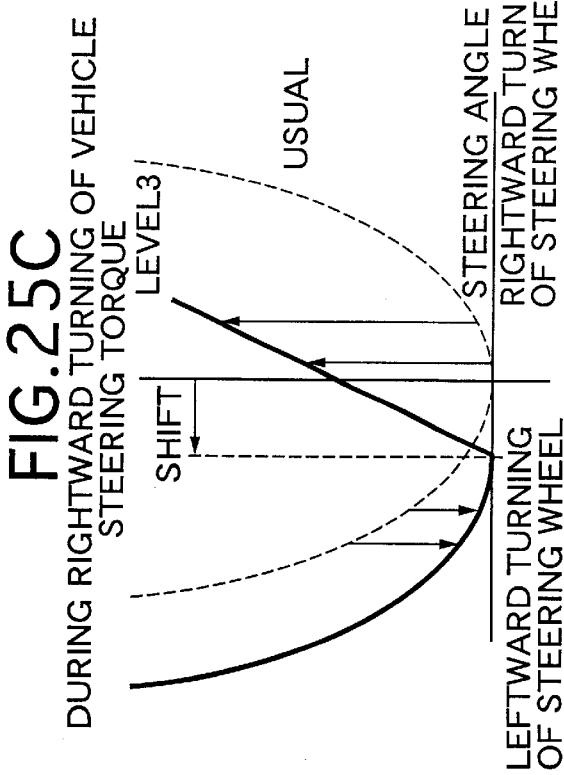

FIG. 25C shows the case where the degree of danger of collision is a level 3 during rightward turning of the vehicle, wherein the characteristic shown in FIG. 25A for the level 2 is shifted to the left. As a result, the steering torque in the direction for the vehicle Ai to travel toward the on-coming vehicle Ao (in the rightward direction) can be made even greater, and the steering torque in the direction for the vehicle Ai to travel away from the on-coming vehicle Ao (in the leftward direction) can be made less. FIG. 25D shows the case where the degree of danger of collision is a level 3 during leftward turning of the vehicle, wherein the characteristic shown in FIG. 25B for the level 2 is shifted to the left. As a result, the steering torque in the direction for the vehicle Ai to travel toward the on-coming vehicle Ao (in the rightward direction) can be made greater, and the steering torque in the direction for the vehicle Ai to travel away from the on-coming vehicle Ao (in the leftward direction) can be made even less.

In the above-described embodiment, the radius Ro of turning movement for the on-coming vehicle Ao is compared with the radius Ri of turning movement for the vehicle Ai to calculate the degree of danger of collision. Alternatively, the appropriate radius Ri' of turning movement of the vehicle Ai having a predetermined relation to the radius Ro of turning movement for the on-coming vehicle Ao can be compared with the radius Ri of turning movement for the vehicle Ai to calculate the degree of danger of collision. More specifically, when the vehicle Ai is being turned to the right, a value of the appropriate distance dc added to the radius Ro of turning movement for the on-coming vehicle Ao is the appropriate radius Ri' of turning movement for the vehicle Ai (see FIG. 22). When the vehicle Ai is being turned to the left, a value of the appropriate lateral distance dc subtracted from the radius Ro of turning movement for the on-coming vehicle Ao is the appropriate radius Ri' of turning movement for the vehicle Ai (see FIG. 23). Therefore, when the radius Ri of turning movement for the vehicle Ai is equal to the appropriate radius Ri' of turning movement, this can be considered as a state at which the degree of danger of collision is 0 (zero). Thus, the calculation of the degree of danger of collision is simplified and further facilitated.

In the warning in "the during-turning collision avoiding control", the tone of the buzzer or the color of the lamp as the alarm 5 is different from that in "the frontal collision avoiding control" to distinguish the warning in "the during-turning collision avoiding control" from that in "the frontal collision avoiding control".

A third embodiment of the present invention will now be described with reference to FIGS. 26 to 30. In the third embodiment, the content (see FIG. 11) of "avoiding steering control" at Step S24 of the frontal collision avoiding control routine shown in FIG. 7 in the first embodiment is modified, and the other elements are the same as in the first embodiment.

Figure 26:
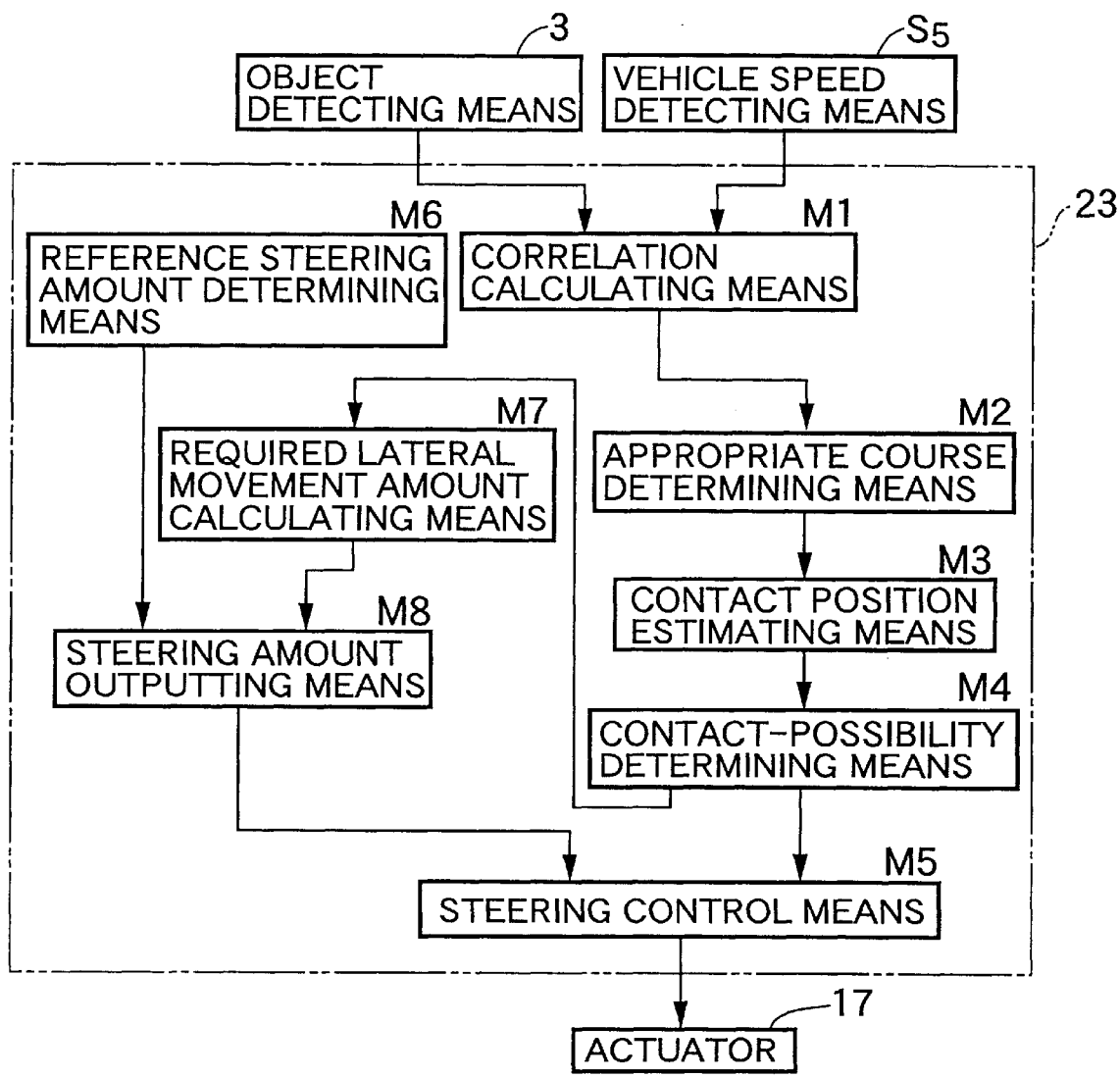

First, the arrangement of and the outline of the function of a frontal collision avoiding control means 23 will be described below with reference to FIG. 26.

The frontal collision avoiding control means 23 is comprised of a correlation calculating means M1, an appropriate course determining means M2, a contact position estimating means M3, a contact-possibility determining means M4, a steering control means M5, a reference steering amount determining means M6, a required lateral movement amount calculating means M7, and a steering amount outputting means M8.

The correlation calculating means M1 calculates the relative angle (a relative position) $\theta$, the relative distance L and the relative speed Vs between a vehicle Ai and an on-coming vehicle Ao, based on outputs from the object detecting means (the radar device 3) and the vehicle speed detecting means (the vehicle speed sensors $S_5$). The appropriate course determining means M2 determines an intrinsic appropriate course R for the vehicle Ai which permits the vehicle Ai to appropriately pass the on-coming vehicle Ao. The contact position estimating means M3 estimates a contact position P at which the vehicle Ai will come into contact with the on-coming vehicle Ao at a contact time point when the vehicle Ai will pass the on-coming vehicle Ao. The contact-possibility determining means M4 determines the possibility of contact between the vehicle Ai and the on-coming vehicle Ao by comparing the contact position P with the appropriate course R. When it is determined that there is the possibility of contact between the vehicle Ai and the on-coming vehicle Ao, the steering control means M5 automatically operates the actuator 17 of the steering device 11 in order to avoid the contact.

The reference steering amount determining means M6 determines a reference steering amount based on a variation in vehicle behavior of the vehicle Ai generated by the steering. The required lateral movement amount calculating means M7 calculates a lateral movement amount required for avoiding the contact and determined based on a lateral deviation d between the appropriate course R and the contact position P. The steering amount outputting means M8 outputs a target steering amount to the steering control means M5, based on the result of the comparison of the lateral movement amount generated by the reference steering amount with the required lateral movement amount.

Figure 27:
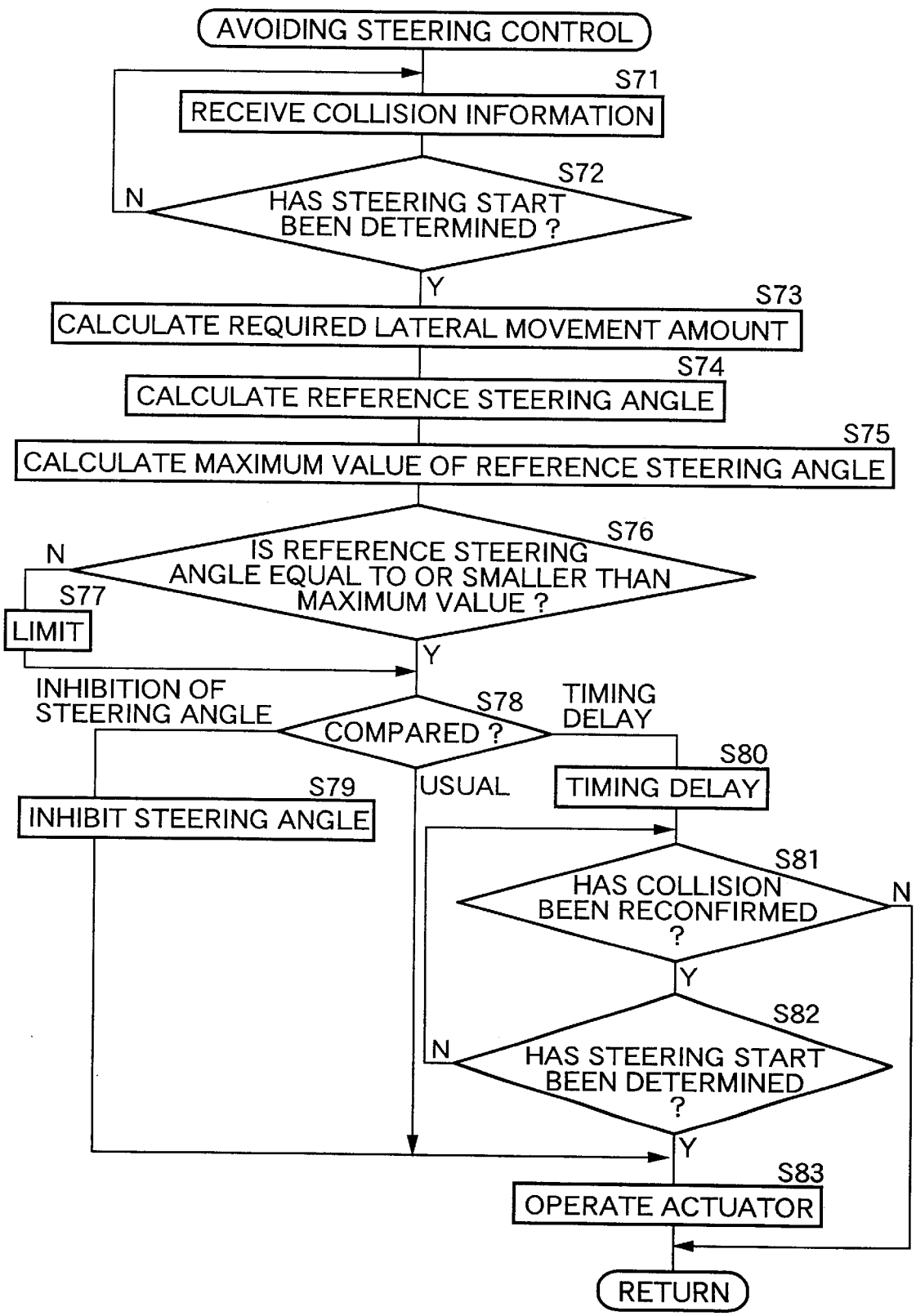

The content of "avoiding steering control" at above-described Step S24 will be described below with reference to a flow chart in FIG. 27.

First, at Step S71, collision information is received in a manner similar to Step S61 and then, the start of steering is determined at Step S72. When the contact time tc is shorter than a threshold value $\tau_0$ (a value at which the driver does not feel the start of steering to be too early, e.g., 2.2 sec) less than 3 sec which is a threshold value for the secondary warning, the processing is advanced to a steering start process carried out at and after Step S73. First, a required lateral movement amount for avoiding the collision is calculated at Step S73. Basically, a current value of lateral deviation $\delta d$ calculated at Step S48 is used as the required lateral movement amount, but averaging is carried out using a last value in order to eliminate error. At subsequent Step S74, a reference steering angle $\delta h$ required for allowing the vehicle Ai to perform a collision avoiding motion is calculated based on the vehicle speed Vi.

As shown in FIGS. 17A and 17B, the collision avoiding motion is conducted, so that the vehicle Ai is returned to the original road after avoidance of the on-coming vehicle Ao. Taking into consideration that the vehicle does not finally cross a lane on a road at the time point when the contact time tc (threshold value $\tau_0$) has lapsed, the lateral movement amount is set, for example, at 2 m. The maximum lateral acceleration YG is set, for example, at 0.15 G and the steering period is set, for example, 4 seconds (0.25 Hz), so that a variation in behavior of the vehicle and a steering speed which do not give a sense of incompatibility to the driver are provided, while ensuring such lateral movement amount before the contact time point.

Thus, the reference steering angle $\delta h$ is given according to the above-described equation (12), wherein N represents a steering gear ratio, and Ks represents a stability factor.

By carrying out the automatic steering at the reference steering angle $\delta h$ given according to the equation (12), the variation in the vehicle behavior and the steering speed which do not give the sense of incompatibility to the driver can be maintained in accordance with the vehicle speed of the vehicle, and the lateral movement required for avoiding the collision can be achieved. If the direction of the relative angle $\theta$ between the vehicle Ai and the on-coming vehicle Ao is from the vehicle Ai toward the on-coming vehicle Ao, it is considered that the lateral movement for avoiding the collision may be insufficient in some cases. Therefore, the reference steering angle $\delta h$ given in the above equation (12) is corrected by a target steering angle correcting value $\delta(\theta)$ (see FIG. 18) based on the relative angle $\theta$, thereby providing a reference steering angle $\Gamma h$ given in the above-described equation (13).

At subsequent Step S75, a maximum value $\delta hx$ for the reference steering angle $\delta h$ is calculated based on the map shown in FIG. 19. If the reference steering angle $\delta h$ exceeds the maximum value $\delta hx$ at Step S76, the correction is carried out, so that the upper limit value for the reference steering angle $\delta h$ is limited by the maximum value $\delta hx$ at Step S77. An extremely large steering angle may be provided in some cases, when the vehicle speed of the vehicle is low, because the reference steering is determined based on the maximum lateral acceleration, but this correction makes it possible to prevent a large target steering angle $\delta h$ to be employed.

Then, at Step S78, the required amount of lateral movement calculated at Step S73 (i.e., the lateral deviation $\delta d$) is compared with the reference amount of lateral movement generated by the reference steering angle $\delta h$ calculated at Steps S74 to S77. When the latter reference lateral movement amount is larger than the former required lateral movement amount (i.e., the lateral deviation $\delta d$), namely, when the lateral movement amount generated by the reference steering angle $\delta h$ is larger than the required lateral movement amount required for avoiding the collision, a value provided by correcting the reference steering angle δh in the decreasing direction is outputted as a target steering angle, or the timing of outputting the reference steering angle δh as a target steering angle is retarded. On the other hand, when the latter reference lateral movement amount is smaller than the former required lateral movement amount (i.e., the lateral deviation δd), namely, when the reference lateral movement amount generated by the reference steering angle δd is smaller than the lateral movement amount required for avoiding the corrosion, the correction of the reference steering angle δd and the change in outputting timing are not carried out. In other words, a change leading to giving of a sense of incompatibility to the driver by conduction the steering at the reference steering angle or more to increase the variation in the vehicle behavior, or by hastening the reference timing, is not carried out.

Figure 28:
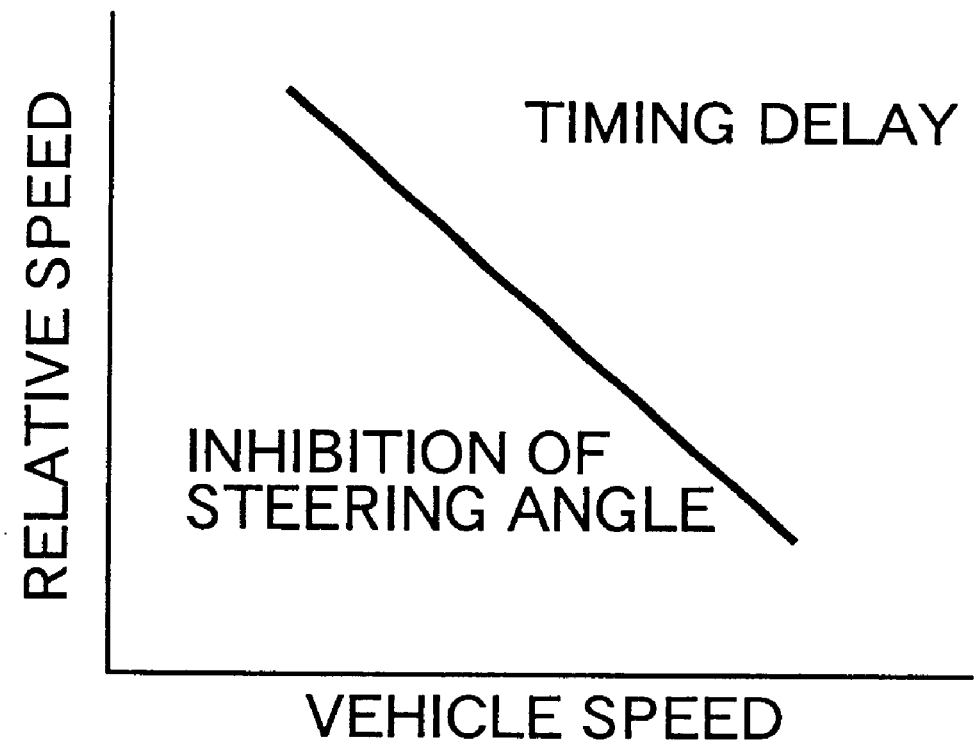

In a map with the vehicle speed Vi of the vehicle Ai and the relative speed Vs between the vehicle Ai and the on-coming vehicle Ao being as parameters, as shown in FIG. 28, a control for inhibiting (decreasing) the reference steering angle δh is selected in a region where the vehicle speed Vi and the relative speed Vs are small, and a timing delay control for delaying the timing for outputting the reference steering angle δh is selected in a region where the vehicle speed Vi and the relative speed Vs are large. Thus, the control for inhibiting the reference steering angle δh is selected when at a lower vehicle speed at which the steering angle is large, and the timing delay control is selected when at a high vehicle speed at which the steering angle is small.

When the control for inhibiting the reference steering angle δh is selected at Step S78, a value provided by correcting the reference steering angle δh in the decreasing direction is output as a target steering angle at Step S79. Then, at Step S83, the driving of the actuator 17 of the steering device 11 is controlled in accordance with the target steering angle in order to avoid the collision of the vehicle Ai with the on-coming vehicle Ao. Namely, a PI controller, to which a deviation between the target steering angle and the actual steering angle by the steering device 11 has been input, controls the actuator 17 of the steering device 11 in a feedback manner to converge the deviation to zero, as shown in FIG. 20.

On the other hand, when the timing delay control is selected at Step S78, the timing for outputting the reference steering angle δh as a target steering angle is delayed at Step S80, and the steering period is correspondingly hastened. When the target steering angle is output with the timing and steering period corrected at Step S80, the possibility of collision is reconfirmed at Step S81. The reconfirmation of the collision is carried out using the latest data based on the flow chart in FIG. 9. When it is consequently determined that there is the possibility of collision, the timing for the steering start is determined at Step S82. The reconfirmation of the collision is repeated for a period until the steering start time point is reached. If it is determined that there is still the possibility of collision at the time when the steering start time point has been reached, the target steering angle is output at Step S82 to start the automatic steering operation.

Figure 29A:
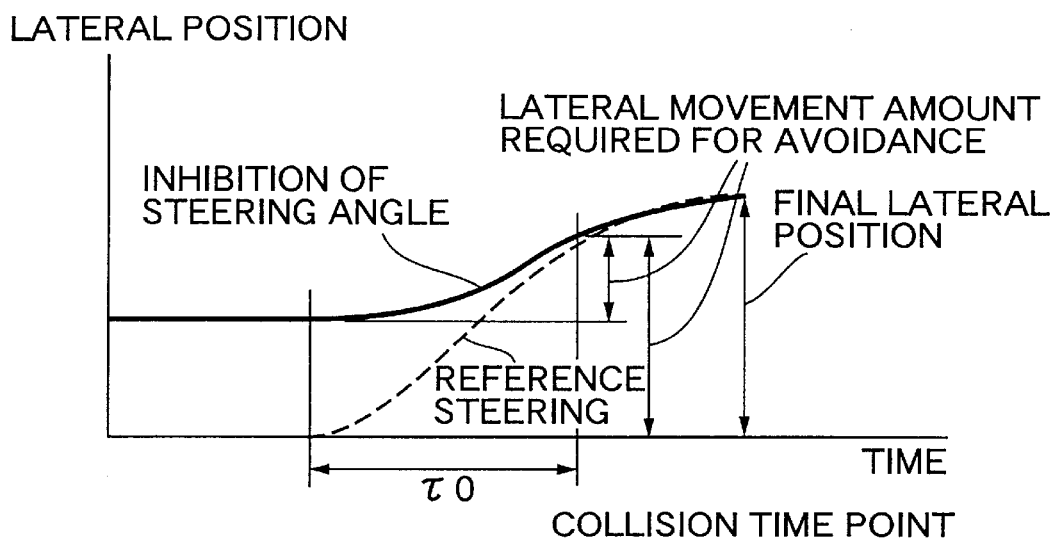
FIGS. 29A and 29B are diagrams for explaining the steering angle inhibiting control.
Figure 29B:
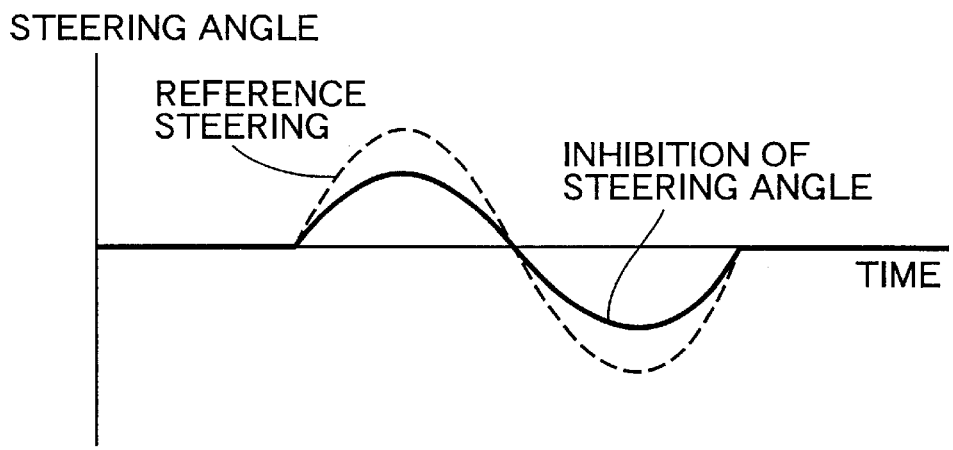

FIGS. 29A and 29B show one example of the steering angle inhibiting control, wherein a broken line corresponds the case where the reference steering angle δh is output as it is, and the solid line corresponds to the case where the steering angle inhibiting control is not carried out. It is shown in FIG. 29A that the lower the position on the axis of ordinates, the larger the degree of departing of the vehicle Ai toward a lane on the side of the on-coming vehicle Ao. When steering angle inhibiting control is carried out, the departing of the vehicle Ai toward the on-coming lane at an initial stage of the control start is small, as compared with when steering angle inhibiting control is not carried out. For this reason, when steering angle inhibiting control is carried out, the amplitude of the steering angle is diminished to decrease the lateral movement of the vehicle Ai, as compared with when steering angle inhibiting control is not carried out, as shown in FIG. 29B. The proportion of decreasing the amplitude of the steering angle is such that a very large the vehicle behavior is not required to be caused by the steering itself in the frontal collision avoiding control (the response of the vehicle behavior is within a linear region), and the steering time (steering speed) is not varied irrespective of the presence or absence of the steering angle inhibiting control. Therefore, if the steering angle is decreased by a proportion corresponding to a decrease in the lateral movement amount required for avoidance of the collision as compared with respect to the reference lateral movement amount, the lateral position at the collision time point and the final lateral position can be substantially matched with those in the case of the reference steering, as shown in FIG. 29A.

Figure 30A:
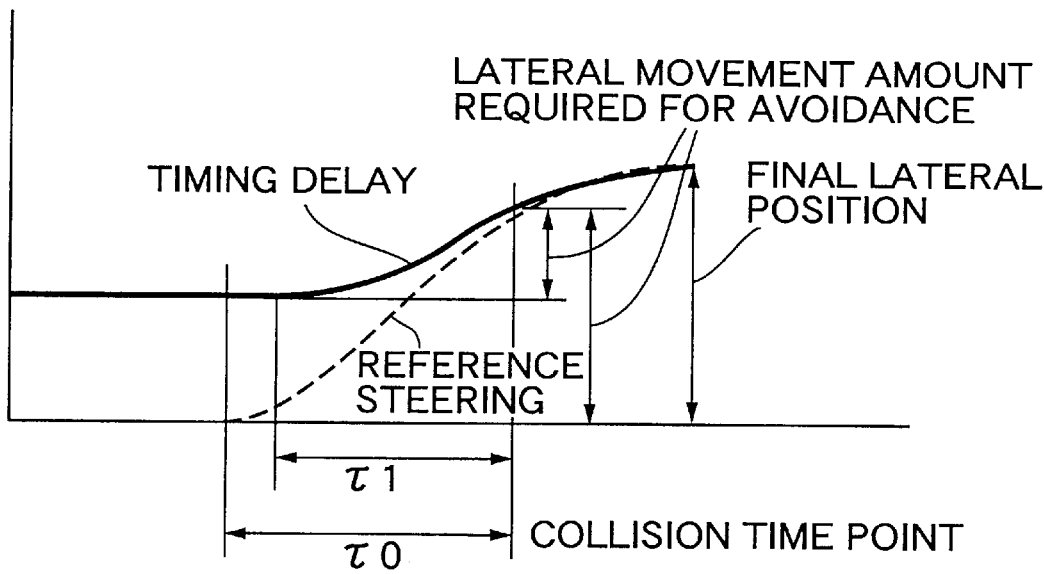
Figure 30B:
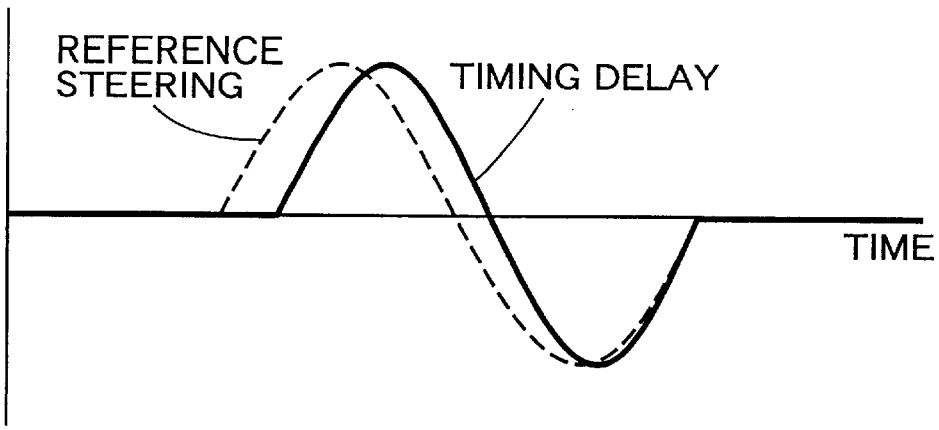

FIGS. 30A and 30B show one example of the timing delay control, wherein the broken line corresponds to the case where the reference steering angle δh is outputted as it is, and the solid line corresponds to the case where the timing delay control is carried out. In the timing delay control, the lateral movement amount is decreased by the delaying the steering start timing without variation in amplitude of the steering angle. The magnitude of the lateral movement amount is proportional to a time-integrated value of the steering angle (an area in the inside of a wave form of steering angle), and hence, the steering start timing can be determined based on the time-integrated value. If the steering start timing is delayed, the steering speed is also increased therewith. Therefore, the start of the lateral movement is delayed, but the responsiveness of the lateral movement is rapid, as compared with the case of the steering angle inhibiting control, and the lateral position at the collision time point and the final lateral position can be substantially matched with those in the case of the reference steering.

When the timing delay control is carried out, the steering time $\tau_1$ is shorter than the reference steering time $\tau_0$ preset so as not to give a sense of incompatibility to the driver, whereby there is the possibility that a sense of incompatibility is given to the driver. However, as described above, the timing delay control is carried out when the amplitude of the steering angle is small and hence, the amount of variation in steering angle per unit time is small and the sense of incompatibility given to the driver is also small. In carrying out the timing delay control, the minimum steering time (e.g., 3 seconds) may be set in advance in preparation for the case where the steering time $\tau_1$ is significantly small because of a small lateral movement amount, and the correction may be made by steering angle inhibition without the timing delay control providing a steering time shorter than the minimum steering time.

Even when the driver does not carry out spontaneous avoiding operation, notwithstanding that the warning for avoiding the collision has been conducted, the automatic steering operation can be carried out to achieve the proper avoidance of the contact. In addition, the steering angle and the steering timing in the automatic steering operation are controlled so that a sense of incompatibility is not given to the driver, and therefore, it is possible to minimize the interference of the automatic steering operation with the driver's driving operation.

When the diver feels the start of the automatic steering operation as being too early, the sense of incompatibility received by the driver can be eliminated by delaying of the timing. Moreover, the possibility of collision is repeatedly determined while the delaying of the timing is being conducted and hence, it is possible to prevent the mis-determination and to avoid the carrying-out of unnecessary automatic steering operations.

In the map shown in FIG. 28 for selecting the inhibition of the steering angle and the delaying of the timing, the vehicle speed of the vehicle is taken on the axis of abscissas, and the relative speed is taken on the axis of ordinates. Alternatively, the avoiding target steering angle may be taken on the axis of abscissas, and the relative distance at the time of avoidance may be taken on the axis of ordinates. Namely, when the avoiding steering angle is large, the inhibition of the steering angle can be carried out to prevent a sense of incompatibility from being given to the driver due to a large variation in steering angle and a large variation in the vehicle behavior. When the relative distance is large, the delaying of the timing can be carried out to prevent a sense of incompatibility from being given to the driver due to a large relative distance at a time point when the avoiding steering operation is started (due to that the avoiding steering operation is started at a time point when the relative distance is large, i.e., the start of the avoiding steering operation is too early).

The chance for carrying out the timing delay control may be increased in a range at which a sense of incompatibility is not given to the driver. In addition, in place of carrying out the timing delay control and the steering angle inhibiting control separately, both of these controls may be used together depending on the situation previously established by the map.

A fourth embodiment of the present invention will now be described with reference to FIGS. 31 to 36. In the fourth embodiment, the content (see FIG. 11) of "avoiding steering control" at Step S24 of the frontal collision avoiding control routine shown in FIG. 7 in the first embodiment is changed.

Figure 31:
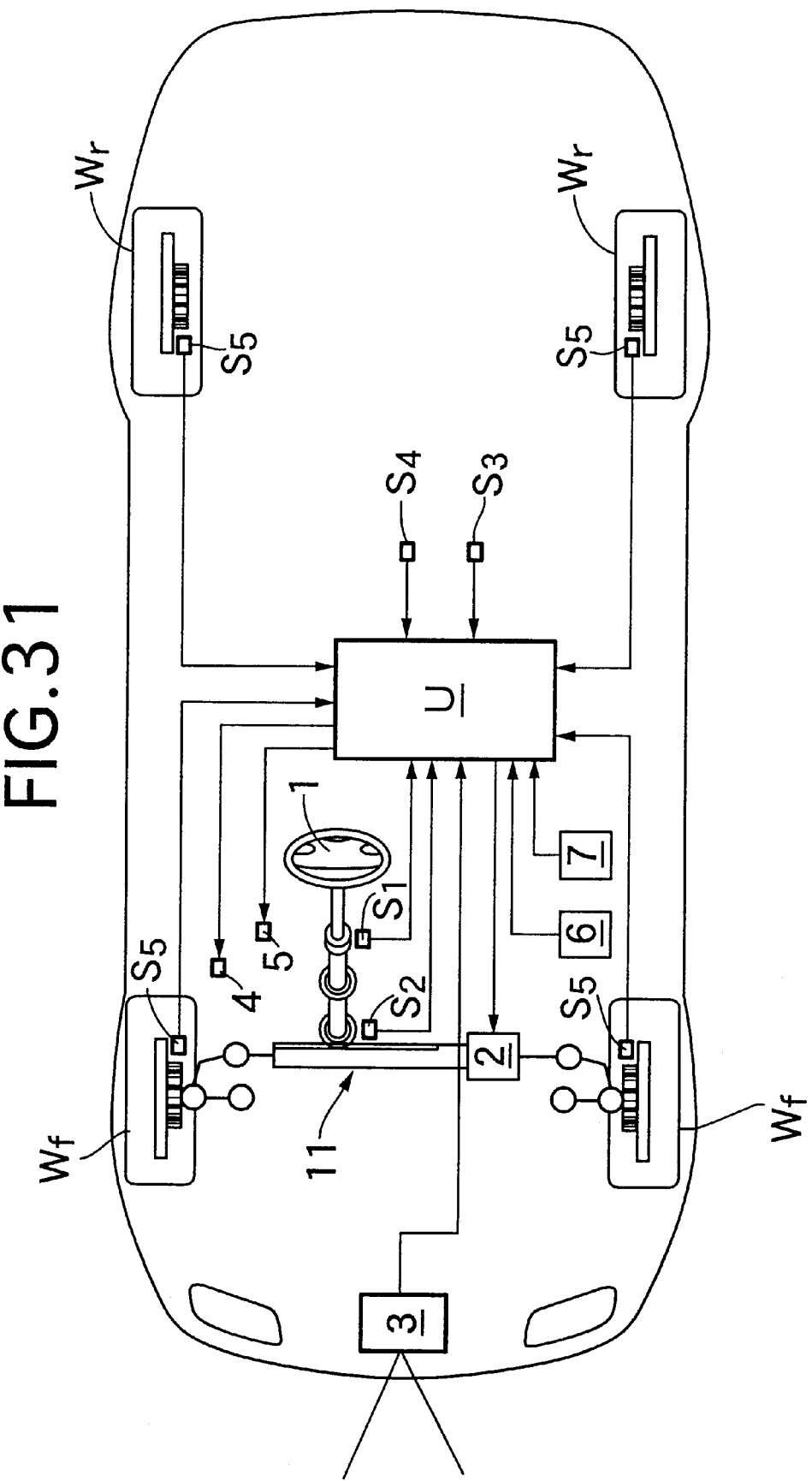
Figure 32:
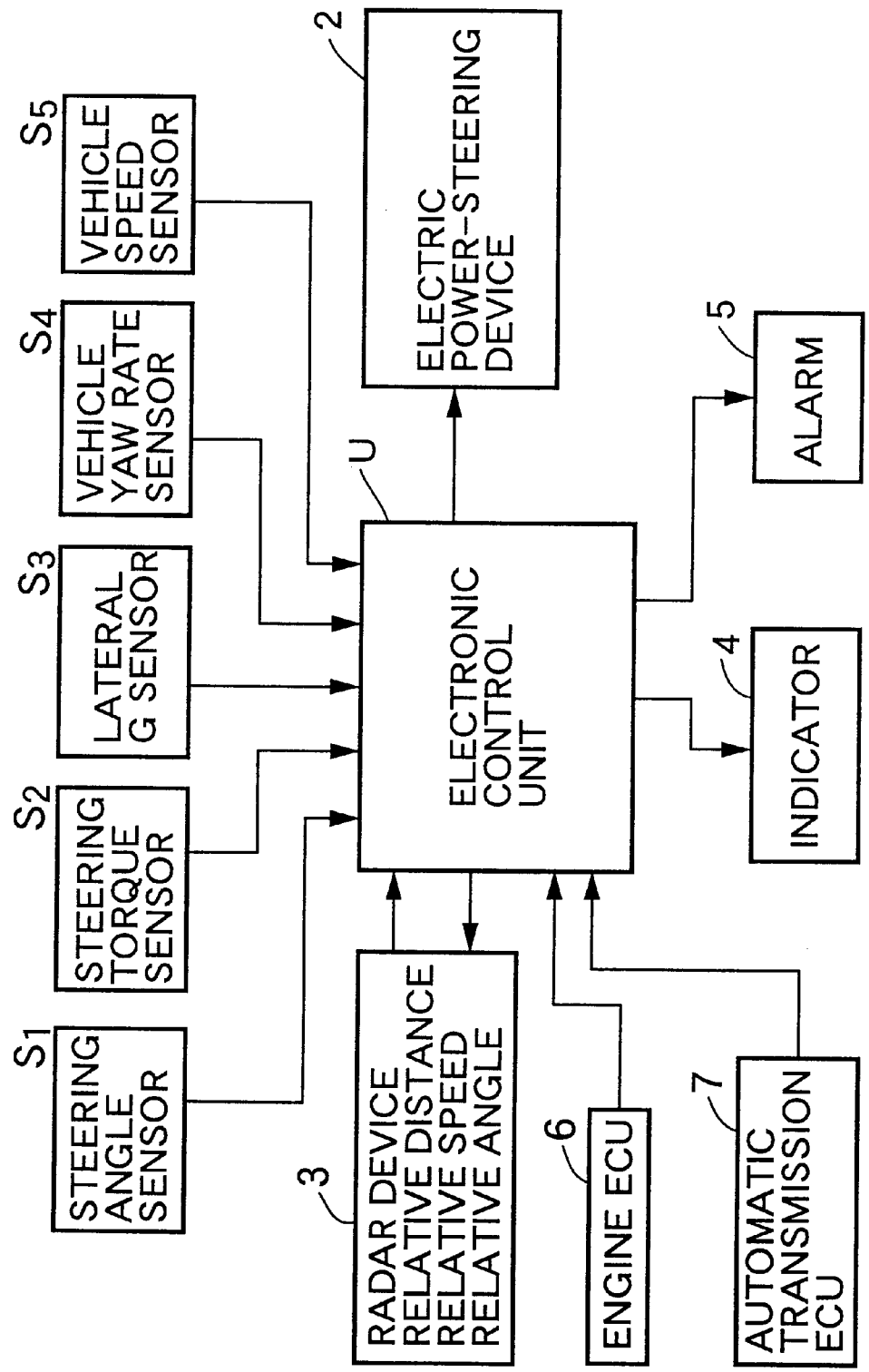

As can be seen by comparison of FIGS. 31 and 32 with FIGS. 1 and 2 showing the first embodiment, an electronic control unit U including a frontal collision preventing ECU in the fourth embodiment controls the operation of the electric power-steering device 2 and the operations of the indicator 4 comprising a liquid crystal display and the alarm 5 comprising a buzzer or a lamp, based on signals from an engine ECU 6 and an automatic transmission ECU 7 in addition to the radar device 3 and the sensors $S_1$ to $S_5$.

Figure 33:
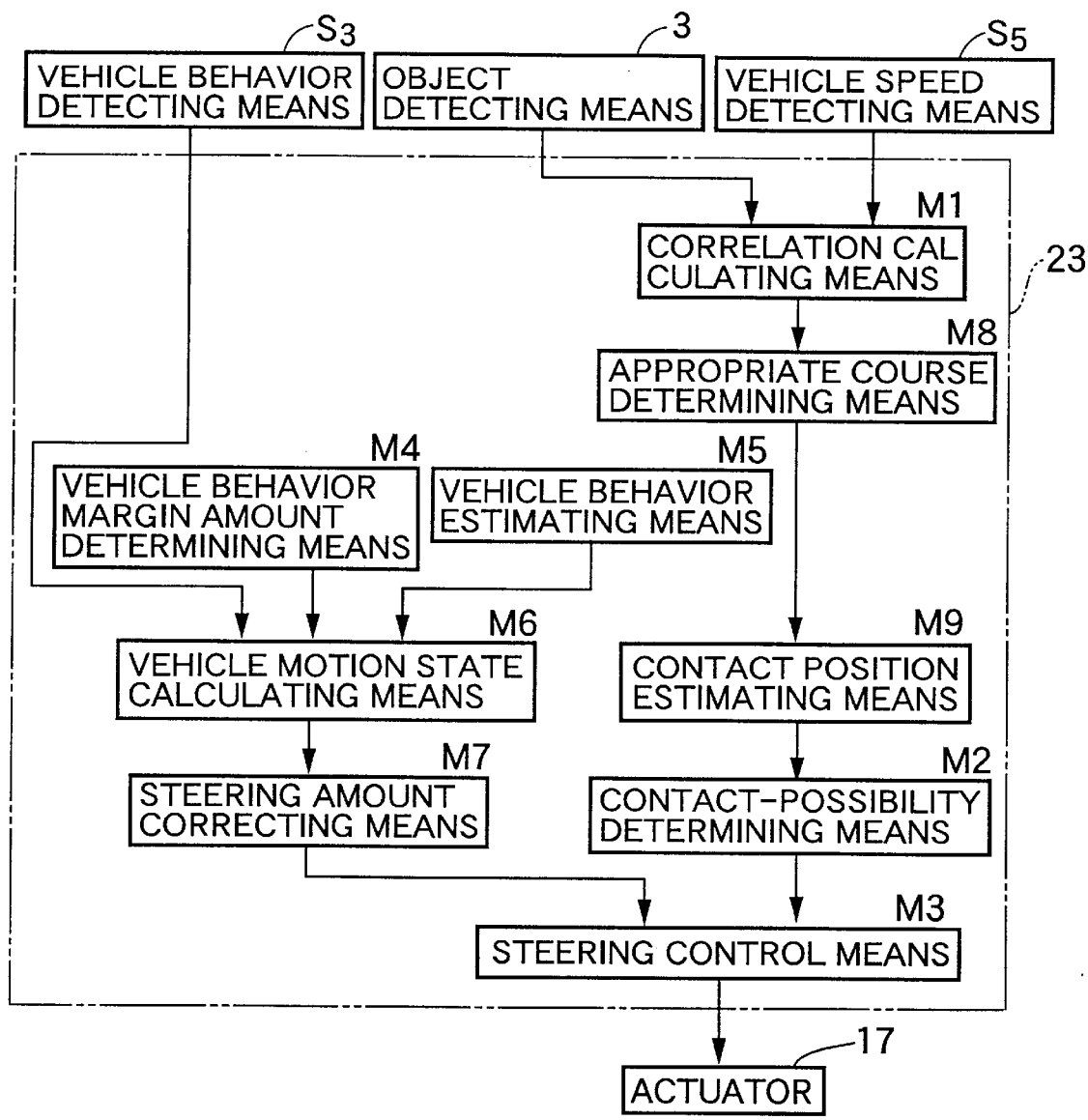

The arrangement of and the outline of the function of a frontal collision avoiding control means 23 will be described below with reference to FIG. 33.

The frontal collision avoiding control means 23 is comprised of a correlation calculating means M1, a contact-possibility determining means M2, a steering control means M3, a vehicle behavior margin-amount determining means M4, a vehicle behavior estimating means M5, a vehicle motion state calculating means M6, a steering amount correcting means M7, an appropriate course determining means M8, and a contact position estimating means M9.

The correlation calculating means M1 calculates the relative angle (a relative position) θ, the relative distance L and the relative speed Vs between a vehicle Ai and an on-coming vehicle Ao, based on outputs from the object detecting means (the radar device 3) and the vehicle speed detecting means (the vehicle speed sensors $S_5$). The appropriate course determining means M8 determines an intrinsic appropriate course R for the vehicle Ai which permits the vehicle Ai to appropriately pass the on-coming vehicle Ao. The contact position estimating means M9 estimates the contact position P where the vehicle Ai will come into contact with the on-coming vehicle Ao at a contact time point when the vehicle Ai will pass the on-coming vehicle Ao. The contact-possibility determining means M2 determines the possibility of contact of the vehicle Ai with the on-coming vehicle Ao by comparing the contact position P with the appropriate course R. When it is determined that there is the possibility of contact of the vehicle Ai with the on-coming vehicle Ao by the contact-possibility determining means M2, the steering control means M3 operates the steering device 11 of the vehicle Ai in order to avoid the contact.

The vehicle behavior margin-amount determining means M4 determines a margin amount for the vehicle behavior, which is required when a driver has conducted the spontaneous contact avoiding operation in order to avoid the contact of the vehicle Ai with the on-coming vehicle Ao. The vehicle behavior estimating means M5 estimates the magnitude of vehicle behavior of the vehicle at the time when the steering device 11 is operated by the steering control means M3. The vehicle-motion state calculating means M6 calculates a vehicle-motion state as a total vehicle behavior at the time when the steering device 11 is operated by the steering control means M3, based on the vehicle behavior already generated in the vehicle Ai, the vehicle behavior determined by the vehicle behavior margin-amount determining means M4, and the vehicle behavior estimated by the vehicle behavior estimating means M5. When the vehicle-motion state exceeds a predetermined range, the steering amount correcting means M7 corrects the steering amount δh to be outputted to the steering device 11, in order to ensure the required margin amount for the vehicle behavior.

Figure 34:
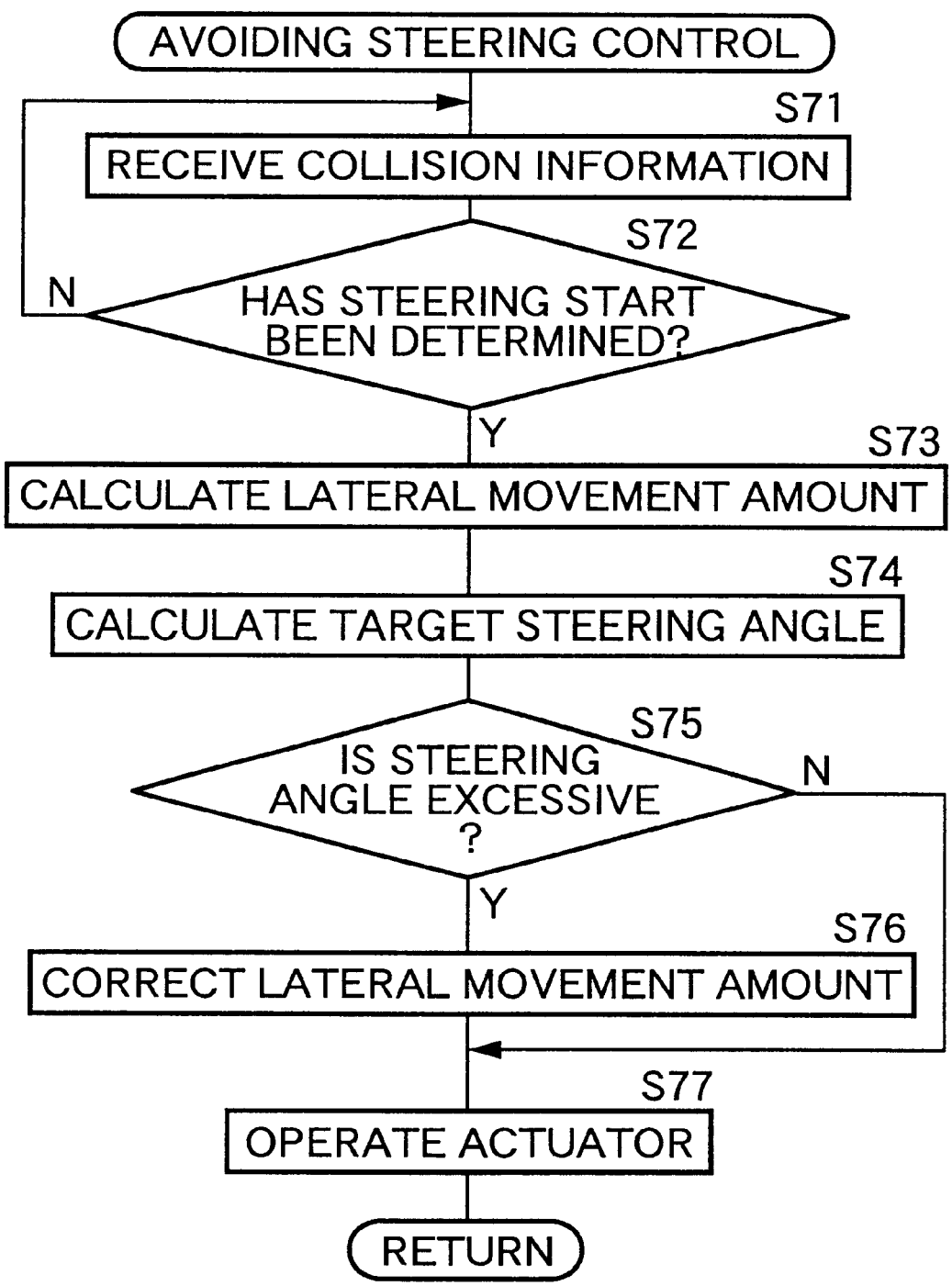

The content of "avoiding steering control" at Step S24 will be described below with reference to a flow chart shown in FIG. 34. Steps S71 to S74 in the flow chart shown in FIG. 34 are the same as Steps S71 to S74 in the flow chart shown in FIG. 11 in the first embodiment and hence, the duplicated description thereof is omitted.

At Step S75 subsequent to Step S74, it is determined whether the target steering angle δh is excessive. When the target steering angle δh is excessive as a result of the determination, the target steering angle δh is corrected to an appropriate value, and in response to the correction of the target steering angle δh, the correction for decreasing the lateral movement amount provided by the steering operation by a proportion corresponding to the decrease in target steering angle δh is carried out, at Step S76. Then, at Step S77, the driving of the actuator 17 of the steering device 11 is controlled in accordance with the target steering angle δh in order to avoid the collision of the vehicle against the on-coming vehicle Ao. More specifically, a PI controller, to which a deviation between the target steering angle δh and the actual steering angle provided by the steering device 11 has been input, controls the actuator 17 of the steering device 11 in a feedback manner to converge the deviation into zero, as shown in FIG. 20.

The content of "excessive-control determination" at Step S75 will be described below in detail with reference to a flow chart in FIG. 36.

In this embodiment, it is aimed at maintaining the driver's steering operability by preventing the steering device 11 from being controlled excessively in order to prevent the collision, and a margin amount is ensured for the vehicle behavior for the vehicle to react, as intended, to the driver's steering operation during and even after the carrying-out of the control. More specifically, the steering angle, the magnitude of the vehicle behavior and the tire performance are selected as parameters. The steering angle is regulated, so that the rotated position of the steering wheel 1 is not changed to a hardly-operable position. The magnitude of the vehicle behavior is regulated, so that a lateral acceleration YG giving a sense of incompatibility to the driver is prevented from being generated and at the same time, the magnitude of the lateral acceleration YG is limited to a value permitting a sufficient margin to be maintained in the steering responsiveness. The tire performance is regulated, so that a margin is maintained in the grip force of a tire, and also a margin is maintained even in the grip force of each tire wheel.

For this purpose, the steering amount in the automatic steering operation is limited, so that the sum total of (1) the vehicle behavior (lateral acceleration YG) already generated before the start of the control and detected by the vehicle behavior detecting means $S_3$ (the lateral acceleration sensor $S_3$), (2) the margin amount of the vehicle behavior determined by the vehicle behavior margin amount determining means M4 and (3) the vehicle behavior estimated by the vehicle behavior estimating means M5 when generated by the automatic steering operation for avoiding the contact, does not exceed a preset value, thereby providing a vehicle behavior where a margin is maintained in the steering responsiveness without giving a sense of incompatibility to the driver. Thus, the driver can spontaneously perform the effective contact-avoiding operation without anxiety.

Figure 35A:
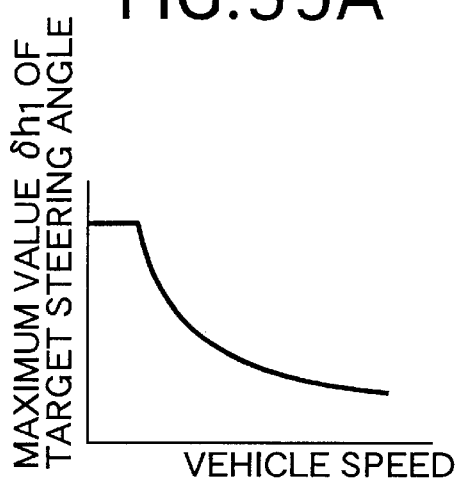
FIGS. 35A to 35E are diagrams showing a map and the like for explaining methods for correcting the target steering angle.
Figure 36:
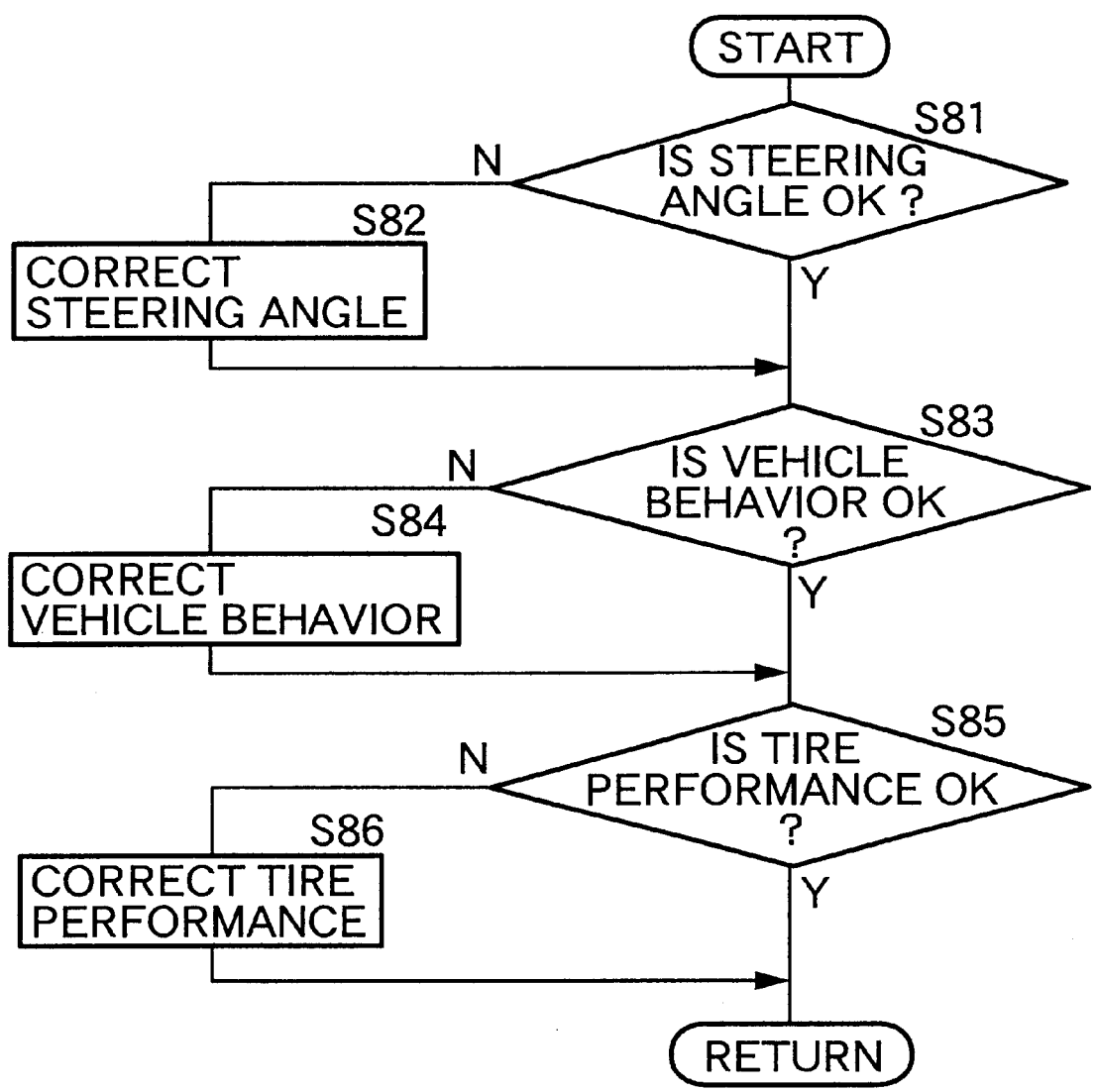

At Step S81 of the flow chart shown in FIG. 36, a target steering angle maximum value $\delta h_1$ is calculated based on a map shown in FIG. 35A and established in accordance with the vehicle speed Vi, and the target steering angle maximum value $\delta h_1$ and the target steering angle $\delta h$ are compared with each other. As a result, if the target steering angle $\delta h$ is too large and exceeds the target steering angle maximum value $\delta h_1$, the processing is advanced to Step S82, at which a correction for renewing the maximum value $\delta h_1$ as a new target steering angle $\delta h$ is carried out. The target steering angle $\delta h$ is determined based on the lateral acceleration and hence, when the vehicle speed Vi is low, the target steering angle $\delta h$ is large. For this reason, the driver must shift the steering wheel 1 in some cases. However, it is possible to prevent a large steering angle where the driver shifts the steering wheel 1, from being generated by the automatic steering operation, by limiting the target steering angle $\delta h$ by the maximum value $\delta h_1$, thereby eliminating the sense of incompatibility of the driver.

At subsequent Step S83, a lateral acceleration YG is detected based on an output from the lateral acceleration sensor $S_3$ forming the vehicle behavior detecting means of the present embodiment, and it is determined whether the target steering angle $\delta h$ is suitable based on the lateral acceleration used as a parameter representative of vehicle behavior. Thus, even when the vehicle behavior has already been generated at the start of the collision avoiding control, it is possible to prevent an excessive vehicle behavior from being generated by the automatic steering operation. Namely, if the total lateral acceleration after the control is represented by YGo; the lateral acceleration generated by the control is represented by YGs; and the lateral acceleration before the control is represented by YGi, the following equation is established:

$$YGo = YGs + YGi \quad (19)$$

$$YGs = \frac{\delta h \cdot Vi^2}{N \cdot (1 + Ks \cdot Vi^2)} \quad (20)$$

Figure 35B:
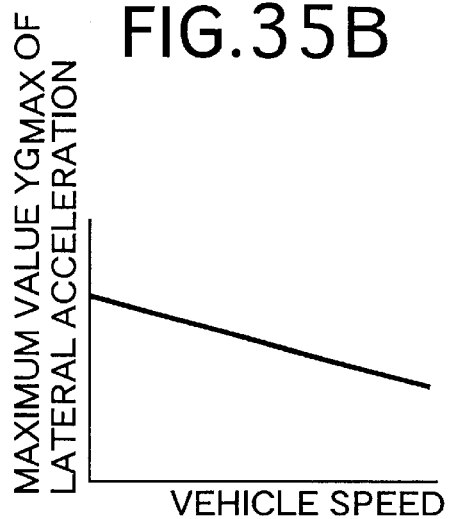

A maximum value $YG_{MAX}$ of the total lateral acceleration YGo set in accordance with the vehicle speed Vi is searched from a map shown in FIG. 35B. The maximum value $YG_{MAX}$ is not a limit value which can be generated by the vehicle, but is a value set as a maximum value which is generated when the frontal collision avoiding device is operated.

Figure 35C:
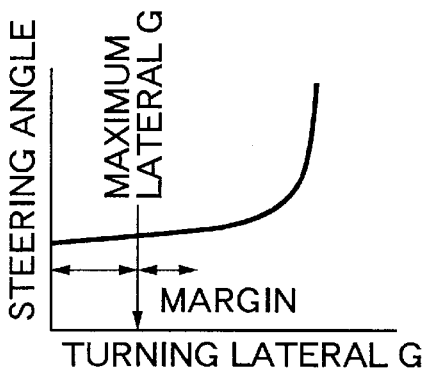

FIG. 35C shows the relationship between the lateral acceleration and the steering angle, when the vehicle speed has varied during traveling of a common vehicle on a circle having a constant radius. In a region where the lateral acceleration is small (in a linear region), even if the lateral acceleration is increased, an increase in steering angle is small. However, if the lateral acceleration is increased beyond the linear region, the steering angle starts to increase suddenly (the effectiveness of the steering becomes dull) and ultimately reaches a limit lateral acceleration for the vehicle. In this embodiment, the maximum value $YG_{MAX}$ of the lateral acceleration YGo is set in the linear region. Therefore, even when the lateral acceleration YGo is increased beyond the maximum value $YG_{MAX}$, a sufficient margin can be ensured before the lateral acceleration reaches the limit lateral acceleration for the vehicle. The maximum value $YG_{MAX}$ of the lateral acceleration YGo is set in accordance with the vehicle speed Vi, as shown in FIG. 35B. The reason why the maximum value $YG_{MAX}$ is increased in accordance with a decrease in the vehicle speed Vi is that the driver accommodation to the lateral acceleration during traveling of the vehicle at a low speed is larger than that during traveling of the vehicle at a high speed.

From the viewpoint of the forgoing, when the lateral acceleration YGo exceeds the maximum value $YG_{MAX}$ at Step S83, the processing is advanced to Step S84, at which the correction of the vehicle behavior is carried out, so that the upper limit value for the target steering angle $\delta h$ is limited by the maximum value $YG_{MAX}$. Namely, a lateral acceleration $YGs_2$ generated by the control after the correction is provided according to the following equation:

$$YGs_2 = YG_{MAX} - YGi \quad (21)$$

and a target steering angle $\delta h_2$ after the correction is provided according to the following equation:

$$\delta h_2 = \frac{YGs_2 \cdot N \cdot (1 + Ks \cdot Vi^2)}{Vi^2} \quad (22)$$

If the target steering angle $\delta h_2$ after the correction is smaller than the target steering angle $\delta h$ or the target steering angle $\delta h_1$ after the above-described correction, a correction for renewing the target steering angle $\delta h_2$ after the correction as a new target steering angle $\delta h$ is carried out.

Figure 35D:
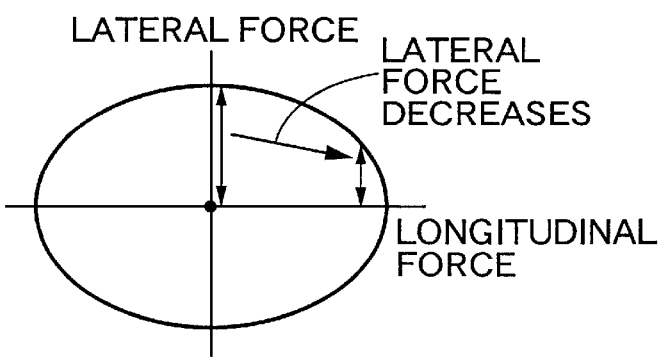

At subsequent Step S85, it is determined whether the grip state of a tire is appropriate. A common front wheel-drive vehicle will be considered below. FIG. 35D shows the ellipse of friction of a tire of a front wheel which is a driving wheel, wherein the axes of ordinates and abscissas indicate lateral and longitudinal forces, respectively. The force on a periphery of the ellipse indicates a maximum force which can be generated by the tire, and when a driving force (a longitudinal force) is generated by the tire, the maximum lateral force is decreased correspondingly. It is necessary to leave a margin in the lateral force generated by the tire even after the automatic steering operation, so that the driver's avoiding steering operation works effectively during avoidance of the frontal collision. For this purpose, when the driving force is large, the limitation is placed, so that the maximum lateral force of the tire enabling the occurrence of the automatic steering operation is not used up. At this time, it is necessary to limit the lateral force of the tire provided by the automatic steering operation exactly in accordance with the driving force. However, a sensor for detecting the load of grounding of the tire and a relevant calculation are required for precisely determining the lateral force. Therefore, because the frontal collision avoiding control is carried out when the vehicle is traveling substantially straight, the lateral force of the tire is assumed as being in a proportional relation to the lateral acceleration YG, and the lateral acceleration YG is limited in place of limiting the lateral force of the tire.

Figure 35E:
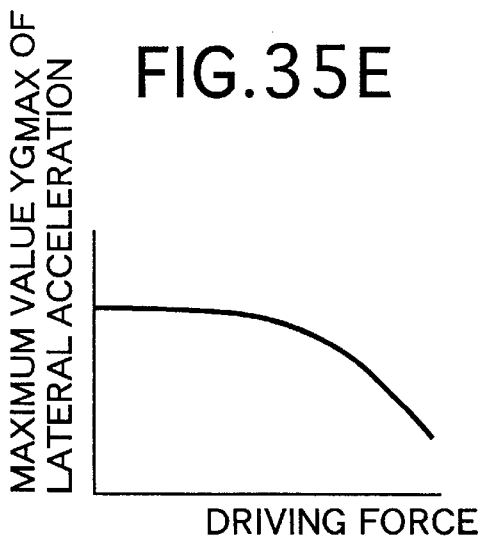

More specifically, the maximum value $YG_{MAX}$ for the lateral acceleration YGo is set in advance, so that it is decreased as the driving force of the tire is increased, as shown in FIG. 35E. When the lateral acceleration YGo exceeds the maximum value $YG_{MAX}$ at Step S85, the processing is advanced to Step S86, at which the correction of the target steering angle δh is carried out, so that the upper limit value for the target steering angle δh is limited by the maximum value $YG_{MAX}$. A target steering angle $δh_3$ provided after the correction, can be calculated in the same manner as the target steering angle $δh_2$ (see the equation (22)) for carrying out the correction by the vehicle behavior. If the target steering angle $δh_3$ is smaller than the target steering angle δh or the target steering angles $δh_1$ and $δh_2$ after the correction, a correction for renewing the target steering angle $δh_3$ after the correction as a new target steering angle δh is carried out. In this manner, a target steering angle δh after the correction is finally determined at Step S87.

The driving force of the tire can be calculated from the engine torque, the shift position and the torque increase rate of a torque converter which have been provided by the communication of the engine ECU 6 and the automatic transmission ECU 7, and the previously known radius of the tire.

Then, at Step S76 of the flow chart in FIG. 34, the lateral movement amount (i.e., the lateral deviation δd) calculated at Step S73 is compared with the lateral movement amount generated by the target steering angle δh after the correction. As a result, when the latter lateral movement amount is larger than the former lateral movement amount, namely, when the lateral movement generated by the target steering angle δh is larger than the lateral movement amount required for avoiding the collision, the target steering angle δh is corrected in the decreasing direction to a value at which a required lateral movement amount is provided. On the other hand, when the latter lateral movement amount is smaller than the former lateral movement amount, namely, when the lateral movement amount generated by the target steering angle δh is smaller than the lateral movement amount required for avoiding the collision, the correction of the target steering angle δh is not carried out. At Step S77, the actuator 17 of the steering device 11 is operated, so that a final lateral movement amount is provided.

By limiting the lateral movement amount, so that the lateral movement amount generated by the target steering angle δh does not exceed the lateral movement amount required for avoiding the collision in the above, it is possible to prevent the target steering angle δh larger than necessary from being outputted to provide a sense of incompatibility.

A sensor for detecting a center line on a road may be additionally mounted. Thus, if the collision avoiding control is carried out depending on the degree of departing of the vehicle Ai from the center line, the control can be achieved at a further high accuracy.

Although the embodiments of the present invention have been described in detail, it will be understood that the present invention is not limited to the above-described embodiments, and various modifications may be made without departing from the spirit and scope of the invention defined in claims.

What is claimed is:

1. A travel safety system for a vehicle, comprising:
   an object detecting means for detecting an object existing in the direction of movement of the vehicle;
   a vehicle speed detecting means for detecting the vehicle speed of the vehicle;
   a correlation calculating means for recognizing an on-coming vehicle based upon detection by the object detecting means and the vehicle speed detected by the vehicle speed detecting means, and for calculating a correlation including a relative position, a relative distance and a relative speed between the vehicle and the on-coming vehicle;
   an appropriate course determining means for determining an appropriate course for the vehicle based upon the relative position, the relative distance and a preset appropriate lateral distance, for permitting the vehicle to pass the on-coming vehicle;
   a contact time point estimating means for estimating a contact time point when the vehicle will come into contact with the on-coming vehicle, based upon the relative distance and the relative speed;
   a contact position estimating means for estimating a contact position at which the vehicle will come into contact with the on-coming vehicle at the contact time point, based upon the relative position, the relative distance, the relative speed and the vehicle speed of the vehicle; and
   a contact determining means for comparing the contact position with the appropriate course and for determining the possibility of contact between the vehicle and the on-coming vehicle, wherein the contact determining means calculates a lateral deviation between the appropriate course determined by the appropriate course determining means and the contact position estimated by the contact position estimating means, and compares the lateral deviation with a contact determining reference value for determining the possibility of contact between the vehicle and the on-coming vehicle.

2. A travel safety system for a vehicle according to claim 1, further including a vehicle yaw rate detecting means for detecting the yaw rate of the vehicle, wherein the lateral deviation is corrected based upon the yaw rate detected by the vehicle yaw rate detecting means.

3. A travel safety system for a vehicle according to claim 1, further including an on-coming vehicle yaw rate calculating means for calculating the yaw rate of the on-coming vehicle, wherein the lateral deviation is corrected based upon the yaw rate calculated by the on-coming vehicle yaw rate calculating means.

4. A travel safety system for a vehicle according to claim 3, wherein the on-coming vehicle yaw rate calculating means calculates the yaw rate of the on-coming vehicle from the locus of movement for the on-coming vehicle and the vehicle speed of the on-coming vehicle detected based upon a variation in the correlation.

5. A travel safety system for a vehicle according to claim 2, wherein the vehicle includes a steering device and wherein the contact determining means permits automatic steering of said steering device upon determining a possibility of contact between the vehicle and the on-coming vehicle.

6. A travel safety system for a vehicle according to claim 5, wherein a steering angle of the steering device upon automatic steering is set in accordance with the lateral deviation.

7. A travel safety system for a vehicle according to claim 5, wherein a steering angle of the steering device upon automatic steering is set in accordance with the lateral deviation, the lateral acceleration of the vehicle and the steering responsiveness.

8. A travel safety system for a vehicle according to claims 6 or 7, wherein the maximum value of the steering angle of the steering device is limited in accordance with the width of a road.

9. A travel safety system for a vehicle according to any one of claims 5 or 6, wherein the steering device returns the vehicle to the original travel locus after avoiding the on-coming vehicle.

10. A travel safety system for a vehicle, comprising:
an object detecting means for detecting an object existing in the direction of movement of a vehicle;
a vehicle speed detecting means for detecting the vehicle speed of the vehicle;
a vehicle yaw rate detecting means for detecting the yaw rate of the vehicle;
a correlation calculating means for recognizing an on-coming vehicle based upon the detection by the object detecting means and the vehicle speed detected by the vehicle speed detecting means, and for calculating a relative position, a relative speed and a relative distance between the vehicle and the on-coming vehicle;
a turning movement determining means for determining that the vehicle and the on-coming vehicle are being turned;
a vehicle turning-locus calculating means for calculating a locus of turning movement for the vehicle, based upon the vehicle speed and the yaw rate of the vehicle;
an on-coming vehicle turning-locus calculating means for calculating a locus of turning movement for the on-coming vehicle, based upon (i) a preset appropriate lateral distance for permitting the vehicle and the on-coming vehicle to pass each other appropriately during turning movement thereof, (ii) the relative position, and (iii) the relative distance;
a danger degree calculating means for comparing the locus of turning movement for the vehicle with the locus of turning movement for the on-coming vehicle and for calculating a degree of danger of contact between the vehicle and the on-coming vehicle based upon the comparison; and
a contact avoiding means for allowing the vehicle to perform a contact avoiding motion in accordance with the calculated degree of danger wherein the contact of the vehicle with the on-coming vehicle is avoided.

11. A travel safety system for a vehicle according to claim 10, wherein the turning movement determining means determines that the vehicle and the on-coming vehicle are being turned, based upon the relative speed, the relative distance and the yaw rate.

12. A travel safety system for a vehicle according to claim 10, wherein the contact avoiding motion provided by the contact avoiding means is decreased, when it is determined by the turning movement determining means that the vehicle and the on-coming vehicle are being turned, as compared with when it is determined that the vehicle and the on-coming vehicle are not being turned.

13. A travel safety system for a vehicle according to any one of claims 10 to 12, wherein when it is determined that the vehicle and the on-coming vehicle are not being turned, contact avoiding motion is automatically provided by the steering device, and wherein when it is determined that the vehicle and the on-coming vehicle are being turned, contact avoiding motion is provided by regulating the steering maintaining force of the steering device.

14. A travel safety system for a vehicle according to any one of claims 10 to 12, including a vehicle appropriate turning locus calculating means for calculating an appropriate locus of turning movement for permitting the vehicle which is being turned to pass the on-coming vehicle by the appropriate lateral distance, and wherein the danger degree calculating means calculates a degree of danger of contact between the vehicle and the on-coming vehicle by comparing the locus of turning movement for the vehicle with the appropriate locus of turning movement for the on-coming vehicle.

15. A travel safety system for a vehicle, comprising:
an object detecting means for detecting an object existing in the direction of movement of a vehicle;
a vehicle speed detecting means for detecting the vehicle speed of the vehicle;
a correlation calculating means for recognizing an on-coming vehicle, based upon the detection by the object detecting means and the vehicle speed of the vehicle detected by the vehicle speed detecting means, and for calculating a correlation comprising a relative position, a relative distance and a relative speed between the vehicle and the on-coming vehicle;
an appropriate course determining means for determining an appropriate course for the vehicle for allowing the vehicle to pass the on-coming vehicle, based upon the relative position, the relative distance and a preset appropriate lateral distance;
a contact position estimating means for estimating a contact position at which the vehicle will come into contact with the on-coming vehicle at a contact time point, based upon the relative position, the relative distance, the relative speed and the vehicle speed of the vehicle;
a contact-possibility determining means for comparing the contact position with the appropriate course to determine the possibility of contact between the vehicle and the on-coming vehicle;
a steering control means for automatically steering the steering device of the vehicle to avoid the contact, when it is determined that there is a possibility of contact by the contact-possibility determining means;
a reference steering amount determining means for determining a reference steering amount based upon the variation in vehicle behavior of the vehicle generated by the steering operation;
a required lateral movement amount calculating means for calculating the required lateral movement amount for avoiding the contact based upon the lateral deviation between the appropriate course and the contact position; and
a steering amount outputting means, for comparing of the reference lateral movement amount determined by the reference steering amount determining means with the required lateral movement amount calculated by the required lateral movement amount calculating means and for outputting a target steering amount to the steering control means.

16. A travel safety system for a vehicle according to claim 15, wherein the steering amount outputting means corrects the reference steering amount in the decreasing direction, when the required lateral movement amount is smaller than the reference lateral movement amount.

17. A travel safety system for a vehicle according to claim 15, wherein the steering amount outputting means delays the timing of starting the steering operation based upon the reference steering amount, when the required lateral movement amount is smaller than the reference lateral movement amount.

18. A travel safety system for a vehicle according to claim 17, wherein the steering amount outputting means selectively corrects the reference steering amount in the decreasing direction, or delays the timing of starting the steering operation based upon the reference steering amount, when the required lateral movement amount is smaller than the reference lateral movement amount.

19. A travel safety system for a vehicle according to claim 18, wherein the steering amount outputting means decreases the reference steering amount, when the relative speed between the vehicle and the on-coming vehicle is low.

20. A travel safety system for a vehicle according to claim 18, wherein the steering amount outputting means decreases the reference steering amount, when the vehicle speed of the vehicle is low.

21. A travel safety system for a vehicle according to claim 18, wherein the steering amount outputting means delays the timing of starting the steering based upon the reference steering amount, when the relative speed between the vehicle and the on-coming vehicle is high.

22. A travel safety system for a vehicle according to claim 18, wherein the steering amount outputting means delays the timing of starting the steering based upon the reference steering amount, when the vehicle speed of the vehicle is high.

23. A travel safety system for a vehicle according to claim 18, wherein the steering amount outputting means delays the timing of starting the steering based upon the reference steering amount, when the relative distance between the vehicle and the on-coming vehicle is large.

24. A travel safety system for a vehicle according to claim 18, wherein the steering amount outputting means decreases the reference steering amount, when the relative distance between the vehicle and the on-coming vehicle is small.

25. A travel safety system for a vehicle according to any one of claims 15 to 24, wherein the reference steering amount determining means determines, as a reference steering amount, the smaller of (i) the steering amount determined based upon the variation in vehicle behavior of the vehicle generated by the steering operation provided by the steering control means, and (ii) the steering amount previously determined based upon the vehicle speed of the vehicle.

26. A travel safety system for a vehicle according to any one of claims 15, 18, 20, 21, 22 and 23 wherein the steering control means increases the steering speed, such that the lateral movement amount provided by the reference steering amount determined by the reference steering amount determining means, is maintained when the timing of starting the steering by the steering amount outputting means is delayed.

27. A travel safety system for a vehicle including a steering device, comprising:

an object detecting means for detecting an object existing in the direction of movement of the vehicle;

a vehicle speed detecting means for detecting the vehicle speed of the vehicle;

a correlation calculating means for recognizing an on-coming vehicle based upon the detection by the object detecting means and the vehicle speed of the vehicle detected by the vehicle speed detecting means, and for calculating a correlation comprising a relative position, a relative distance and a relative speed between the vehicle and the on-coming vehicle;

a contact-possibility determining means for determining the possibility of contact between the vehicle and the on-coming vehicle, based upon the correlation calculated by the correlation calculating means;

a steering control means for automatically steering the steering device in order to avoid contact, when the contact-possibility determining means determines that there is the possibility of contact;

a vehicle behavior detecting means for detecting the magnitude of the vehicle behavior of the vehicle;

a vehicle behavior margin amount determining means for determining a margin amount of vehicle behavior which can be generated by the spontaneous steering operation provided by a driver;

a vehicle behavior estimating means for estimating the magnitude of the vehicle behavior of the vehicle, when the steering device is steered by the steering control means;

a vehicle motion state calculating means for calculating the motion state of the vehicle when the steering device is steered by the steering control means, based upon outputs from the vehicle behavior detecting means, the vehicle behavior margin amount determining means and the vehicle behavior estimating means; and a steering amount correcting means for correcting the steering amount provided to the steering device by the steering control means, when the vehicle motion state calculated by the vehicle motion state calculating means exceeds a predetermined range.

28. A travel safety system for a vehicle according to claim 27, further including:

an appropriate course determining means for determining an appropriate course for the vehicle for allowing the vehicle to pass the on-coming vehicle appropriately, based upon the correlation calculated by the correlation calculating means and the previously determined appropriate lateral distance;

a contact position estimating means for estimating a contact presuming position in which the vehicle will come into contact with the on-coming vehicle, based upon the correlation and the vehicle speed of the vehicle; and wherein the contact-possibility determining means compares the contact presuming position with the appropriate course and determines the possibility of contact between the vehicle and the on-coming vehicle.

29. A travel safety system for a vehicle according to claim 27 or 28, wherein the predetermined range is an acceptable steering amount determined in accordance with the vehicle speed of the vehicle, and wherein when the steering amount calculated by the vehicle motion state calculating means exceeds the maximum value of the acceptable steering amount, the steering amount correcting means corrects the steering amount to the maximum value.

30. A travel safety system for a vehicle according to claim 27 or 28, wherein the predetermined range is an acceptable lateral acceleration determined in accordance with the vehicle speed of the vehicle, and wherein when the lateral acceleration calculated by the vehicle motion state calculating means exceeds the maximum value of the acceptable lateral acceleration, the steering amount correcting means decreases the steering amount.

31. A travel safety system for a vehicle according to claim 30, wherein the acceptable lateral acceleration is determined based upon a value of lateral acceleration when the rate of increase in the steering amount is suddenly increased with respect to an increase in lateral acceleration in a vehicle turning characteristic.

32. A travel safety system for a vehicle according to claim 27 or 28, wherein the predetermined range is an acceptable lateral acceleration determined in accordance with the driving wheel torque of the vehicle, and wherein when the lateral acceleration calculated by the vehicle motion state calculating means exceeds the maximum value of the acceptable lateral acceleration, and the steering amount correcting means decreases the steering amount.

* * * * *